(12) United States Patent
Maly et al.

(10) Patent No.: US 10,469,895 B2
(45) Date of Patent: Nov. 5, 2019

(54) MOBILE AUDIO DISTRIBUTION SYSTEM AND METHOD

(71) Applicants: Andrew Alexander Maly, Bryan, TX (US); Rainer Jorg Fink, College Station, TX (US); Michael John Latzel, Beford, TX (US); Viktor Yevgenievich Vlassov, College Station, TX (US); Garland Wayne Young, College Station, TX (US)

(72) Inventors: Andrew Alexander Maly, Bryan, TX (US); Rainer Jorg Fink, College Station, TX (US); Michael John Latzel, Beford, TX (US); Viktor Yevgenievich Vlassov, College Station, TX (US); Garland Wayne Young, College Station, TX (US)

( * ) Notice: Subject to any disclaimer, the term of this patent is extended or adjusted under 35 U.S.C. 154(b) by 285 days.

(21) Appl. No.: 15/648,404

(22) Filed: Jul. 12, 2017

(65) Prior Publication Data

US 2017/0318326 A1    Nov. 2, 2017

Related U.S. Application Data

(63) Continuation-in-part of application No. 14/336,786, filed on Jul. 21, 2014, now abandoned.
(Continued)

(51) Int. Cl.
*H04N 21/43* (2011.01)
*H04R 3/12* (2006.01)
*G06F 16/60* (2019.01)

(52) U.S. Cl.
CPC ......... *H04N 21/4307* (2013.01); *G06F 16/60* (2019.01); *H04R 3/12* (2013.01); *H04R 2227/005* (2013.01)

(58) Field of Classification Search
CPC .................................................. H04N 21/4307
(Continued)

(56) References Cited

U.S. PATENT DOCUMENTS 5,979,591 A  * 11/1999  Harrison ................... H04R 1/02
                                                    181/151
2011/0229105 A1* 9/2011  Khan ....................... H04N 5/765
                                                    386/200

OTHER PUBLICATIONS

Hermaphroditic Connctor Assembly with Only one pair of housing mold and metal contact Hong Cheol Kee Univ Sogang Res Foundation KR 101585649 (Year: 2014).*

* cited by examiner

*Primary Examiner* — William C Vaughn, Jr.
*Assistant Examiner* — Daniel T Tekle
(74) *Attorney, Agent, or Firm* — Kevin Mark Klughart

(57) ABSTRACT

A mobile audio distribution (MAD) system/method providing for synchronized audio distribution to modular audio modules (MAMs) is disclosed. The system/method utilizes a central audio synchronization module (ASM) that loads audio files onto audio playback recorders (APRs) such that the audio playback emitted from each APR is synchronized in time. These APRs are individually positioned within and electrically connected to a MAM that is positioned in a spatially diverse manner in a desired field of audio distribution. Each MAM is configured to be adaptable to removable physical fixation to a vertical standard such as a tripod, pole, tree, etc. Each MAM is configured with a speaker, amplifier, battery pack, APR, optional radio frequency receiver (RFR) in order to disseminate synchronized audio from the APR via the speaker. Each MAM may be removably interlocked with other MAMs via the use of one or more hermaphroditic plate connectors (HPC).

20 Claims, 96 Drawing Sheets

Related U.S. Application Data

(60) Provisional application No. 61/856,519, filed on Jul. 19, 2013.

(58) Field of Classification Search
USPC .......................................................... 386/201
See application file for complete search history.

1600

4000

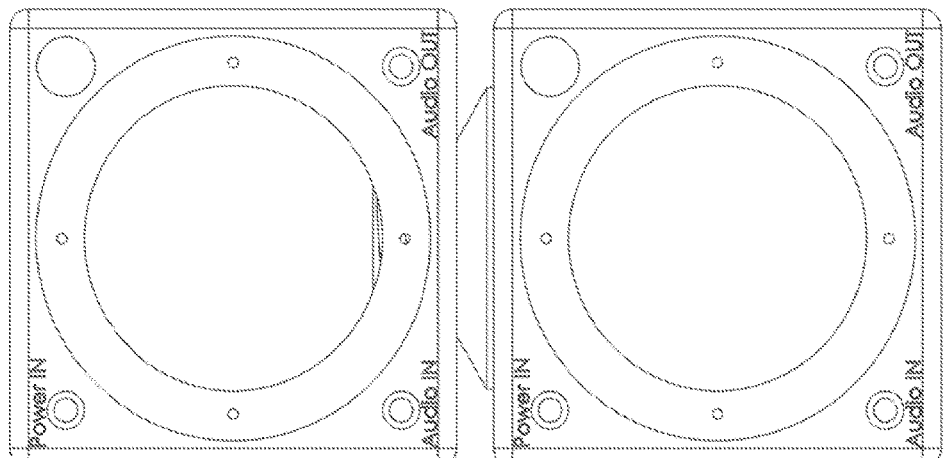
*FIG. 41*
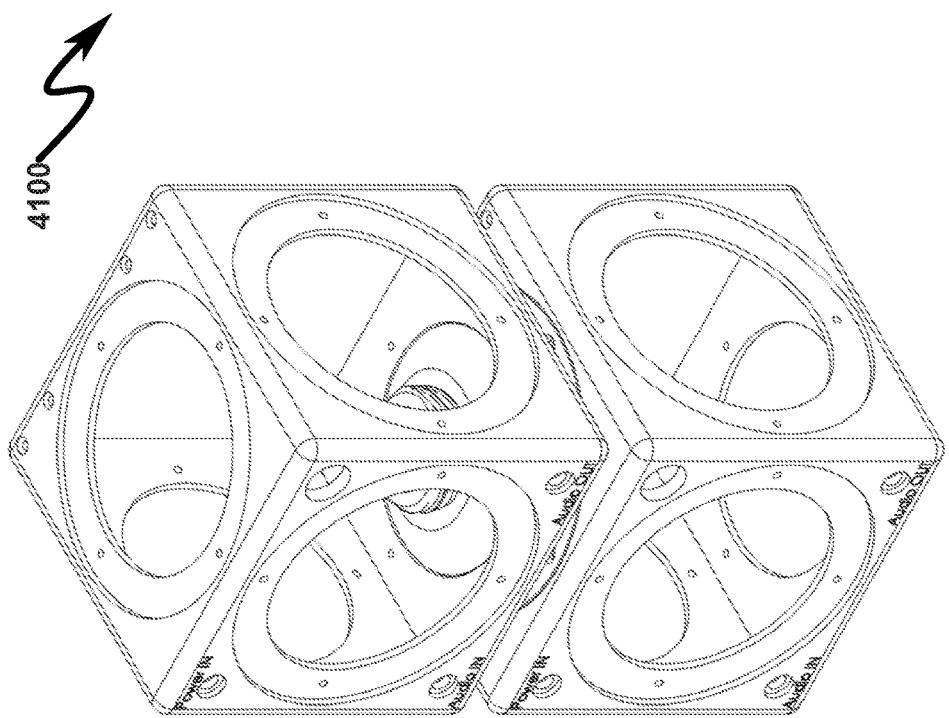
4100

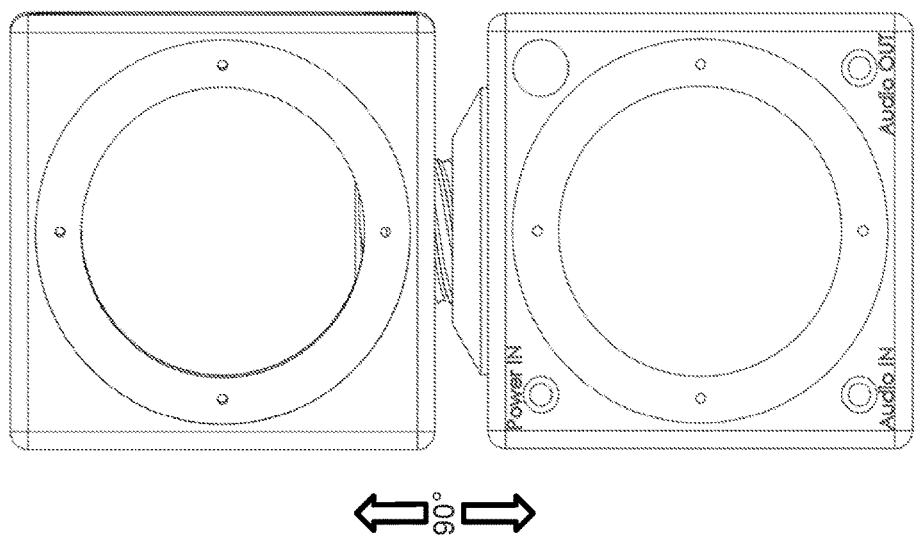
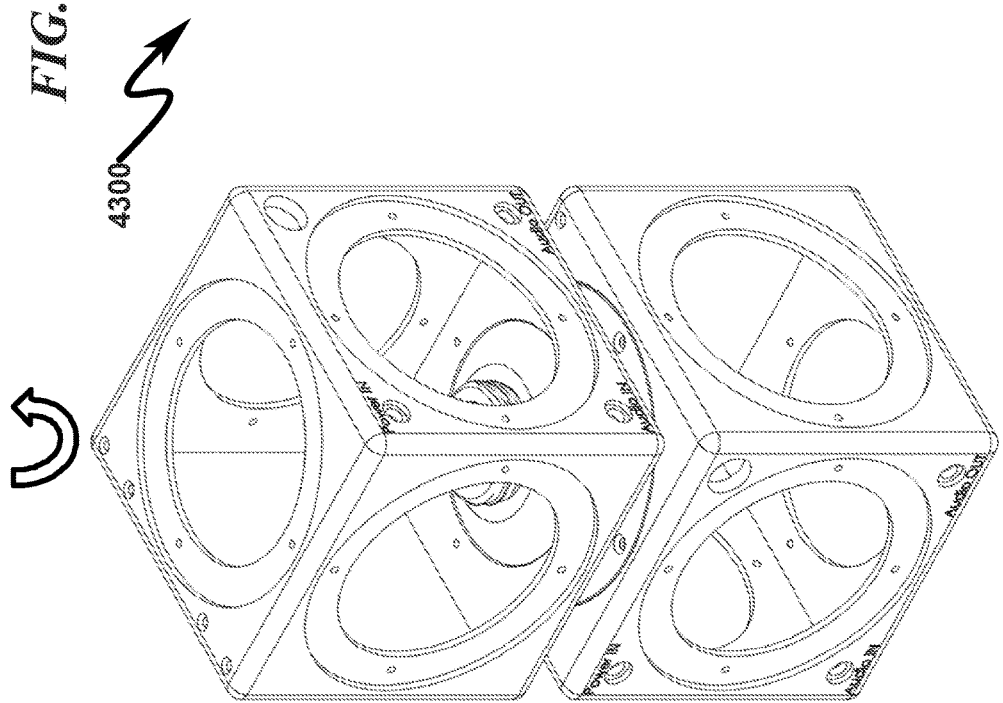
FIG. 43

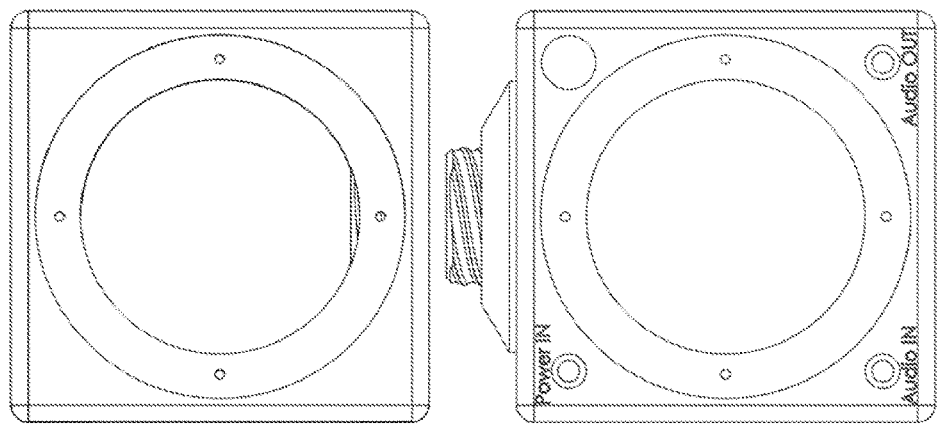
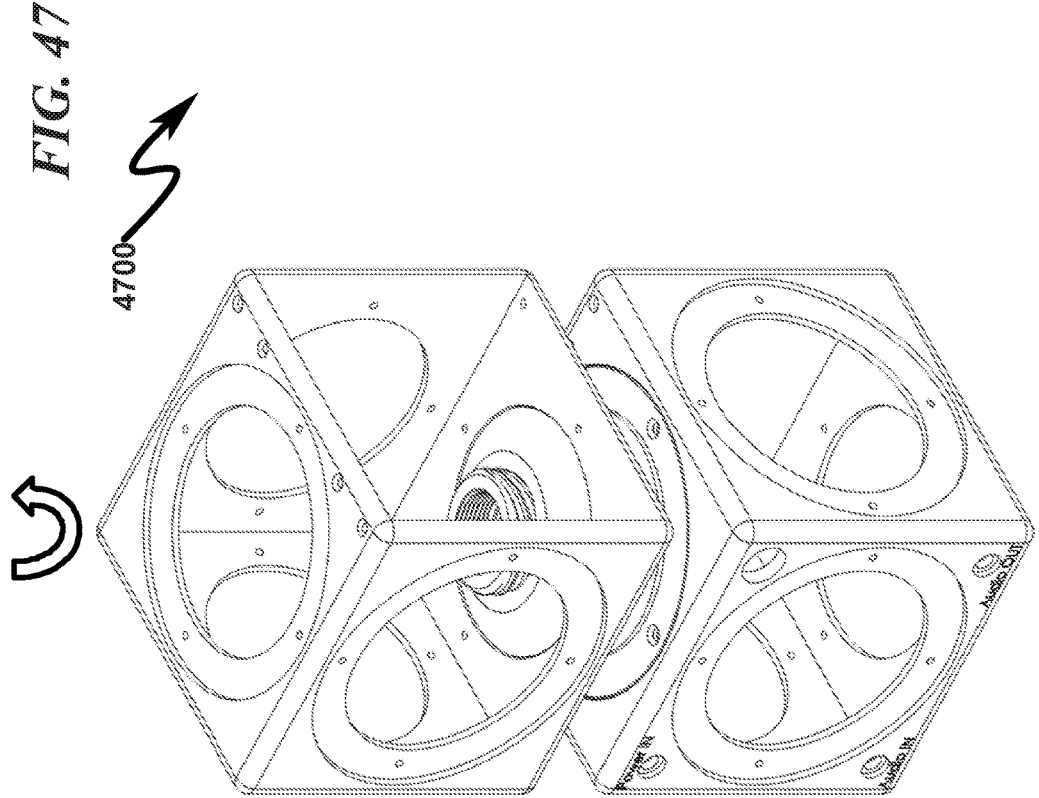
FIG. 47

5000

5100

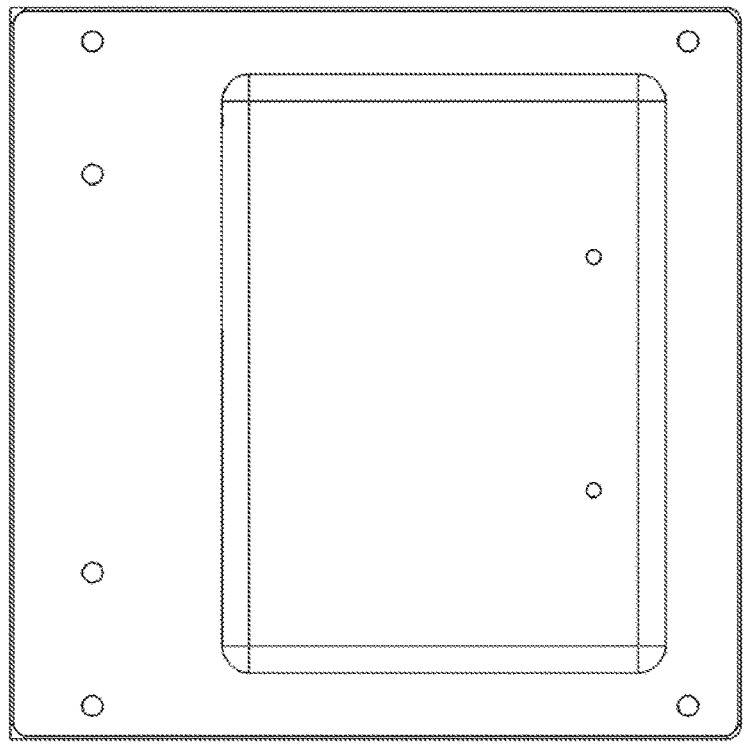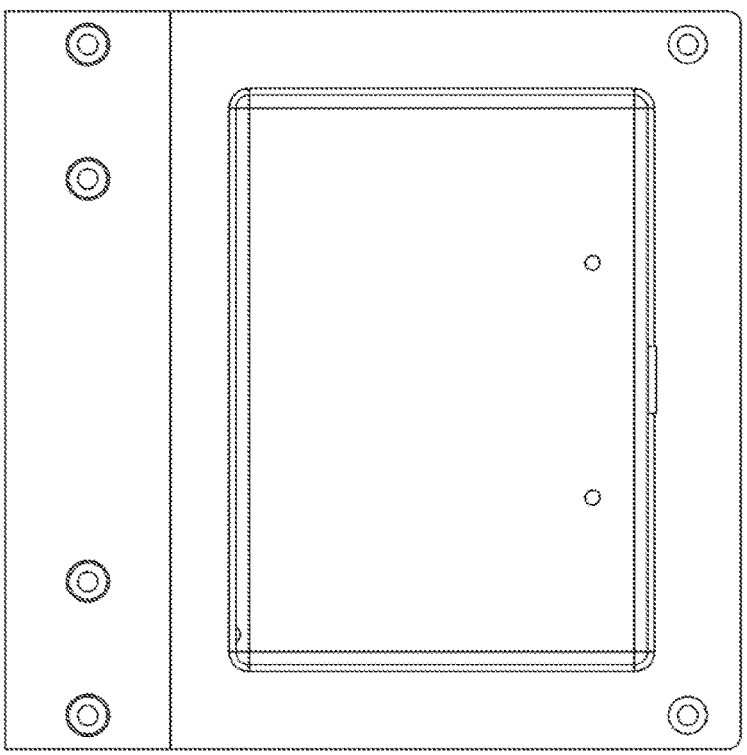
FIG. 61

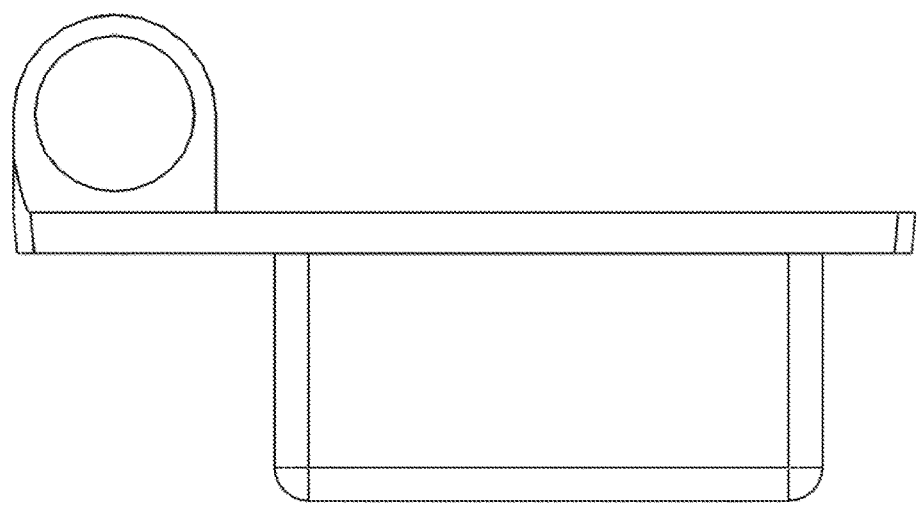
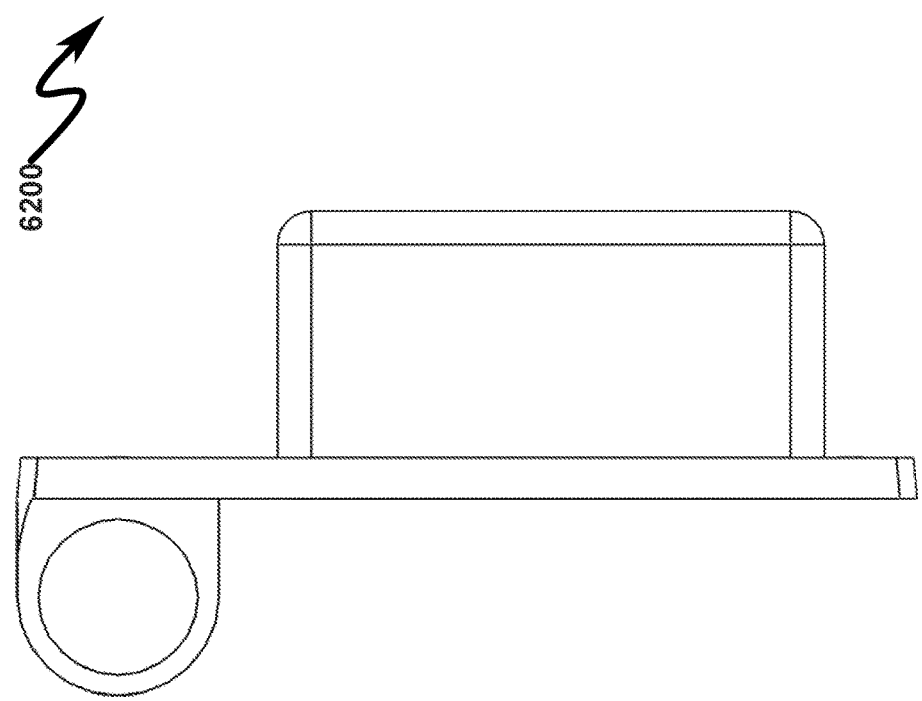
FIG. 62

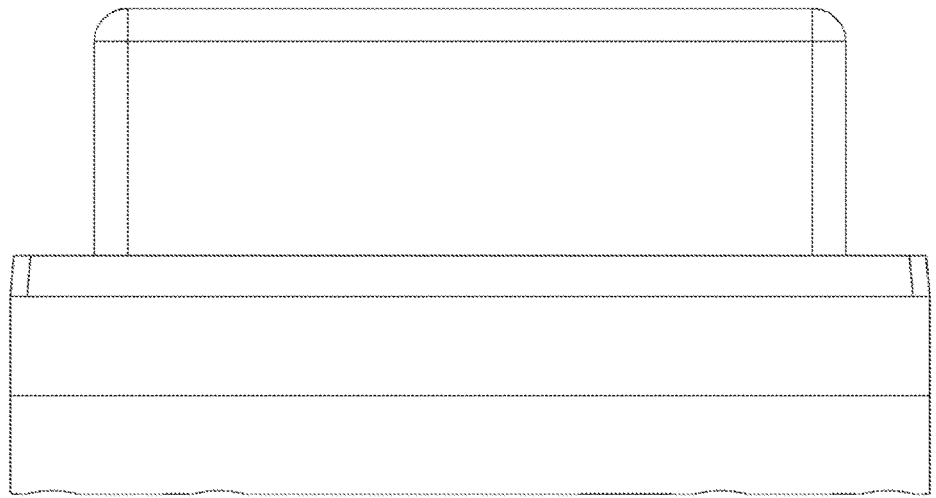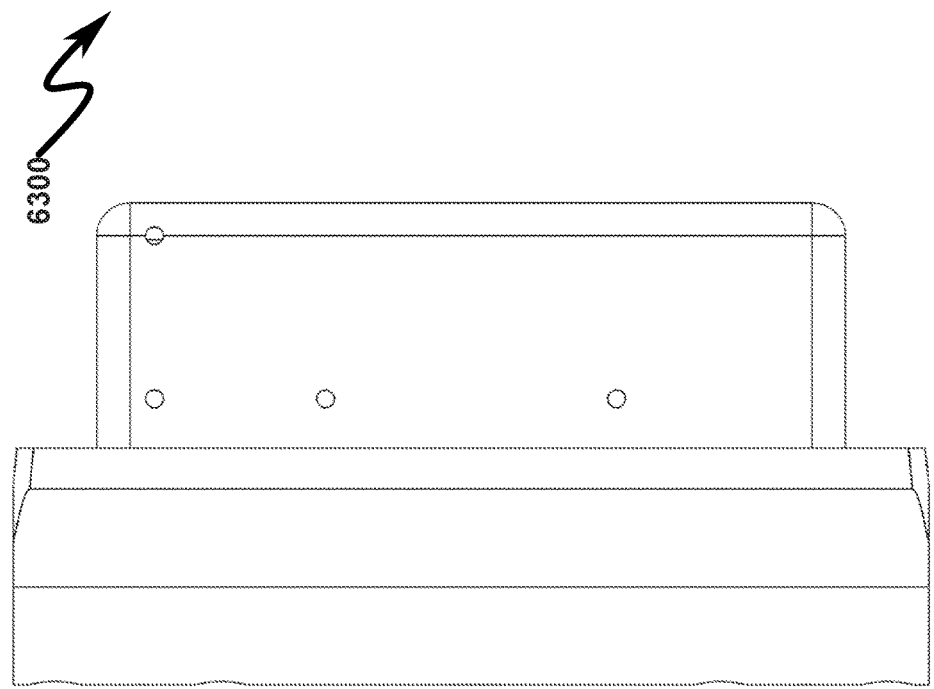
FIG. 63

7600

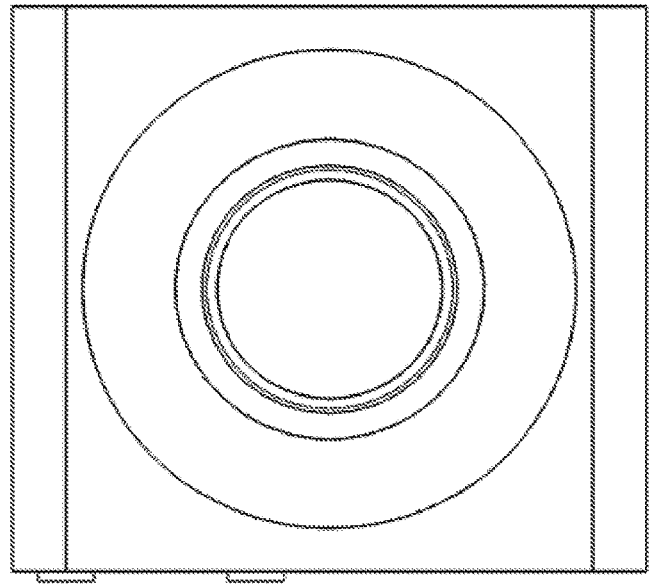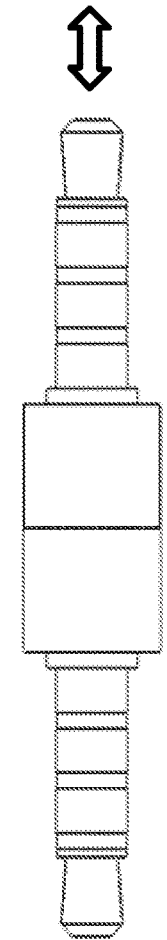
FIG. 90

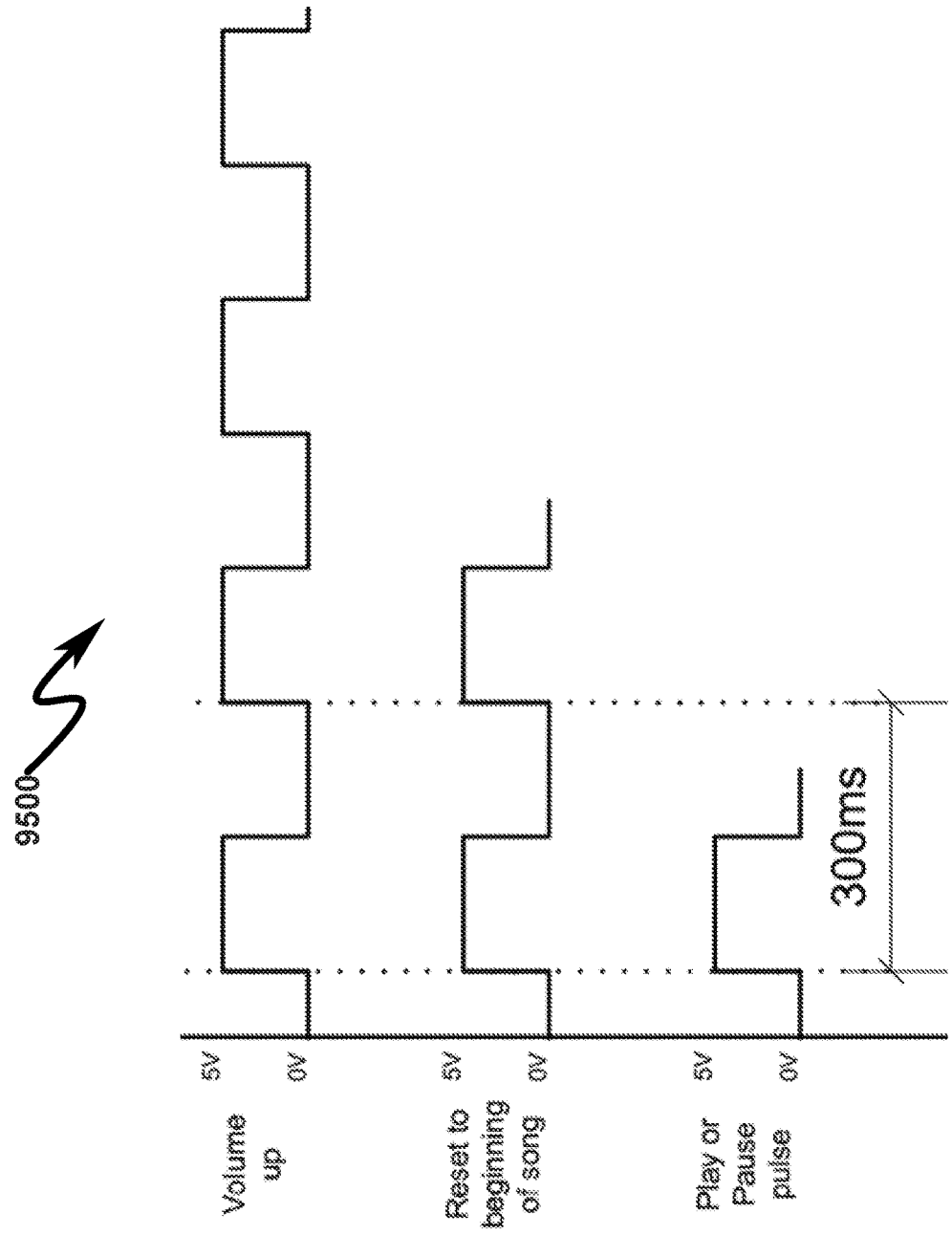

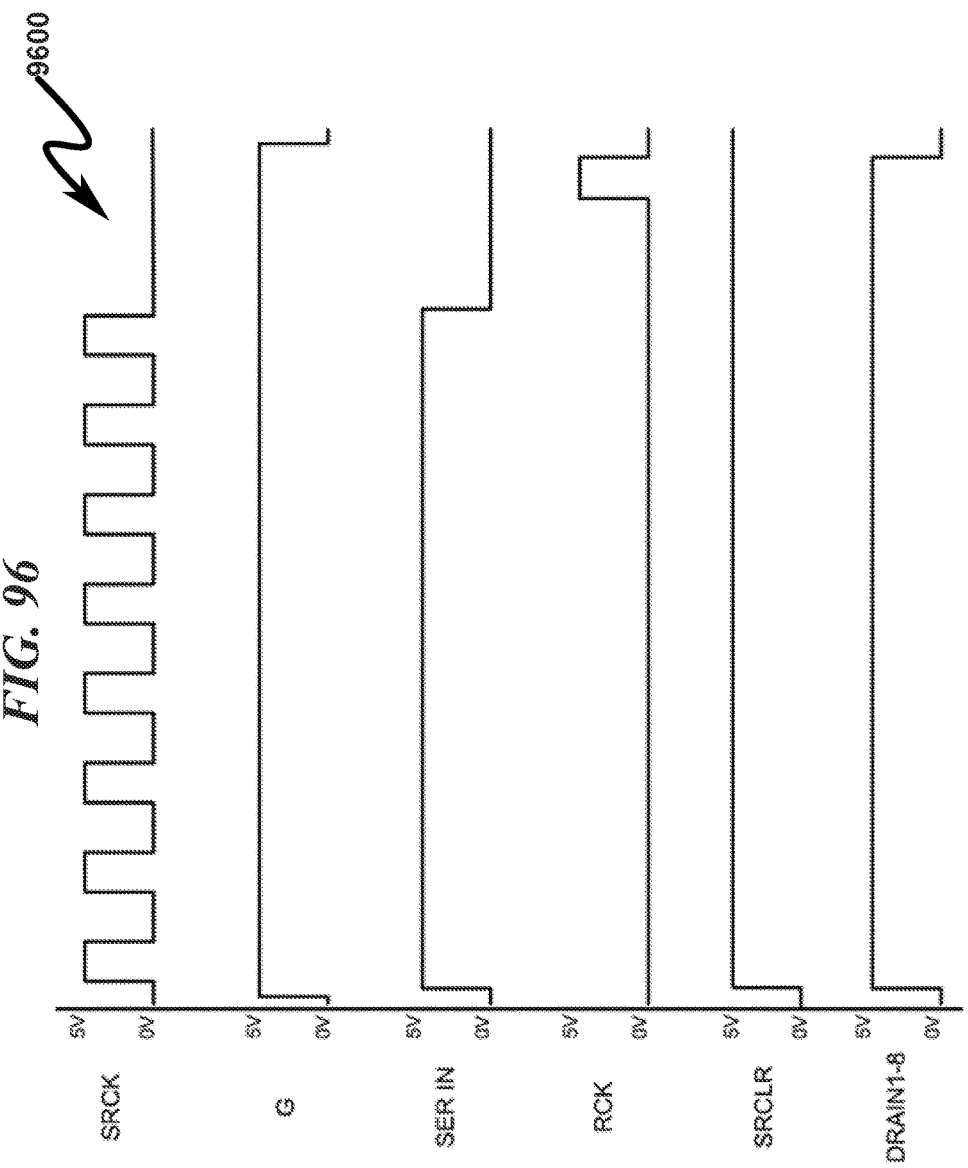

MOBILE AUDIO DISTRIBUTION SYSTEM AND METHOD

CROSS REFERENCE TO RELATED APPLICATIONS

Continuation-in-part Patent Application (CIP)

This is a continuation-in-part (CIP) patent application of and incorporates by reference United States Utility Patent Application for MOBILE AUDIO/STEREO NETWORK AND SYSTEM by inventor Andrew Maly, et al., filed electronically with the USPTO on Jul. 21, 2014, with Ser. No. 14/336,786, EFSID 271855555, confirmation number 5023, docket AZSXC.0101 (formerly MALY001US0).

Utility Patent Applications

This patent application claims benefit under 35 U.S.C. § 120 and incorporates by reference United States Utility Patent Application for MOBILE AUDIO/STEREO NETWORK AND SYSTEM by inventor Andrew Maly, et al., filed electronically with the USPTO on Jul. 21, 2014, with Ser. No. 14/336,786, EFSID 271855555, confirmation number 5023, docket AZSIC.0101 (formerly MALY001US0).

Provisional Patent Applications

United States Utility Patent Application for MOBILE AUDIO/STEREO NETWORK AND SYSTEM by inventor Andrew Maly, et al., filed electronically with the USPTO on Jul. 21, 2014, with Ser. No. 14/336,786, EFSID 271855555, confirmation number 5023, docket AZSIC.0101 (formerly MALY001US0) claims benefit under 35 U.S.C. § 119 and incorporates by reference United States Provisional Patent Application for MOBILE AUDIO/STEREO NETWORK AND SYSTEM by inventor Andrew Maly, et al., filed electronically with the USPTO on Jul. 19, 2013, with Ser. No. 61/856,519, EFSID 27287845, confirmation number 8965, docket AZSXC.0101P (formerly MALY001USP).

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods associated distribution of audio over a spatially diverse area. Without limitation, the present invention relates to distribution of time-synchronized audio in public venues.

BRIEF SUMMARY OF THE INVENTION

The present invention allows a plurality of independent spatially diverse mobile audio modules (MAMs) to present coordinated audio that is distributed over a wide geographic area. Each MAM provides for distribution of audio from an audio playback recorder (APR) and/or synchronization input from a radio frequency receiver. Each APR is individually programmed with audio content using an audio synchronization module (ASM) that time synchronizes audio content on each APR such that when playback occurs on the MAM, the audio content distributed from each MAM is synchronized in time. The system and method described permit mass programming of a plurality of APRs with a single ASM and time synchronization on each APR as well as remote time synchronization of APR content using an independent time reference in each MAM that is utilized by a RF receiver to coordinate playback of APR content.

The present invention also provides for a modular approach to MAM construction in which each MAM may be mechanically coupled to other MAMs to form a unified audio distribution node that may be easily disassembled and reassembled in a mobile audio distribution environment. The use of one or more customized hermaphroditic plate connectors (HPC) permits each MAM to be removably interlocked with other MAMs and/or positioned on standard tripod mounts. Each MAM comprises a rear opening lid (ROL) configured to cover the rear opening of the MAM and to rotate about a hinge attached between the MAM and the ROL. In some preferred embodiments this ROL provides for a mechanical attachment void (MAV) configured to permit in-the-field attachment of the ROL to a vertical standard such as a tree or post.

BRIEF DESCRIPTION OF THE DRAWINGS

For a fuller understanding of the advantages provided by the invention, reference should be made to the following detailed description together with the accompanying drawings wherein:

FIG. 41 illustrates top right front perspective and front face views of preferred exemplary invention mobile containing enclosures (MCEs) mated together using hermaphroditic plate connectors (HPCs) depicting a rotational engagement angle of 0 degrees;

FIG. 43 illustrates top right front perspective and front face views of preferred exemplary invention mobile containing enclosures (MCEs) mated together using hermaphroditic plate connectors (HPCs) depicting a rotational engagement angle of 90 degrees;

FIG. 47 illustrates top right front perspective and front face views of preferred exemplary invention mobile containing enclosures (MCEs) mated together using hermaphroditic plate connectors (HPCs) depicting a rotational engagement angle of 270 degrees;

FIG. 61 illustrates front and rear views of a preferred exemplary rear opening lid (ROL) embodiment;

FIG. 62 illustrates left side and right side views of a preferred exemplary rear opening lid (ROL) embodiment;

FIG. 63 illustrates top and bottom views of a preferred exemplary rear opening lid (ROL) embodiment;

FIG. 90 illustrates a front view of an exemplary male-male TRRS USB/audio control connector used in conjunction with a typical APR;

FIG. 95 illustrates an exemplary control function timing diagram for a typical ASM implementation; and FIG. 96 illustrates an exemplary shift register input/output timing diagram for a typical ASM implementation.

DESCRIPTION OF THE PRESENTLY PREFERRED EXEMPLARY EMBODIMENTS

Figure 1:
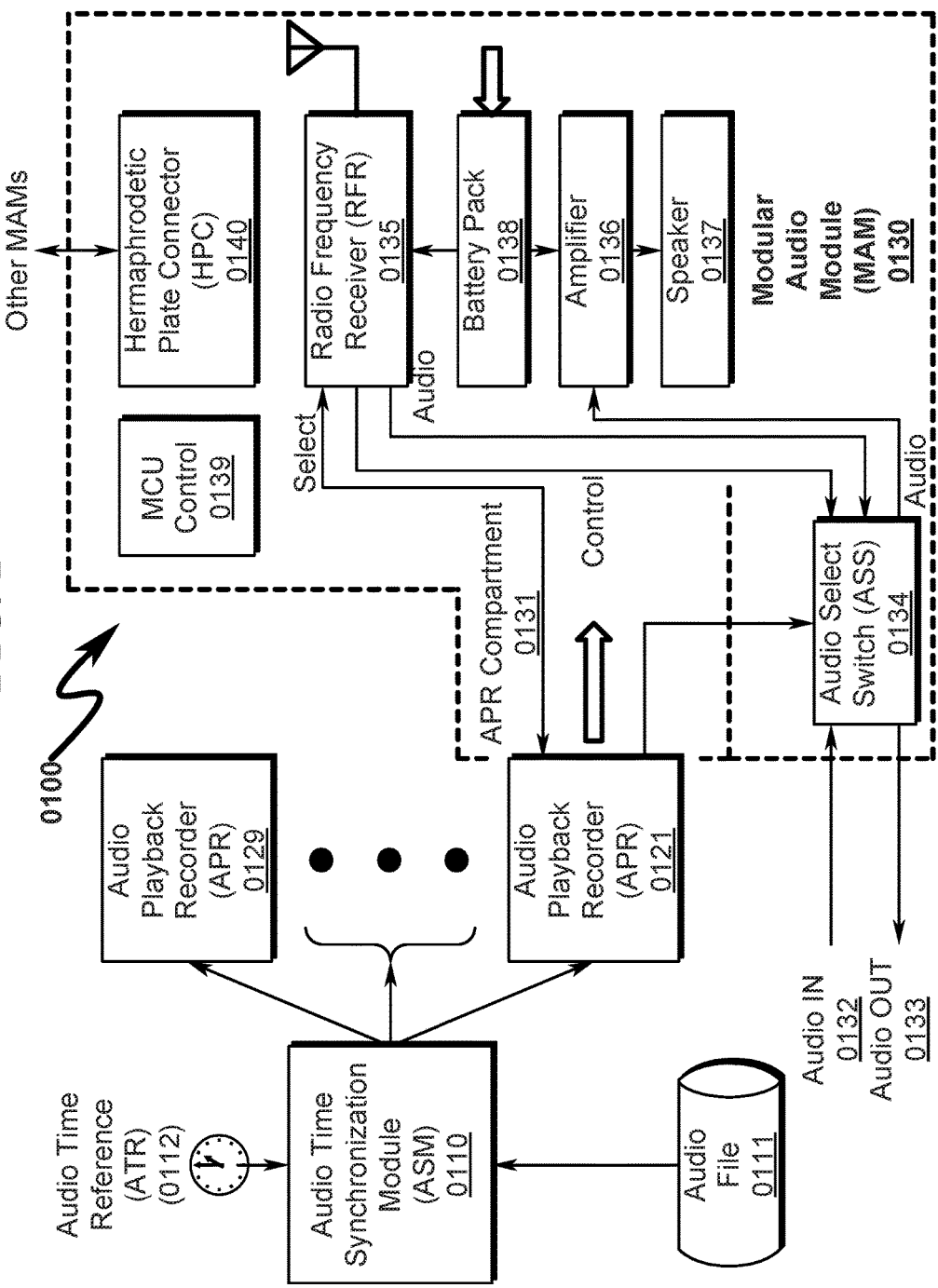
FIG. 1 illustrates a block diagram of a preferred exemplary system embodiment of the present invention.

While this invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a MOBILE AUDIO DISTRIBUTION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

System Overview (0100)

An overview of a preferred exemplary system embodiment is illustrated in FIG. 1 (0100), wherein the system is divided into three cooperating mechanisms (ASM, APR, MAM). The first mechanism is an audio time synchronization module (ASM) (0110) that accepts audio input from an audio file (0111) stored on a computer readable medium (or alternatively live audio stored internally within the ASM (0110) on a computer readable medium) and transfers this information to one or more audio playback recorders (APRs) (0121, 0129) configured to accept audio hardware input and store this information internally. The ASM (0110) is configured to both transfer the audio data (0111) to the APRs (0121, 0129) and initiate recording of this audio information on the APRs (0121, 0129) but also initiate a synchronized playback of the recorded audio on each of the APRs (0121, 0129) such that the recorded playback is synchronized in time based on an audio time reference (ATR) (0112). Furthermore, the ASM (0110) is configured to remember the length of audio recorded on the APRs (0121, 0129) such that if additional APRs (0121, 0129) are to be programmed the ATR (0112) may be used to coordinate time synchronized playback of the APRs (0121, 0129) based on the recording loop time of the audio recordings previously programmed on other APRs (0121, 0129).

Once audio has been transferred from the audio files (0111) to the APR (0121) and time synchronized by the ASM (0110), the ASM (0110) initiates playback of the recorded audio on the APR (0121) which may be individually transferred to a modular audio module (MAM) (0130) responsible for distributing the audio in a spatially diverse public forum. In some circumstances the APR (0121) may be retained within the MAM (0130) using an APR compartment (0131) and in other application contexts the APR (0121) may be permanently embedded within the MAM (0130) and audio programming accomplished using AUDIO IN (0132) and AUDIO OUT (0133) audio jack connections that are coordinated by an audio select switch (0134) responsible for distributing the audio signals within the MAM (0130). Several MAM devices may be serially daisy-chained by connecting the AUDIO OUT (0133) from one upstream MAM to the AUDIO OUT (0133) audio jack connection of a downstream MAM. This allows a single APR (0121) (and/or RF receiver) in one upstream MAM to coordinate audio distribution among a series of serial daisy-chain connected MAMs.

The ASS (0134) selects an audio source from either the APR (0121), AUDIO IN (0132), or an optional radio frequency receiver (0135) and couples this audio source to a modular audio amplifier (MAA) (0136) whose output feeds a speaker (0137) that distributes the audio to the public. Power for the MAM (0130) circuitry is provided by a modular battery pack (0138) that may be recharged using an external power connection. Control functions for the MAM may be provided by a microcontroller unit (MCU) (0139) that may incorporate a realtime clock (RTC) allowing time synchronization of playback in response to commands received from the optional radio frequency receiver (0135) or alternatively a timebase reference associated with the audio recording stored on the APR (0121). Each MAM (0130) is configured with a hermaphroditic plate connector (HPC) (0140) that allows the MAM (0130) to be mechanically coupled with other MAMs to form a cooperating mobile audio distribution system.

With this modular approach to audio distribution, the mechanical setup of speakers is simplified in that it is not necessary to have massively large bulky speakers in order to provide audio coverage for a spatially diverse venue such as a running race or large outdoor gathering spanning square miles of area. Instead, individual MAMs are programmed with audio that is synchronized by the ASM (0110) and simultaneously broadcast in either assemblies of MAMs (0130) that are interconnected via HPCs (0140) and/or spatially diverse MAMs (0130).

Incorporation of the radio frequency receiver (RFR) (0135) within the MAM (0130) allows control of several function within the MAM (0130), including control of the ASS (0134), selection of the audio recording stored on the APR (0121), and real-time audio input to the ASS (0134). Note that the APR (0121) may contain numerous recordings stored in individual audio files, each having a particular length and synchronization time provided by the ASM (0110). The RFR (0135) may be configured to read the length of the audio file from the APR (0121) as well as the synchronization time of the audio file as recorded by the ASM (0110). With this information it is then possible to determine a new start time for the audio loop of any individual recording stored on the APR (0121) so that when distributed publically the audio is synchronized with other cooperating MAMs (0130). This allows individual MAMs (0130) to be configured with stock audio messaging that is synchronously triggered by the RFR (0135) such that it is in synch with other audio distributed to the public. This allows, for example, a small area of audio distribution to be given a particular audio message which is then followed by synchronized audio that is in synch with audio provided to the surrounding area.

Audio Distribution Method Overview (0200)

Figure 2:
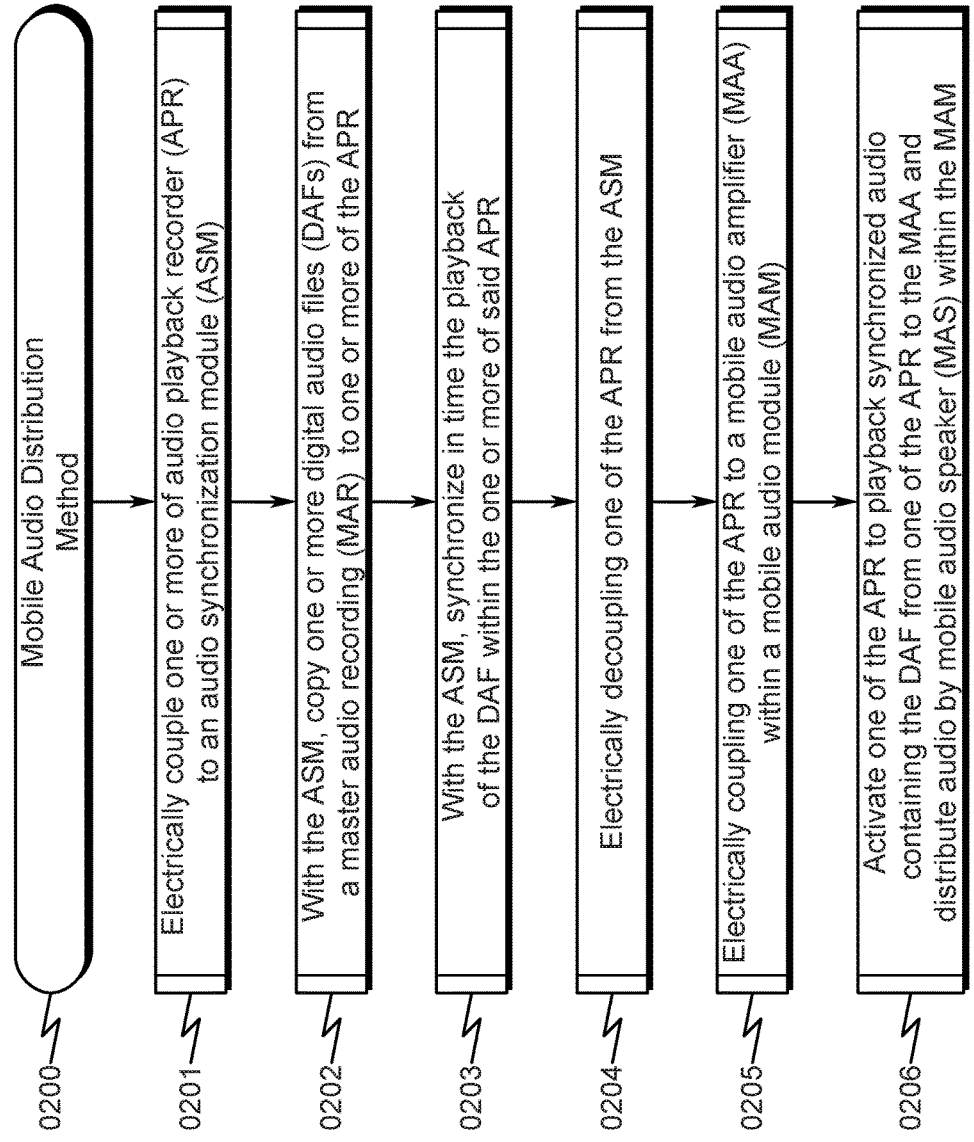
FIG. 2 illustrates a flowchart of a preferred exemplary mobile audio distribution method embodiment of the present invention.

The audio distribution system context as depicted in FIG. 1 (0100) is typically associated with an overall audio distribution methodology as depicted in FIG. 2 (0200) and involves the following steps:
(1) Electrically couple one or more of audio playback recorder (APR) to an audio synchronization module (ASM) (0201);
(2) With the ASM, copy one or more digital audio files (DAFs) from a master audio recording (MAR) to one or more of the APR (0202);
(3) With the ASM, synchronize in time the playback of the DAF within the one or more of said APR (0203);
(4) Electrically decoupling one of the APR from the ASM (0204);
(5) Electrically coupling one of the APR to a mobile audio amplifier (MAA) within a mobile audio module (MAM) (0205); and
(6) Activate one of the APR to playback synchronized audio containing the DAF from one of the APR to the MAA and distribute audio by mobile audio speaker (MAS) within the MAM (0206).

One skilled in the art will recognize that these method steps may be augmented or rearranged without limiting the teachings of the present invention. This general method overview may be augmented by the various elements described herein to produce a wide variety of invention embodiments consistent with this overall design description.

Mobile audio Synchronization Module (ASM) Overview

The mobile audio synchronization module (ASM) is responsible for transferring digital audio files (DAF) to one or more audio playback recorders (APRs) and synchronizing the playback of these DAFs in time, thus permitting the APRs to be individually attached to mobile audio modules (MAMs) that affect audio playback in a time synchronized fashion. The ASM generally comprises the following components:

Housing enclosure to support the various system elements;
TRRS (tip-ring-ring-sleeve) connector jacks (4-pole audio jacks)—one for each APR to be programmed;
Digital synchronization controller (DSC) and associated system electrical components mounted on a printed circuit board (PCB);
Connection wiring (generally of equal length) between the PCB and the TRRS connectors;
MOSFETs used to control operation of signals on the TRRS connectors;
Multiplexers;
Switching transistors;
Battery or power supply; and
Comparator.

Audio Synchronization Method Overview (0300)-(0400)

Figure 3:
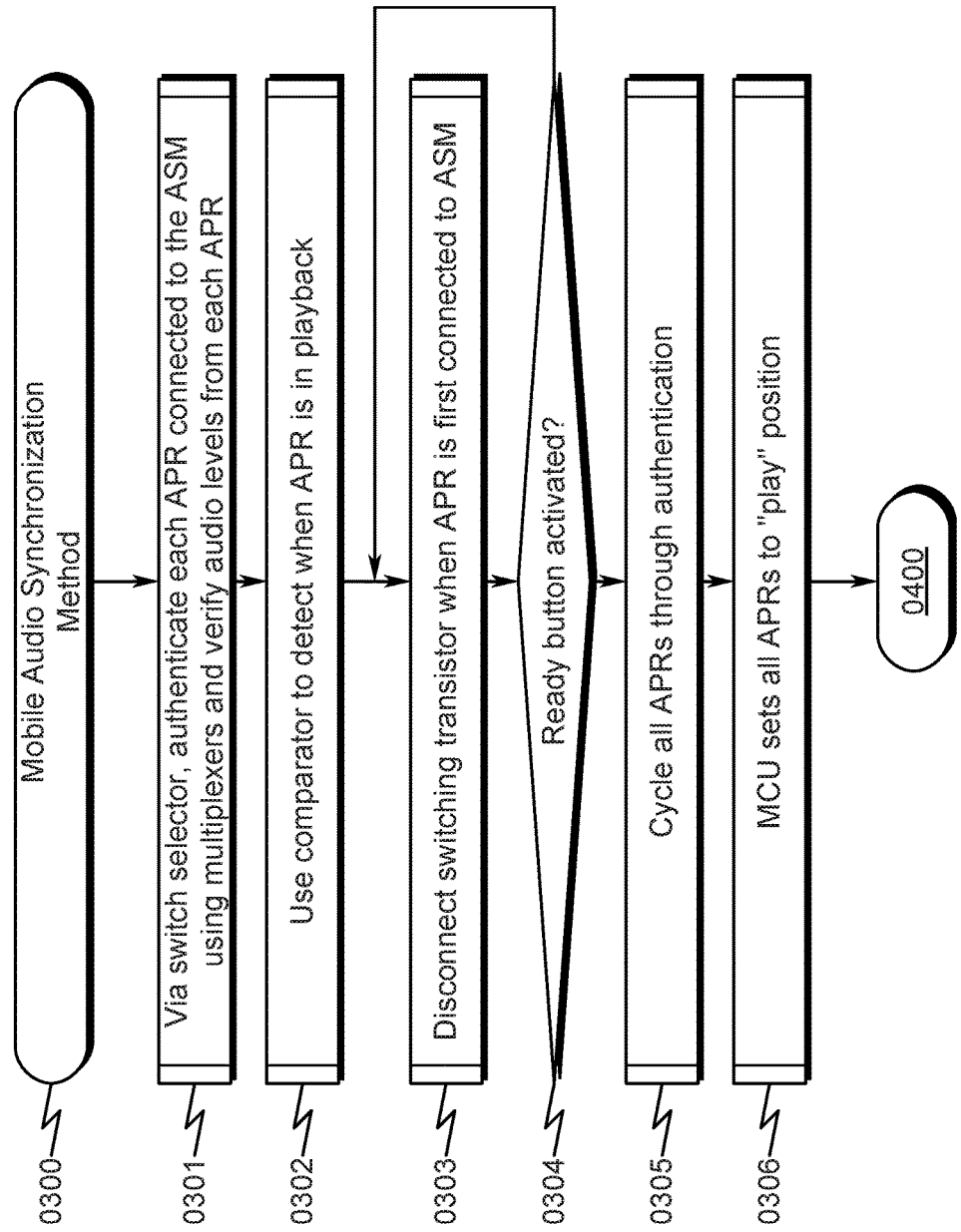
FIG. 3 illustrates a flowchart of a preferred exemplary mobile audio synchronization method embodiment of the present invention (page 1 of 2)
Figure 4:
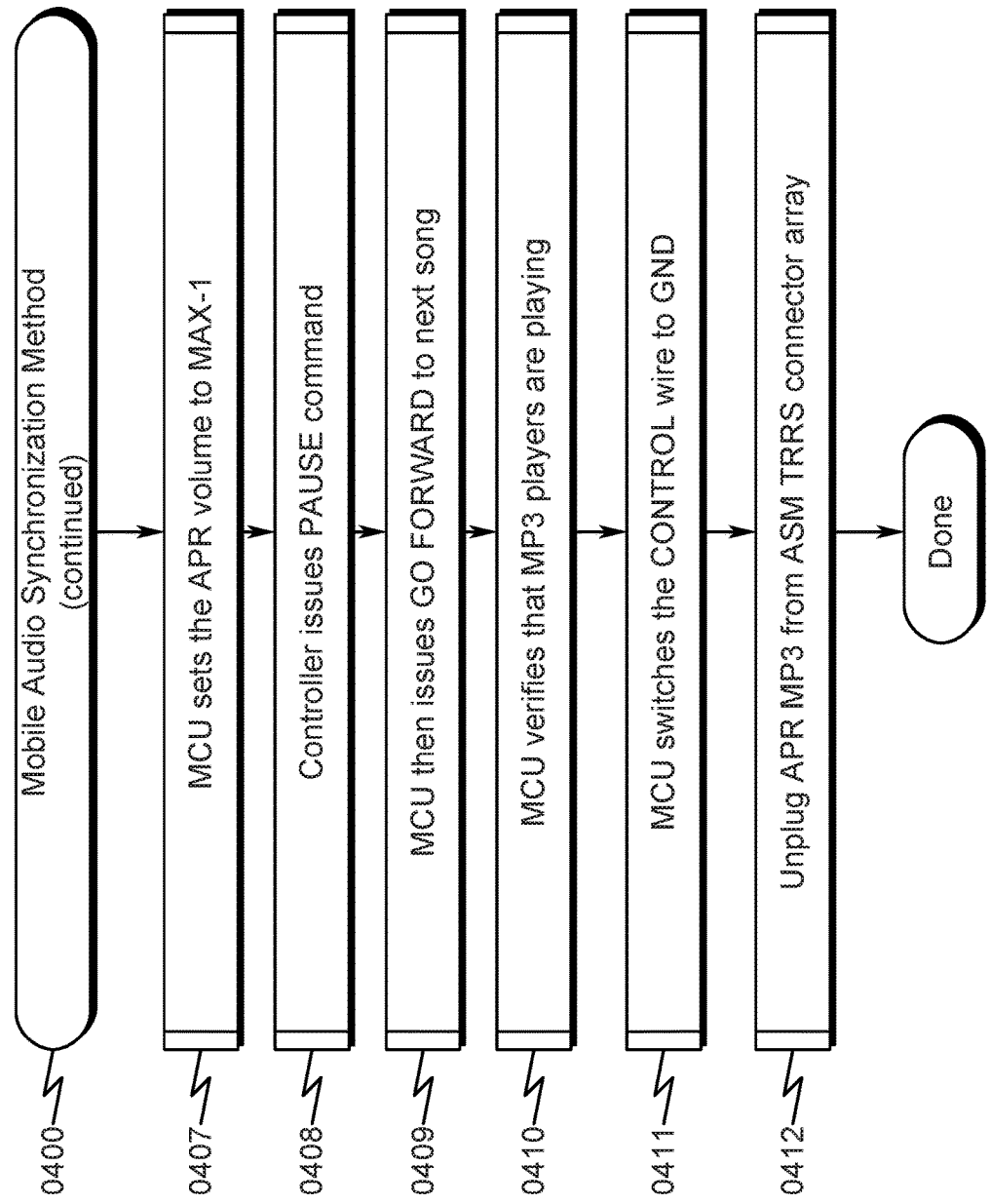
FIG. 4 illustrates a flowchart of a preferred exemplary mobile audio synchronization method embodiment of the present invention (page 2 of 2)

The audio distribution system context as depicted in FIG. 1 (0100) is typically associated with an overall audio synchronization methodology as depicted in FIG. 3 (0300) and involves the following steps:
(1) First step is the authentication of the APRs. Original APPLE® authenticator chip is used for authentication via switching through all APRs using multiplexers and verifying audio levels with MCU. Via switch selector, authenticate each APR connected to the ASM using multiplexers and verify audio levels from each APR (0301);
(2) Comparator is used to detect when MP3 players are playing. During insertion of the MP3 players, switching transistor will be in disconnected state. Use comparator to detect when APR is in playback (0302);
(3) Disconnect switching transistor when APR is first connected to ASM (0303);
(4) Once ready, a start button is pressed. Determine if ready button activated, and if not proceed to step (3) (0304);
(5) At this time MCU will cycle all of the MP3 players through authentication. Cycle all APRs through authentication (0305);
(6) Set all APRs to "play" position (0306);
(7) Set the volume to MAX-1 (0407);
(8) A single pulse is used to PAUSE and to PLAY. Controller issues PAUSE command (0408);
(9) A dual pulse with 300 ms period is used to GO FORWARD to next song. Controller then issues GO FORWARD to next song (this will reset all MP3 players to beginning of the track) followed with the PLAY command (0409);
(10) Controller verifies that MP3 players are playing (0410);

(11) Controller will switch the CONTROL wire to GND. This will allow all the MP3 players to be unplugged without disruption of playing audio (0411); and

(12) Unplug APR MP3 players from ASM (0412).

One skilled in the art will recognize that these method steps may be augmented or rearranged without limiting the teachings of the present invention. This general method overview may be augmented by the various elements described herein to produce a wide variety of invention embodiments consistent with this overall design description.

MAS Overview (0500)

Figure 5:
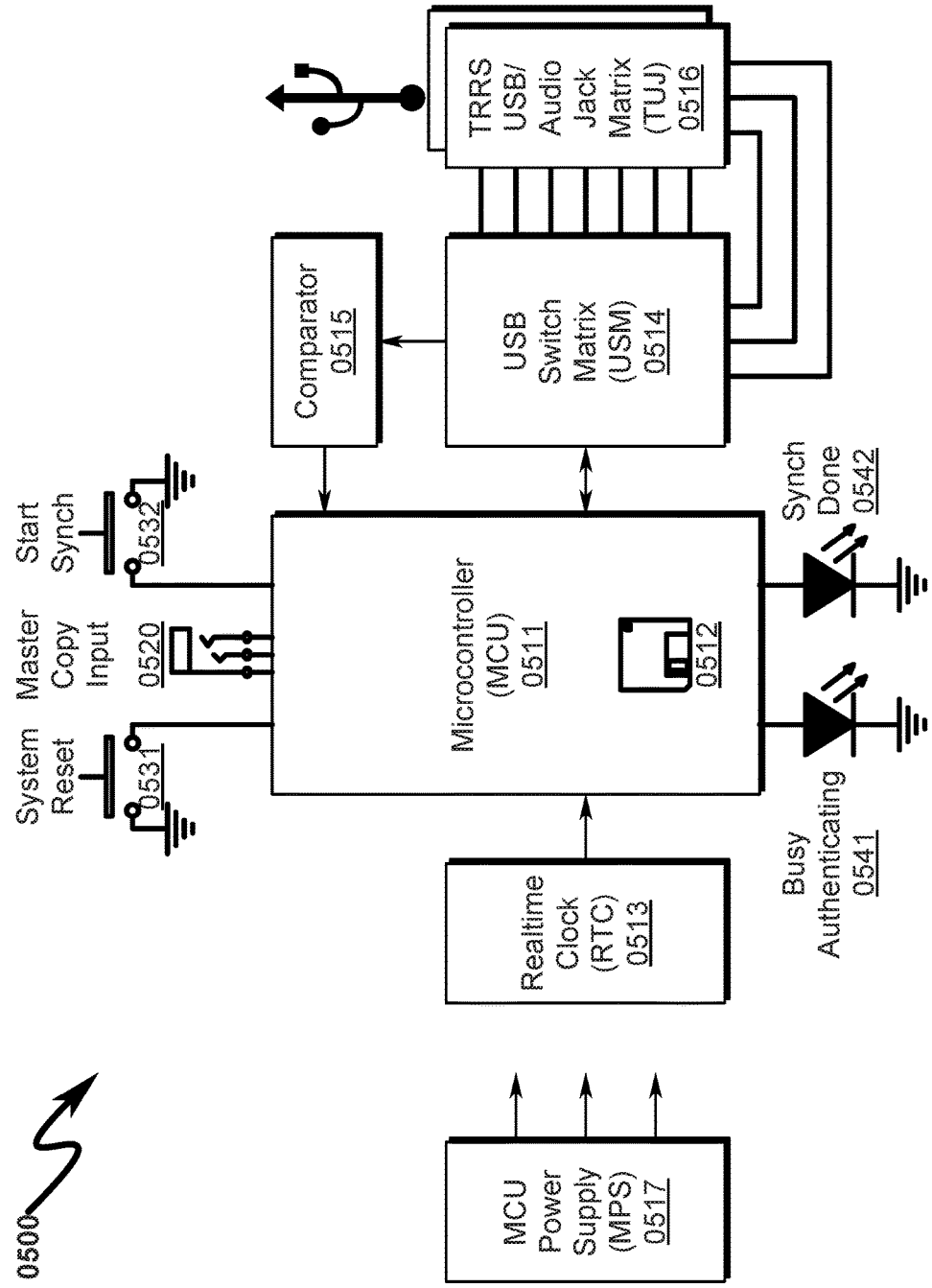
FIG. 5 illustrates a system block diagram of a preferred exemplary audio synchronization module (ASM)

An overview of the mobile audio synchronization (MAS) module is depicted generally in FIG. 5 (0500). The MAS operation is coordinated by a microcontroller unit (MCU) (0511) executing machine instructions retrieved from a computer readable medium (0512) and may incorporate use of a realtime clock (RTC) (0513) to synchronize playback of audio files based on an absolute time reference and/or log a time reference stamp on audio files stored on one or more audio playback recorders (APRs). The MCU (0511) interacts with a USB/audio switch matrix (USM) (0514) and comparator (0515) to control operation of digital signaling to an array of TRRS (tip-ring-ring-shield) USB (universal serial bus) jacks (TUJ) (0516). These jacks are typically 2.5 mm or 3.5 mm 4-conductor digital audio connectors used in conjunction with commercially available APRs such as the APPLE® brand of IPOD® brand digital audio recorders. This TUJ array (0516) permits a plurality of APRs to be simultaneously connected to the APS to allow simultaneously download of digital audio data from a master copy input (MCI) (0520). Power for the system is provided by a MCU power supply (MPS) (0517) which may include battery backup in some application contexts.

The MCU (0511) is controlled by a master system reset (MSR) (0531) pushbutton that resets the system to a known state and a start synchronization pushbutton (SSP) (0532) that initiates copying of digital/analog audio data to the TUJ (0516) USB connection array and subsequent time synchronization of the playback of these audio files. Visual indicia providing for indication of BUSY AUTHENTICATING (0541) and SYNCHRONIZATION COMPLETE (0542) are provided to give operator feedback as to the status of authenticating the individual APRs and completion of the copying/synchronization process respectively.

Exemplary System Block Diagram (0600)

Figure 6:
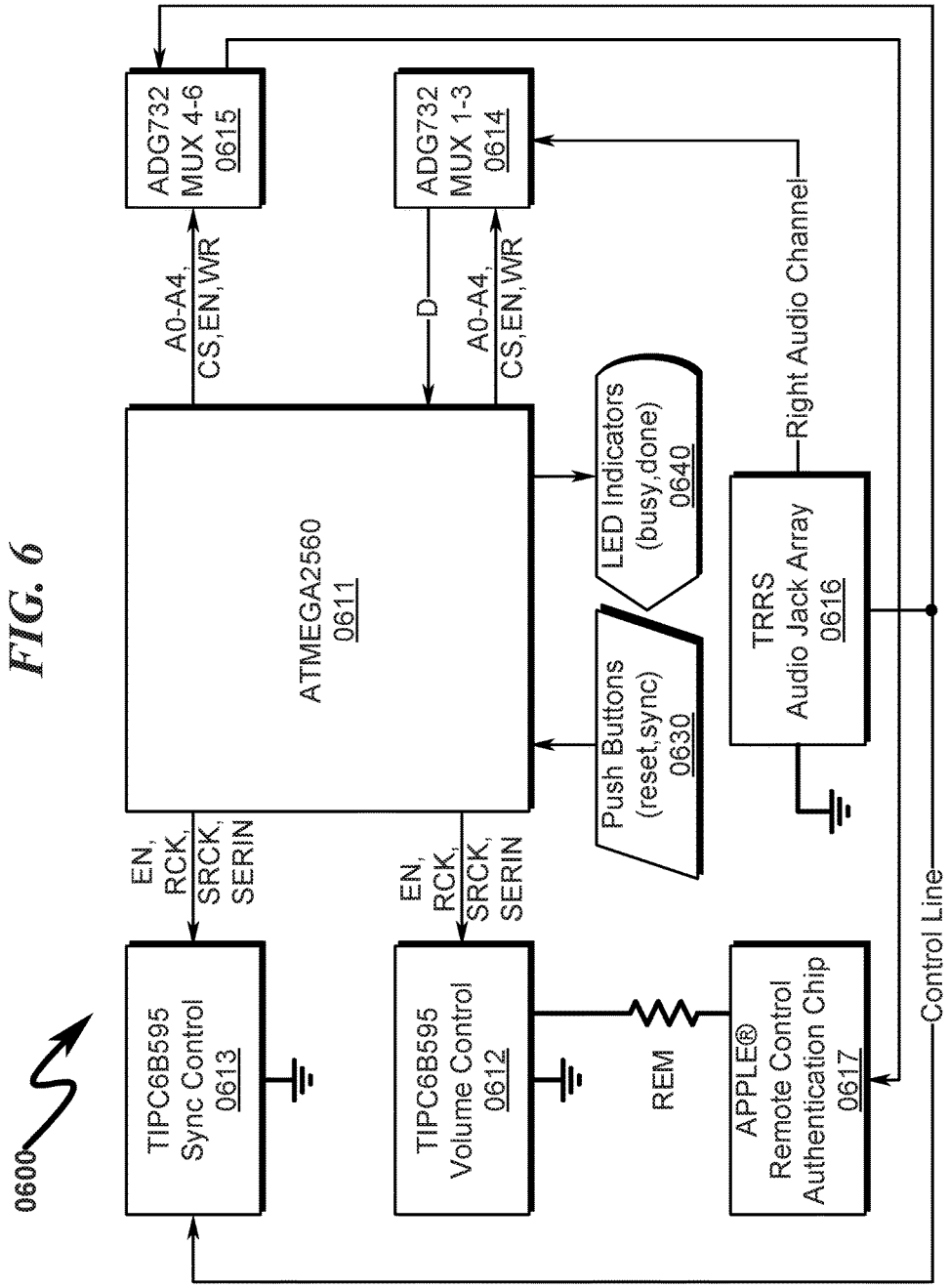
FIG. 6 illustrates an exemplary system block diagram of a preferred exemplary audio synchronization module (ASM) implemented using an ATMEGA2560 MCU, TPIC6B595 shift registers, and ADG732 multiplexers.

FIG. 6 (0600) provides a block diagram detailing an exemplary ASM system construction using a typical ATMEGA2560 MCU controller (0611), TPIC6B595 open drain shift registers (0612, 0613), and ADG732 multiplexers (0614, 0615) to synchronize and program an array of TRRS audio jacks (0616) that are electrically coupled to corresponding ASMs. A standard APPLE® remote control authentication chip (0617) is used as the hardware interface to the audio channel controls of the APR. The following tables discuss specific electrical connections used in this embodiment and are provided to allow one of ordinary skill in the art information necessary to implement this exemplary embodiment.

Arduino Connections

|  | name | pin | chip |
|---|---|---|---|
| PWM |  |  |  |
| 2 | EN3 | 9 | TPIC6B595 Sync |
| 3 | EN3 | 9 | TPIC6B595 Volume |
| 4 | Busy Ind |  | LED |
| 5 | Done Ind |  | LED |
| 6 | Sync |  | Button |
| 7 | Reset |  | Button |
| 8 | D | 43 | #4 ADG732 |
| 9 | D | 43 | #5 ADG732 |
| 10 | D | 43 | #6 ADG732 |
| 11 | SER IN | 3 | TPIC6B595 Volume |
| 12 | RCK | 12 | TPIC6B595 Volume |
| 13 |  |  |  |
| Coms |  |  |  |
| 1 | A0 | 15 | #1 ADG732 |
| 0 | A1 | 16 | #1 ADG733 |
| 14 | A2 | 17 | #1 ADG734 |
| 15 | A3 | 18 | #1 ADG735 |
| 16 | A4 | 19 | #1 ADG736 |
| 17 | A0 | 15 | #2 ADG732 |
| 18 | A1 | 16 | #2 ADG733 |
| 19 | A2 | 17 | #2 ADG734 |
| 20 | A3 | 18 | #2 ADG735 |
| 21 | A4 | 19 | #2 ADG736 |
| Digital |  |  |  |
| 22 | A0 | 15 | #5 ADG732 |
| 24 | A1 | 16 | #5 ADG732 |
| 26 | A2 | 17 | #5 ADG732 |
| 28 | A3 | 18 | #5 ADG732 |
| 30 | A4 | 19 | #5 ADG732 |
| 32 | WR | 21 | #1, #2, #3 ADG732 |
| 34 | EN | 22 | #1, #2, #3 ADG732 |
| 36 | A0 | 15 | #4 ADG732 |
| 38 | A1 | 16 | #4 ADG732 |
| 40 | A2 | 17 | #4 ADG732 |
| 42 | A3 | 18 | #4 ADG732 |
| 44 | A4 | 19 | #4 ADG732 |
| 46 | CS | 20 | ADG732 All |
| 48 | WR | 21 | #4, #5, #6 ADG732 |
| 50 | EN | 22 | #4, #5, #6 ADG732 |
| 52 | SRCK | 13 | TPIC6B595 All |
| 31 | A0 | 15 | #6 ADG732 |
| 33 | A1 | 16 | #6 ADG733 |
| 35 | A2 | 17 | #6 ADG734 |
| 37 | A3 | 18 | #6 ADG735 |
| 39 | A4 | 19 | #6 ADG736 |
| 41 | A0 | 15 | #3 ADG732 |
| 43 | A1 | 16 | #3 ADG733 |
| 45 | A2 | 17 | #3 ADG734 |
| 47 | A3 | 18 | #3 ADG735 |
| 49 | A4 | 19 | #3 ADG736 |
| 51 | SER IN | 3 | TPIC6B595 Sync |
| 53 | RCK | 12 | TPIC6B595 Sync |

Multiplexor Pinouts

| #1, #2, and #3 ADG732 pinout | | |
|---|---|---|
| Pin # | name | connects to |
| 1-12, 45-48 | S1-S16 | right ch of the 4 prong aux jack |
| 25-40 | s17-s32 | right ch of the 4 prong aux jack |
| 15 | A0 | controller |
| 16 | A1 | controller |
| 17 | A2 | controller |
| 18 | A3 | controller |
| 19 | A4 | controller |
| 20 | CS | controller |
| 21 | WR | controller |
| 22 | EN | controller |
| 43 | D | controller comparator |

Volume Control Shift Register

| | Bank of TPIC6B595 for volume control | |
|---|---|---|
| Pin # | name | connection |
| 4 | Drain | Resistor that is connected to REM of Apple control chip |
| 5 | Drain | Resistor that is connected to REM of Apple control chip |
| 6 | Drain | Resistor that is connected to REM of Apple control chip |
| 7 | Drain | Resistor that is connected to REM of Apple control chip |
| 14 | Drain | Resistor that is connected to REM of Apple control chip |
| 15 | Drain | Resistor that is connected to REM of Apple control chip |
| 16 | Drain | Resistor that is connected to REM of Apple control chip |
| 17 | Drain | Resistor that is connected to REM of Apple control chip |
| 18 | SEROUT | next register |
| 9 | EN | controller |
| 12 | RCK | controller |
| 8 | SRCLR | VCC |
| 13 | SRCK | controller |
| 3 | SER IN | controller or previous register |

Sync Control Shift Register

| | Bank of TPIC6B595 for sync | |
|---|---|---|
| Pin # | name | connection |
| 4 | Drain | control line of the 4 prong aux jack |
| 5 | Drain | control line of the 4 prong aux jack |
| 6 | Drain | control line of the 4 prong aux jack |
| 7 | Drain | control line of the 4 prong aux jack |
| 14 | Drain | control line of the 4 prong aux jack |
| 15 | Drain | control line of the 4 prong aux jack |
| 16 | Drain | control line of the 4 prong aux jack |
| 17 | Drain | control line of the 4 prong aux jack |
| 18 | SEROUT | next register |
| 9 | EN | controller |
| 12 | RCK | controller |
| 8 | SRCLR | VCC |
| 13 | SRCK | controller |
| 3 | SER IN | controller or previous register |

TRRS Jack Connections

| 4 prong Aux jacks | |
|---|---|
| Left | NC |
| Right | #1, #2, #3 ADG732 |
| Ground | GND |
| Control | #4, #5, #6 ADG732; TPIC6B595 Sync Bank |

Exemplary Shift Register Serial Construction (0700)

Figure 7:
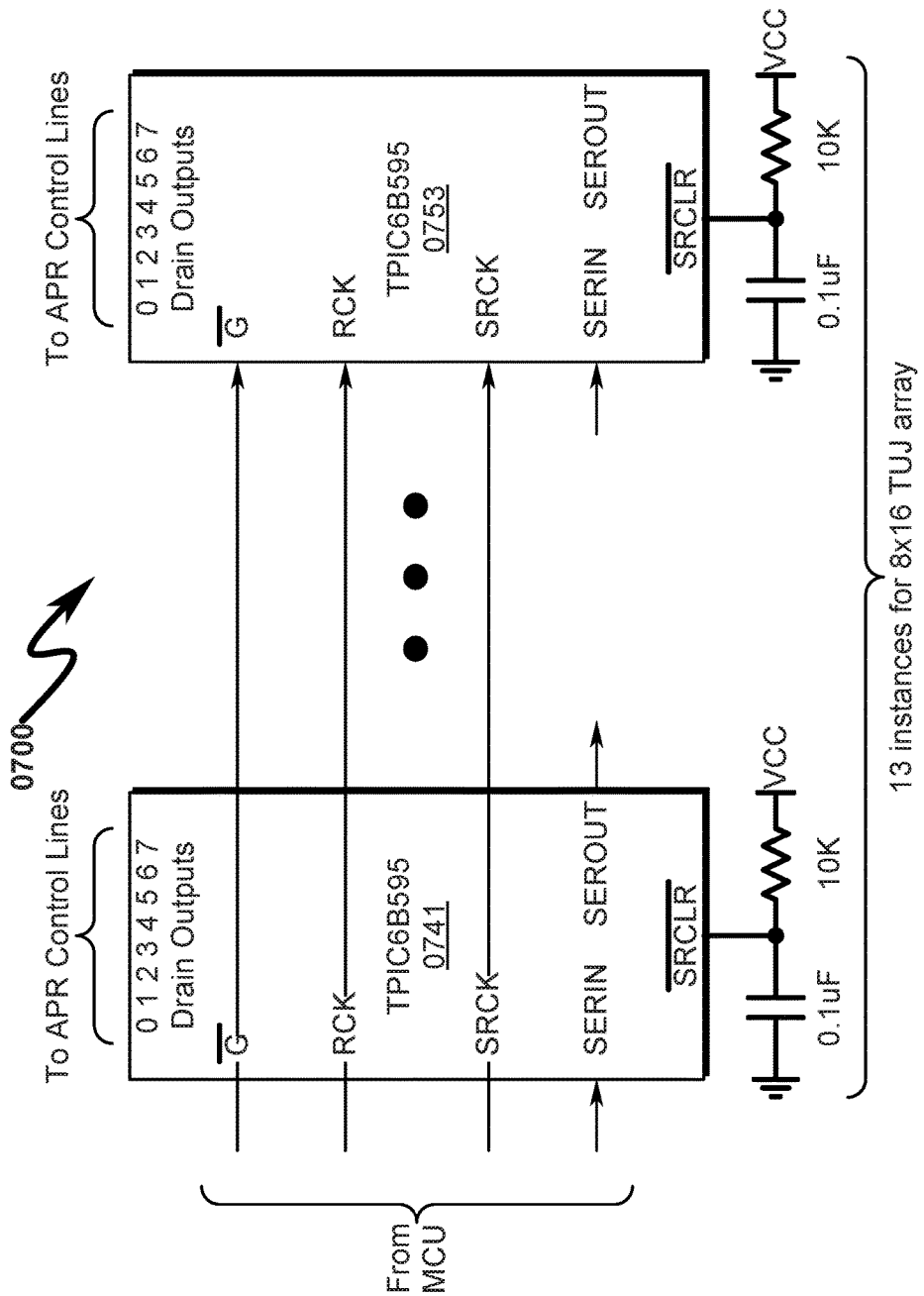
FIG. 7 illustrates a typical connection diagram of a serial shift register with open drain outputs useful in implementing selection of a particular APR within an APR matrix within the ASM.

FIG. 7 (0700) provides detail on the use of a series connection of open-drain shift registers (Texas Instruments model TPIC6B595) (0741, 0753) to implement signal control over individual APR elements within an APR matrix controlled by the ASM.

Exemplary Shift Register/Multiplexer Construction (0800)

Figure 8:
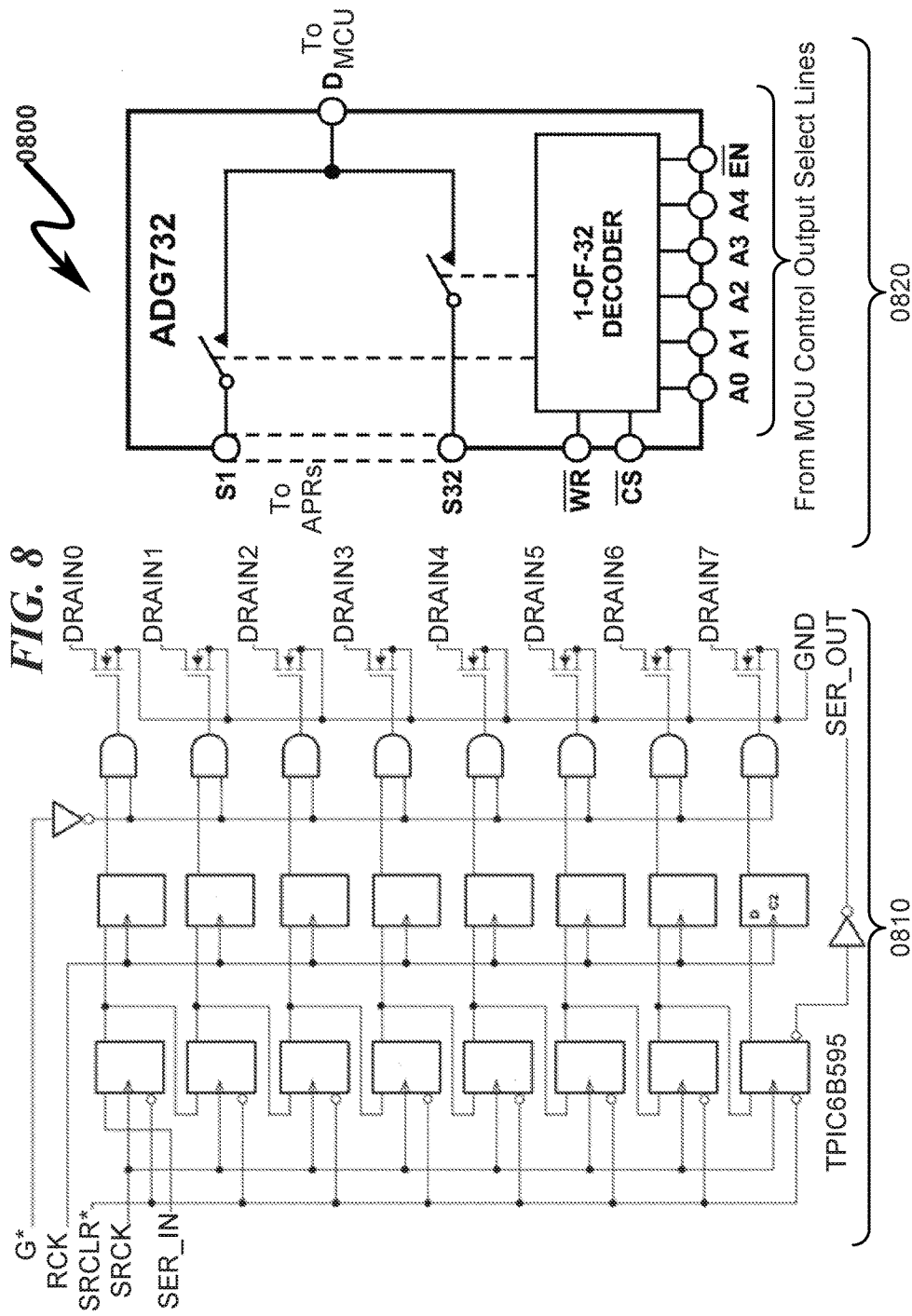
FIG. 8 illustrates internal construction of a typical open drain output shift register (Texas Instruments model TPIC6B595) used in generating APR communication within the APR matrix in the ASM and a typical multiplexer configuration (Analog Devices model ADG732) useful in implementing individual APR selection within an APR matrix within the ASM.

FIG. 8 (0800) provides exemplary detail on the use of an open-drain shift register (Texas Instruments model TPIC6B595) (0810) to implement signal control over individual APR elements within an APR matrix controlled by the ASM and exemplary detail on the use of multiplexer (Analog Devices model ADG732) (0820) to implement device selection of individual APR elements within an APR matrix controlled by the ASM.

Mobile Audio Module (MAM) Detail (0900)-(3000)

Figure 9:
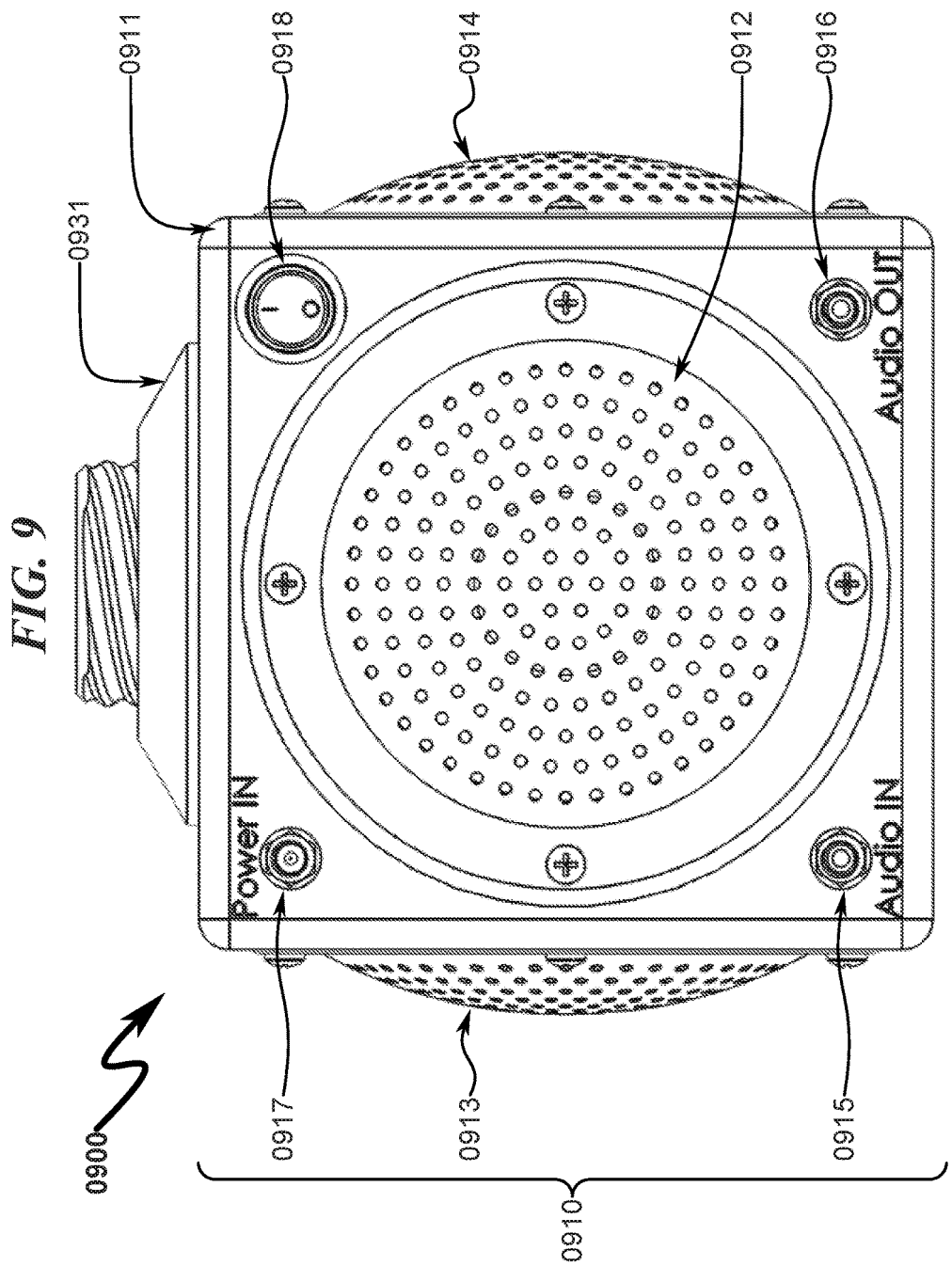
FIG. 9 illustrates a front view of a preferred exemplary system embodiment depicting a modular audio module (MAM)
Figure 10:
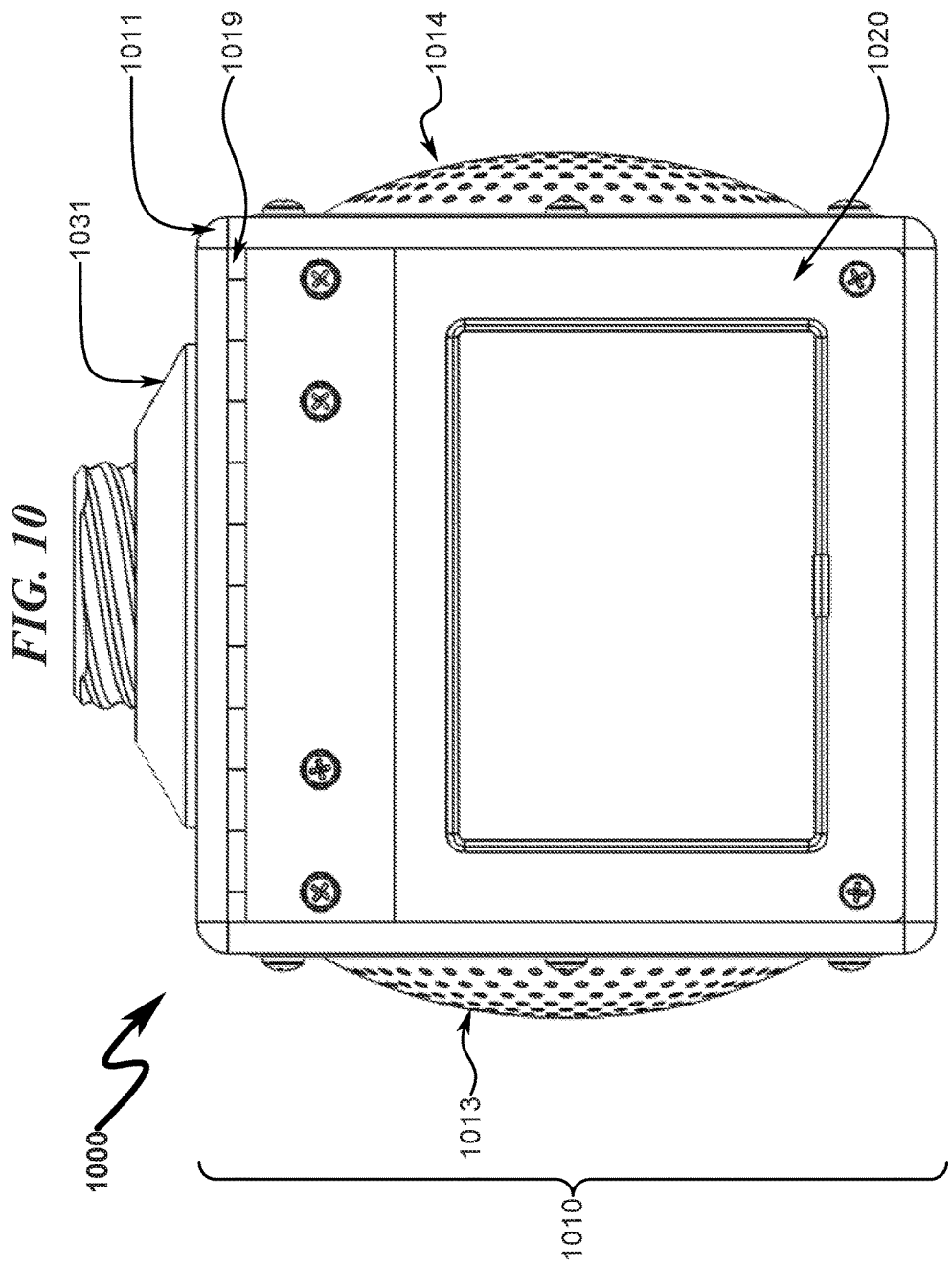
FIG. 10 illustrates a back view of a preferred exemplary system embodiment depicting a modular audio module (MAM)
Figure 11:
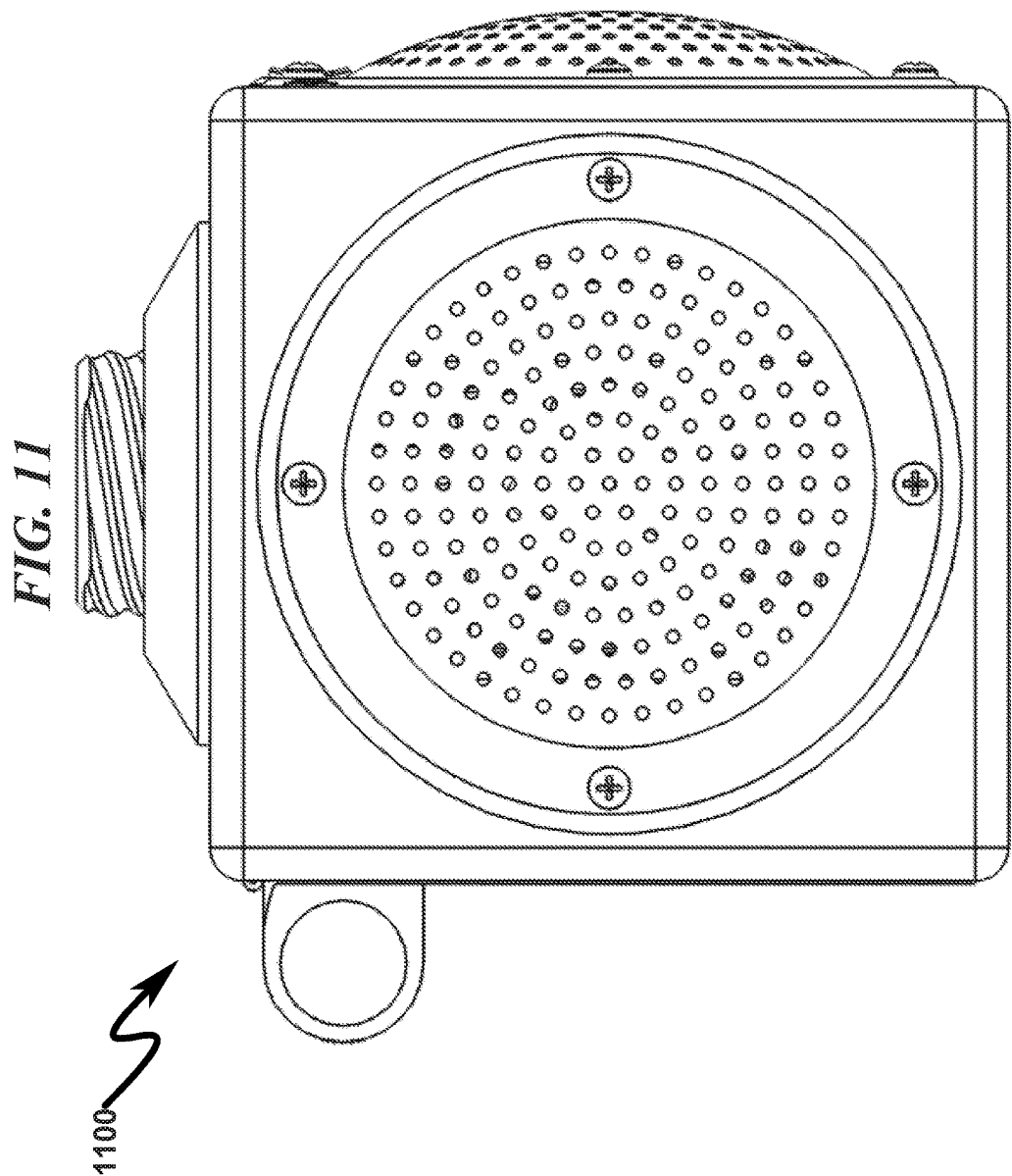
FIG. 11 illustrates a left side view of a preferred exemplary system embodiment depicting a modular audio module (MAM)
Figure 12:
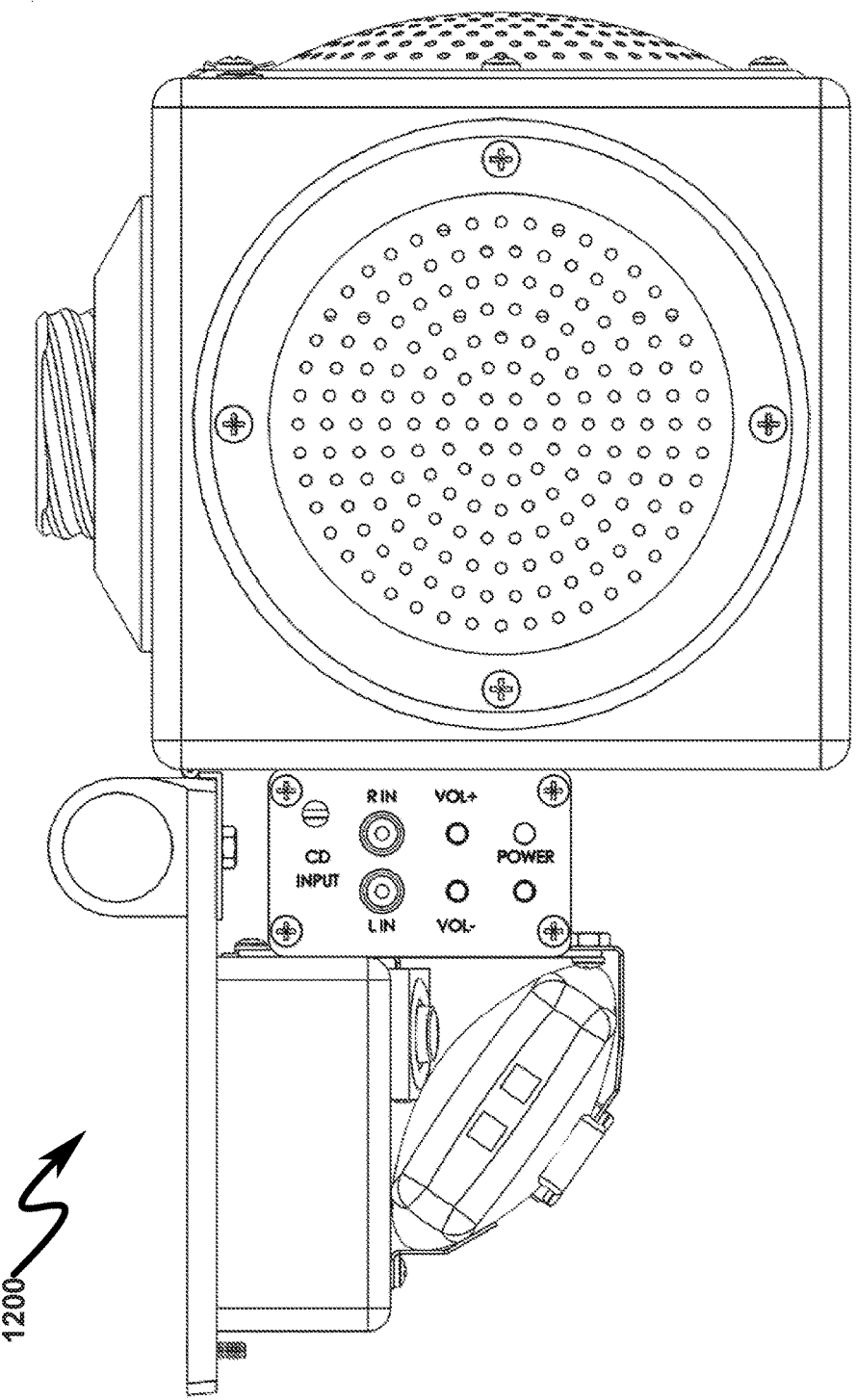
FIG. 12 illustrates a left side view of a preferred exemplary system embodiment depicting a modular audio module (MAM) with rear opening lid (ROL) extended.
Figure 13:
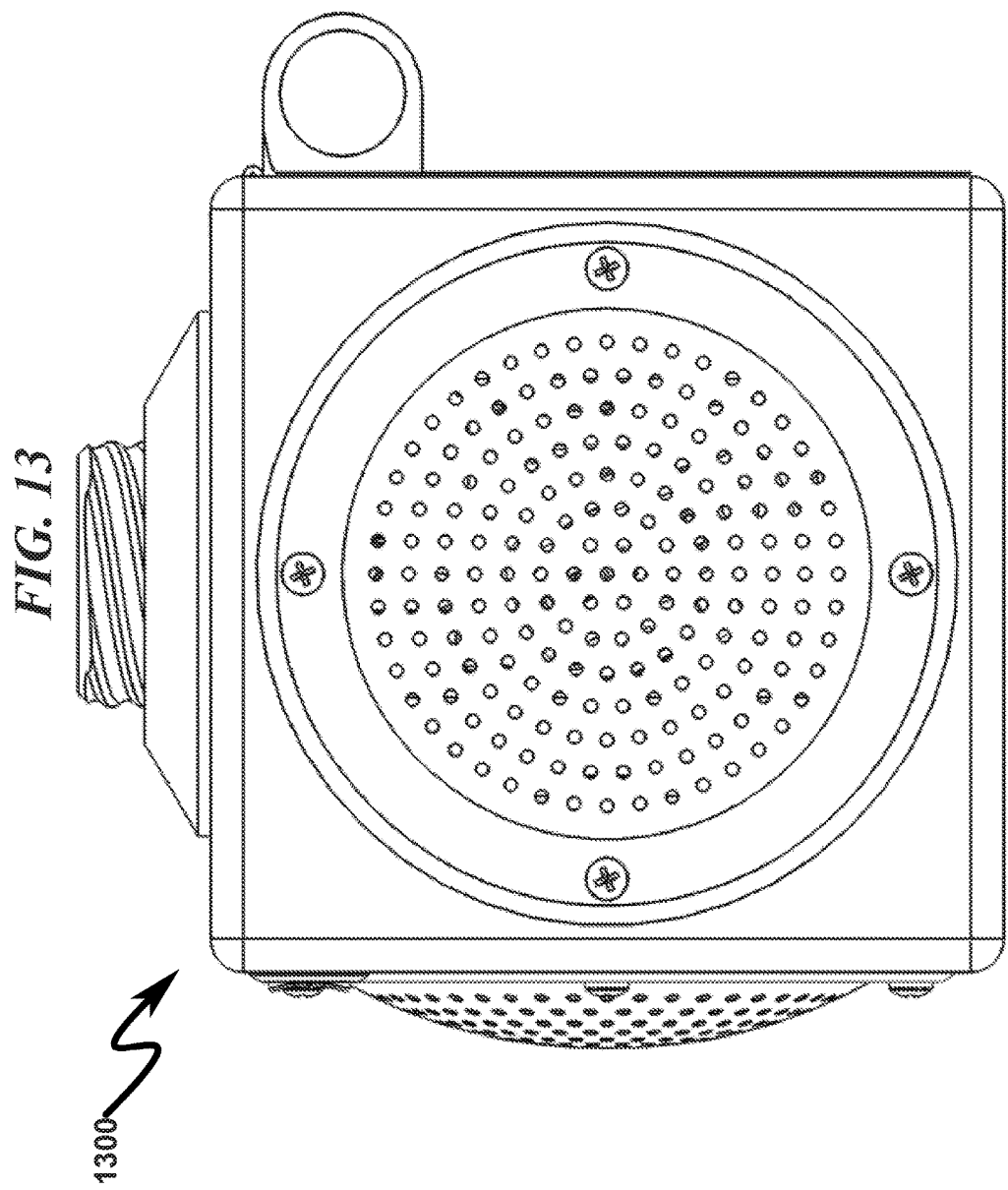
FIG. 13 illustrates a right side view of a preferred exemplary system embodiment depicting a modular audio module (MAM)
Figure 14:
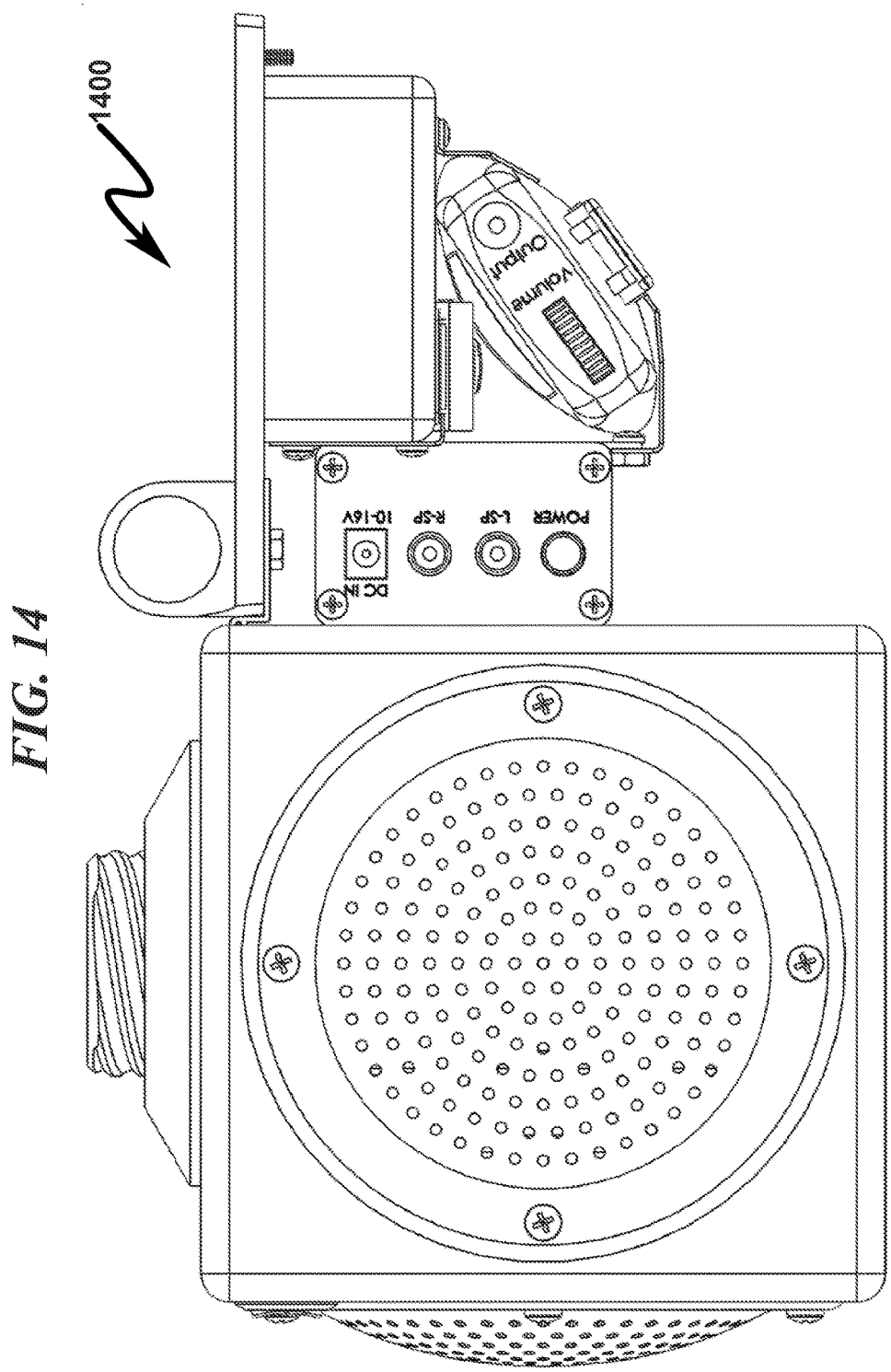
FIG. 14 illustrates a right side view of a preferred exemplary system embodiment depicting a modular audio module (MAM) with rear opening lid (ROL) extended.
Figure 15:
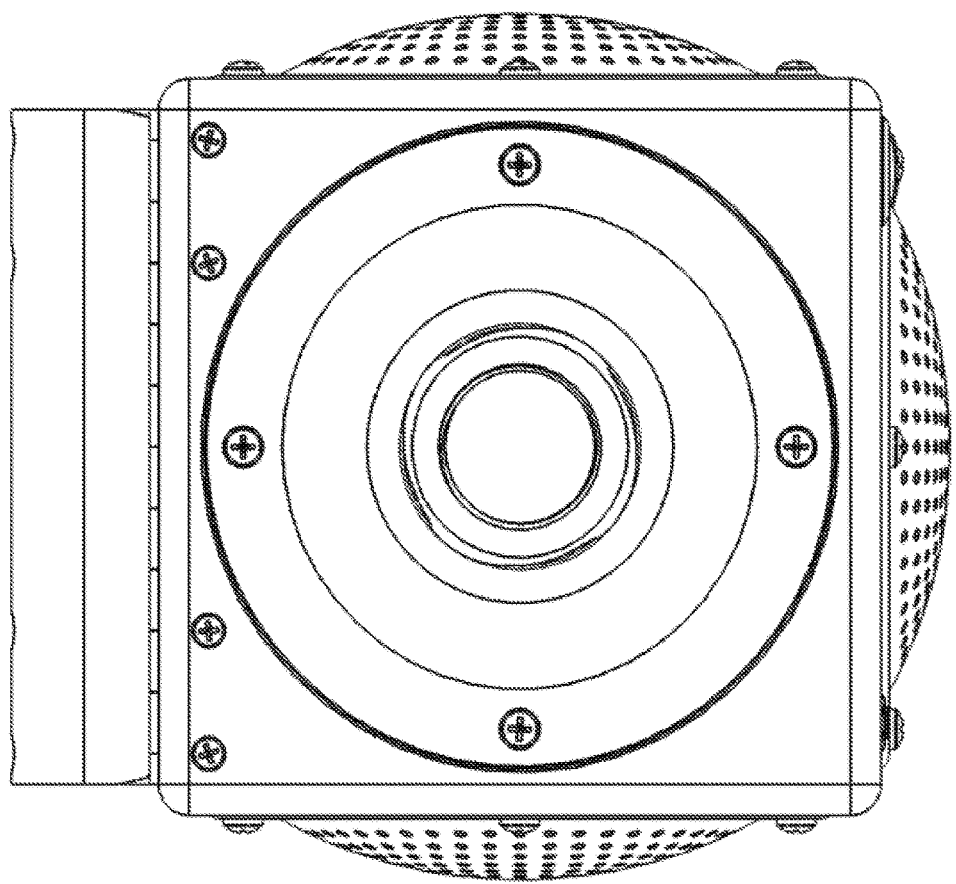
FIG. 15 illustrates a top view of a preferred exemplary system embodiment depicting a modular audio module (MAM)
Figure 16:
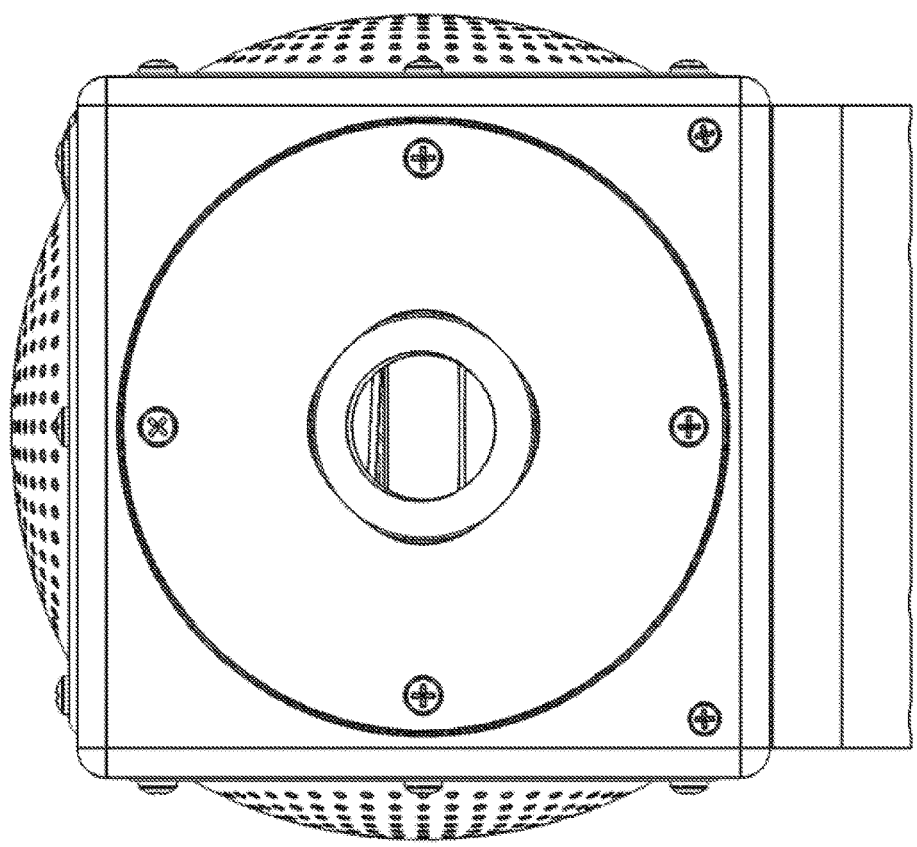
FIG. 16 illustrates a bottom view of a preferred exemplary system embodiment depicting a modular audio module (MAM)
Figure 17:
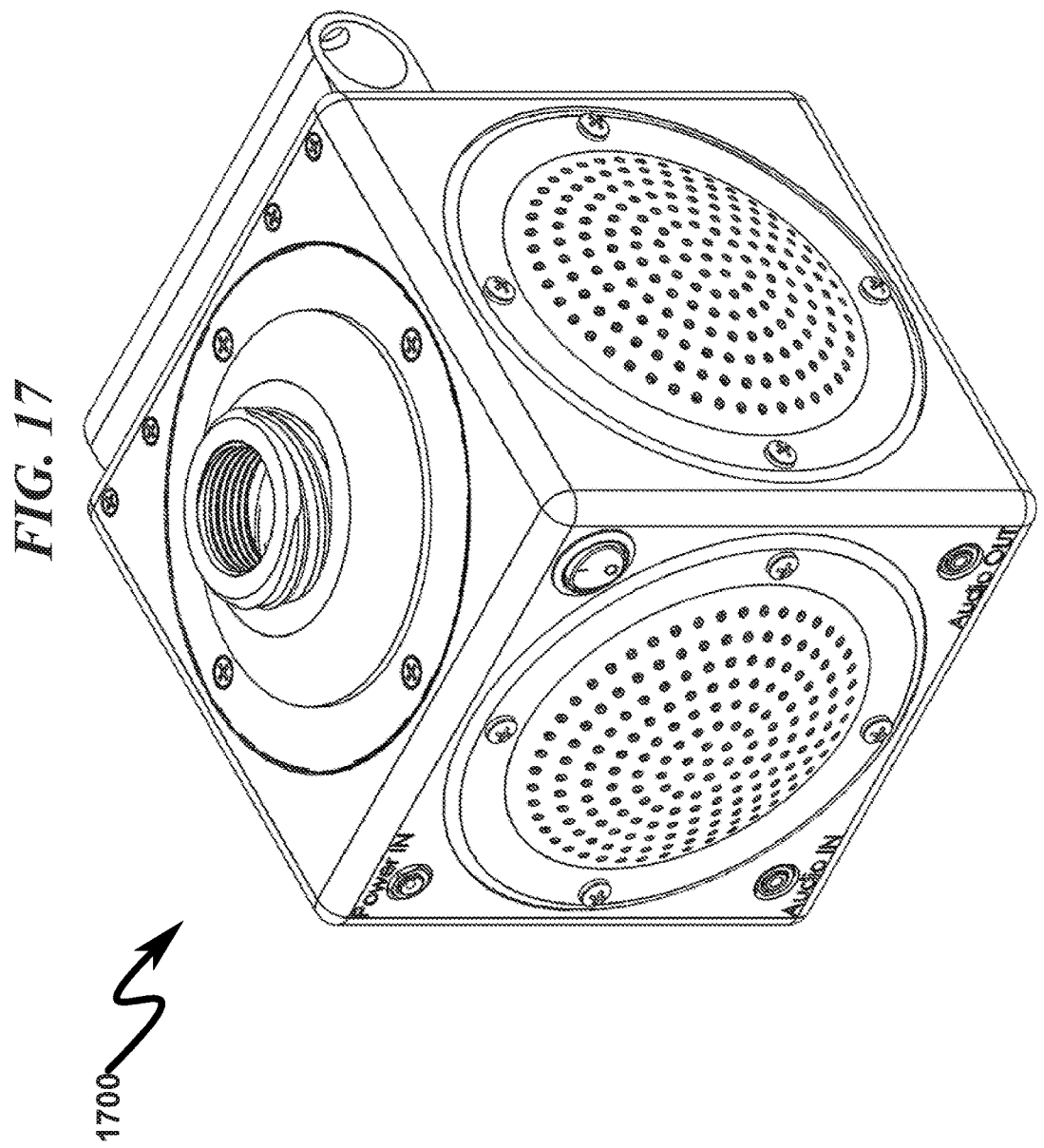
FIG. 17 illustrates a top right front perspective view of a preferred exemplary system embodiment depicting a modular audio module (MAM)
Figure 18:
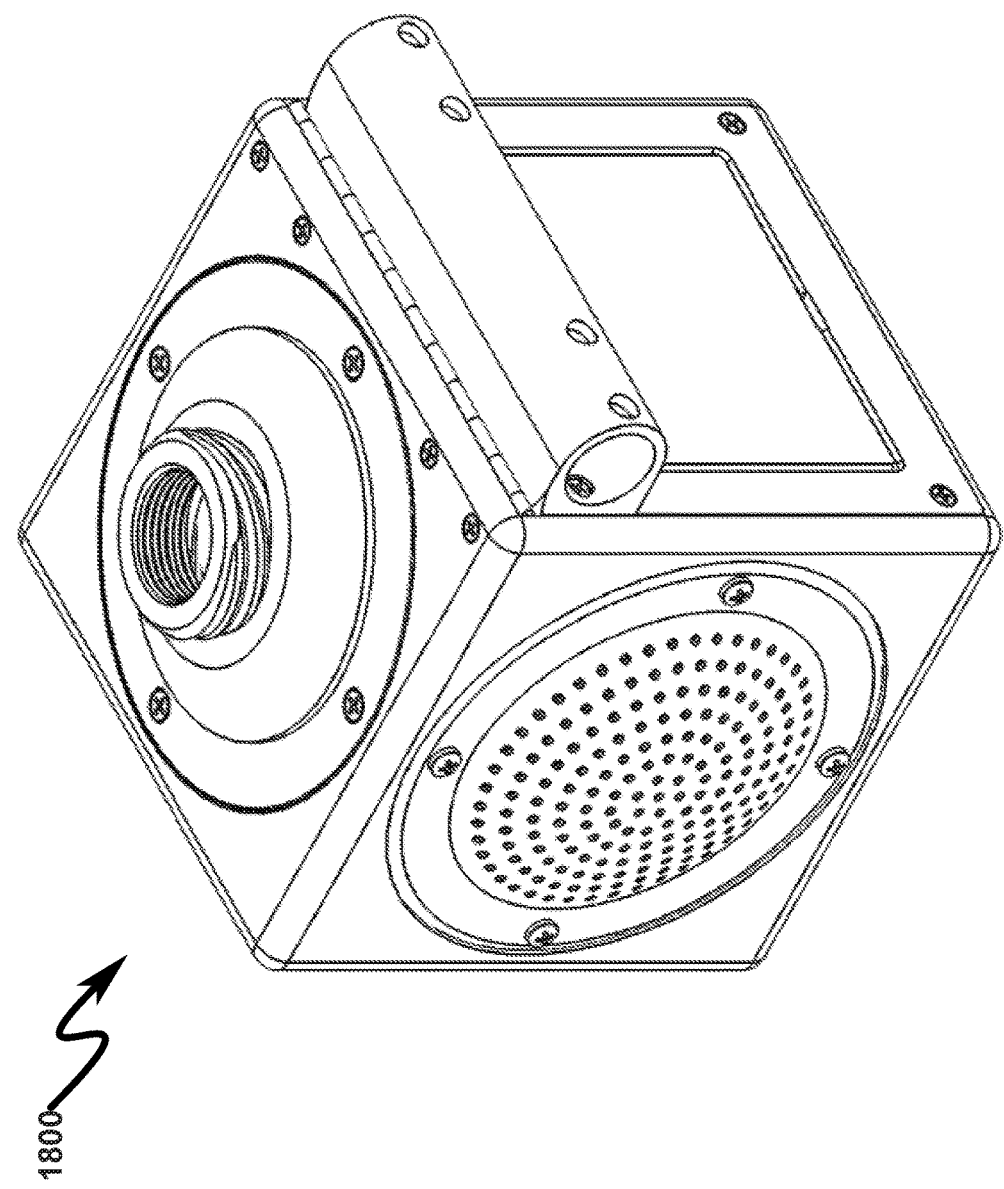
FIG. 18 illustrates a top right rear perspective view of a preferred exemplary system embodiment depicting a modular audio module (MAM)
Figure 19:
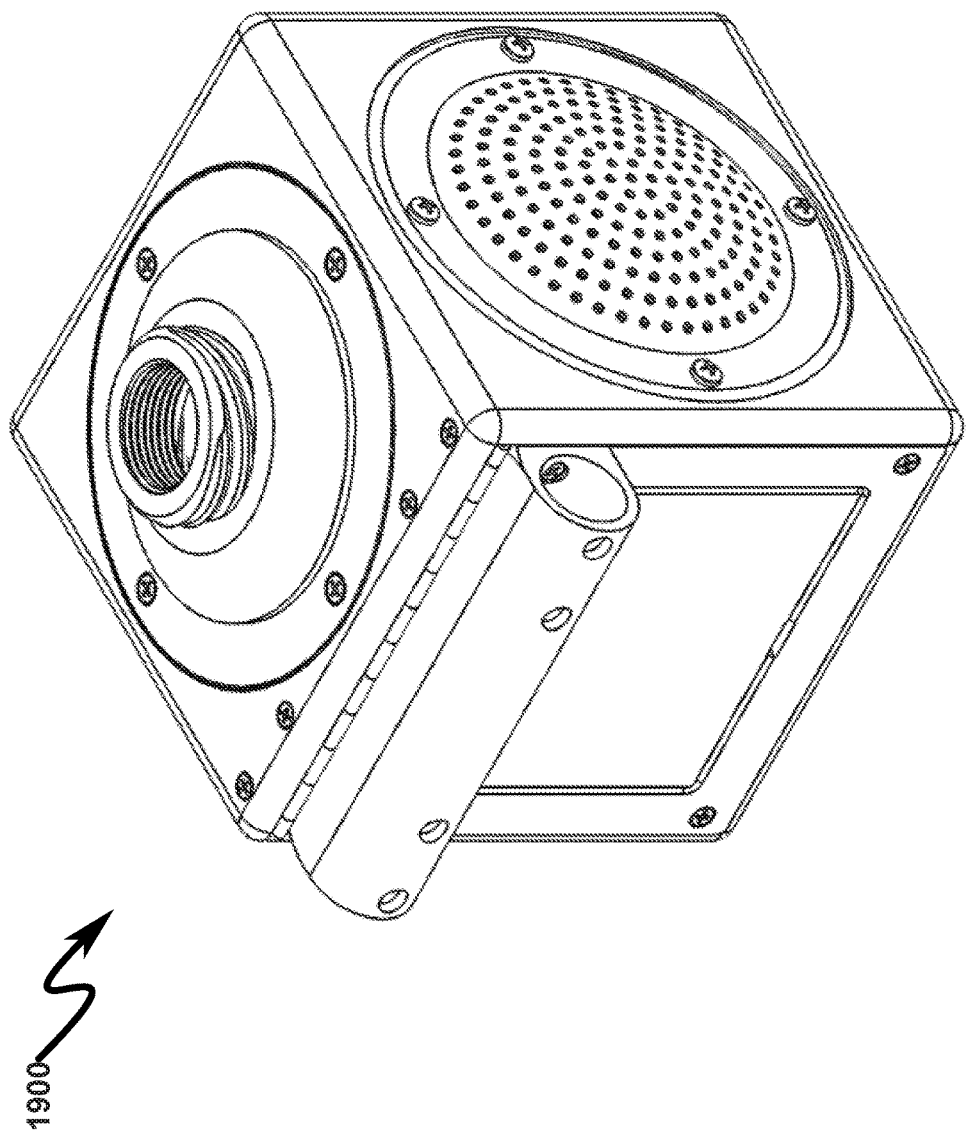
FIG. 19 illustrates a top left rear perspective view of a preferred exemplary system embodiment depicting a modular audio module (MAM)
Figure 20:
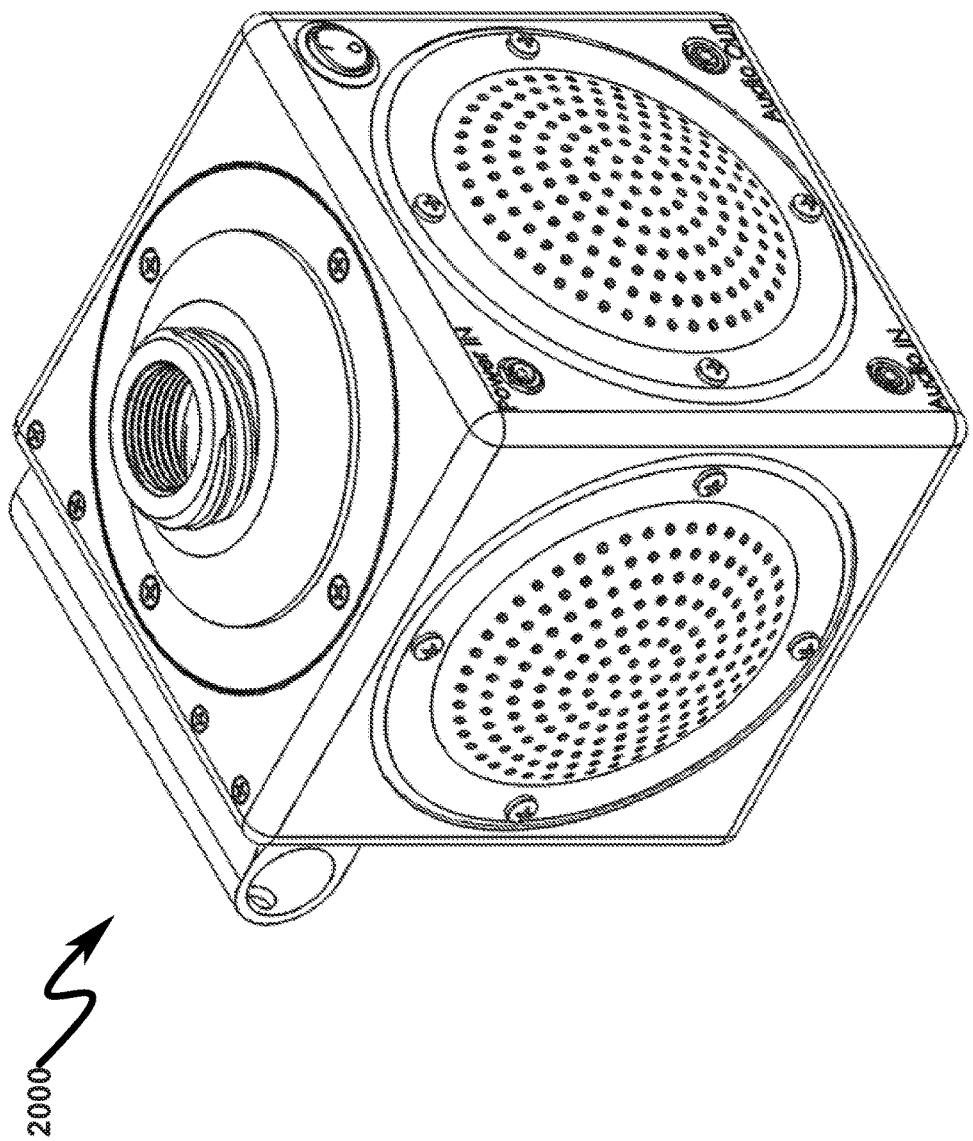
FIG. 20 illustrates a top left front perspective view of a preferred exemplary system embodiment depicting a modular audio module (MAM)
Figure 21:
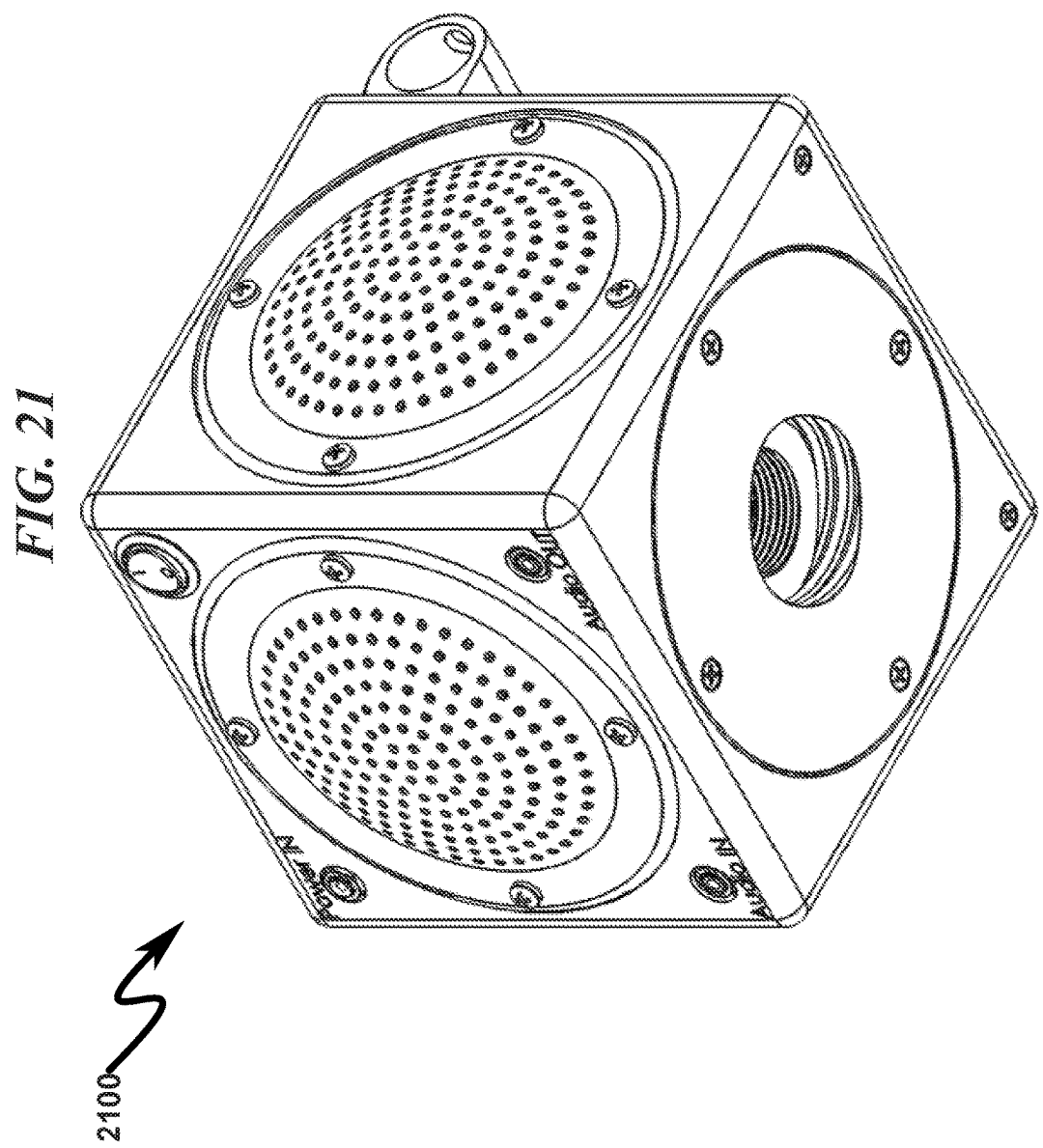
FIG. 21 illustrates a bottom right front perspective view of a preferred exemplary system embodiment depicting a modular audio module (MAM)
Figure 22:
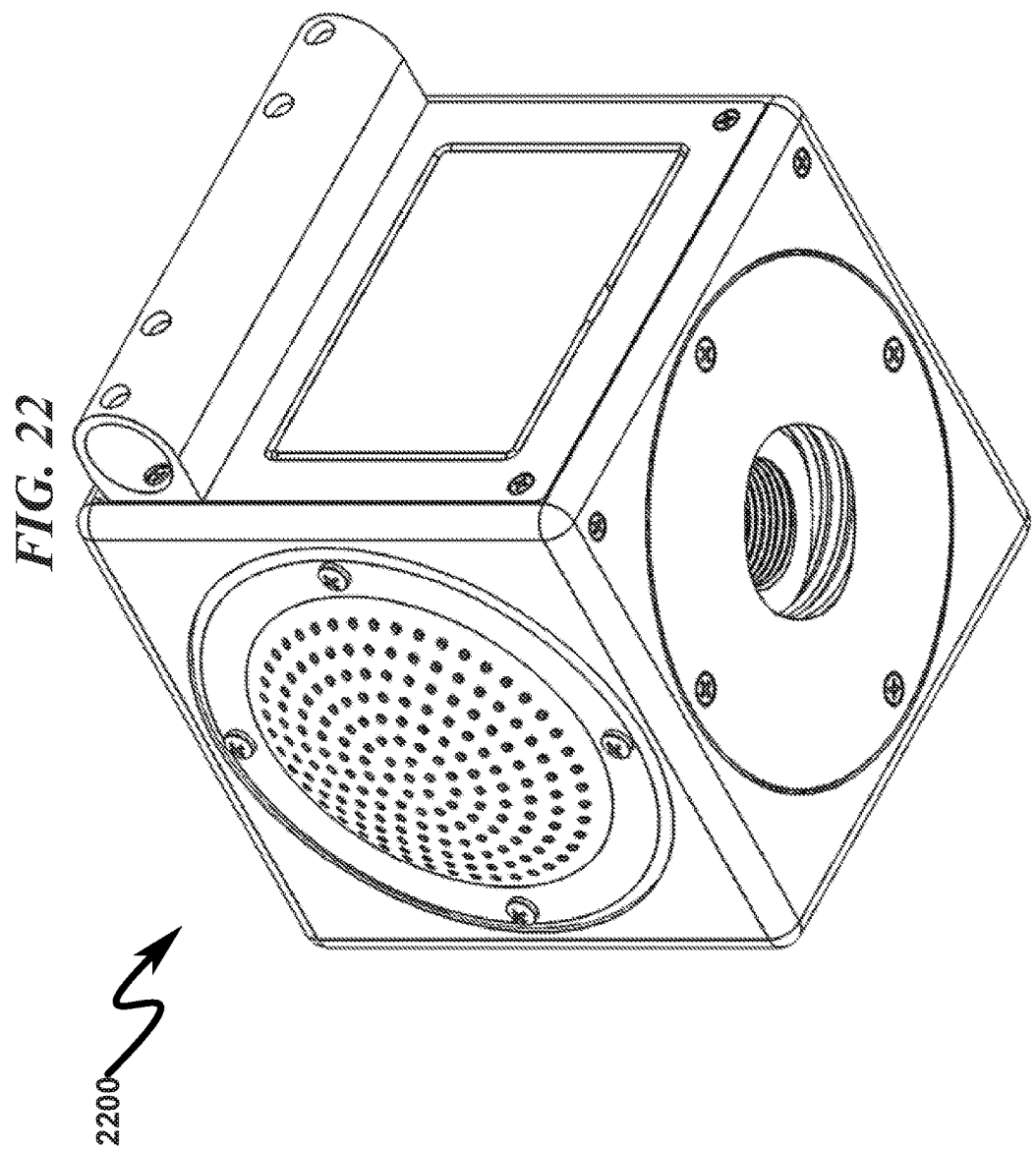
FIG. 22 illustrates a bottom right rear perspective view of a preferred exemplary system embodiment depicting a modular audio module (MAM)
Figure 23:
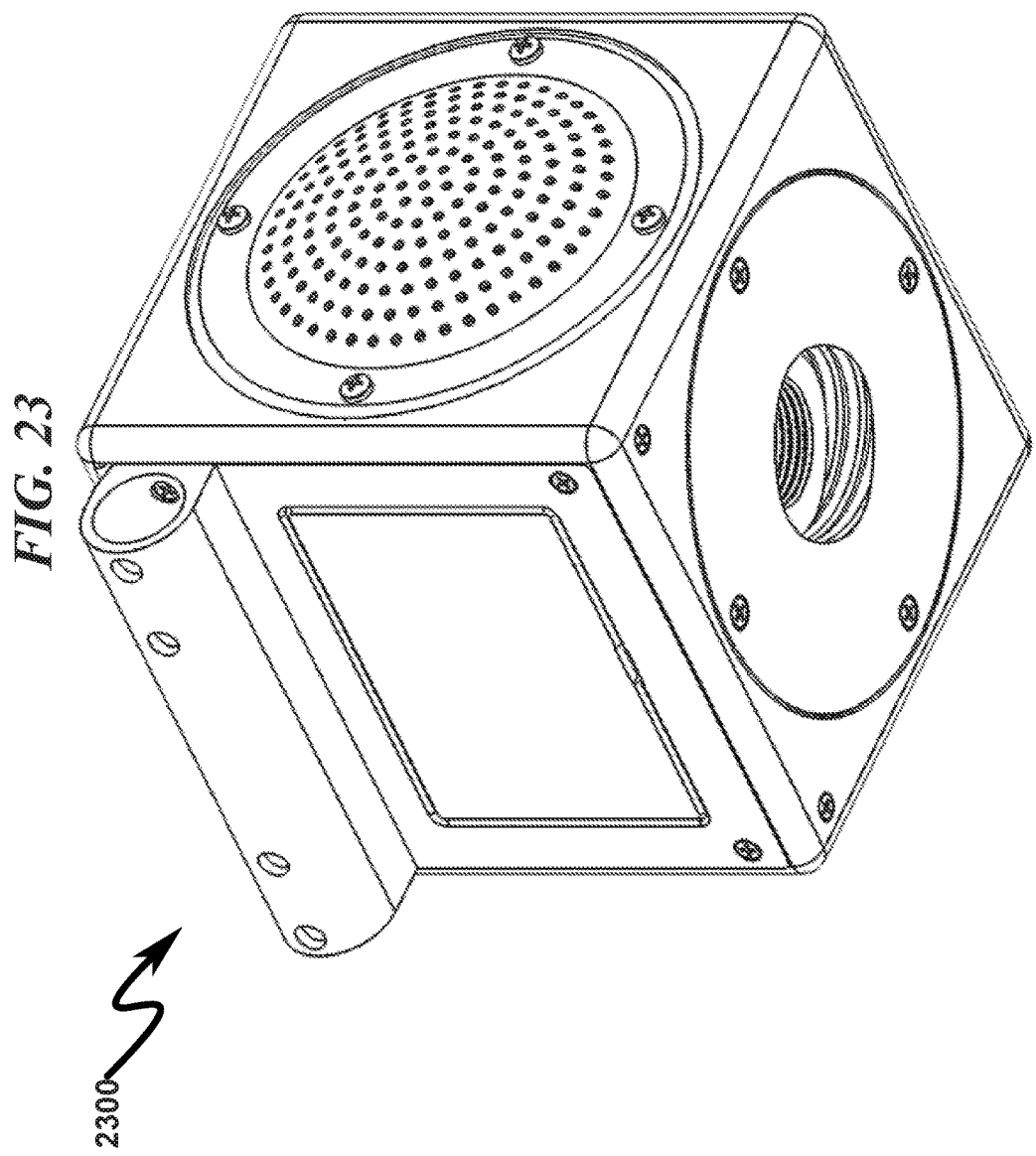
FIG. 23 illustrates a bottom left rear perspective view of a preferred exemplary system embodiment depicting a modular audio module (MAM)
Figure 24:
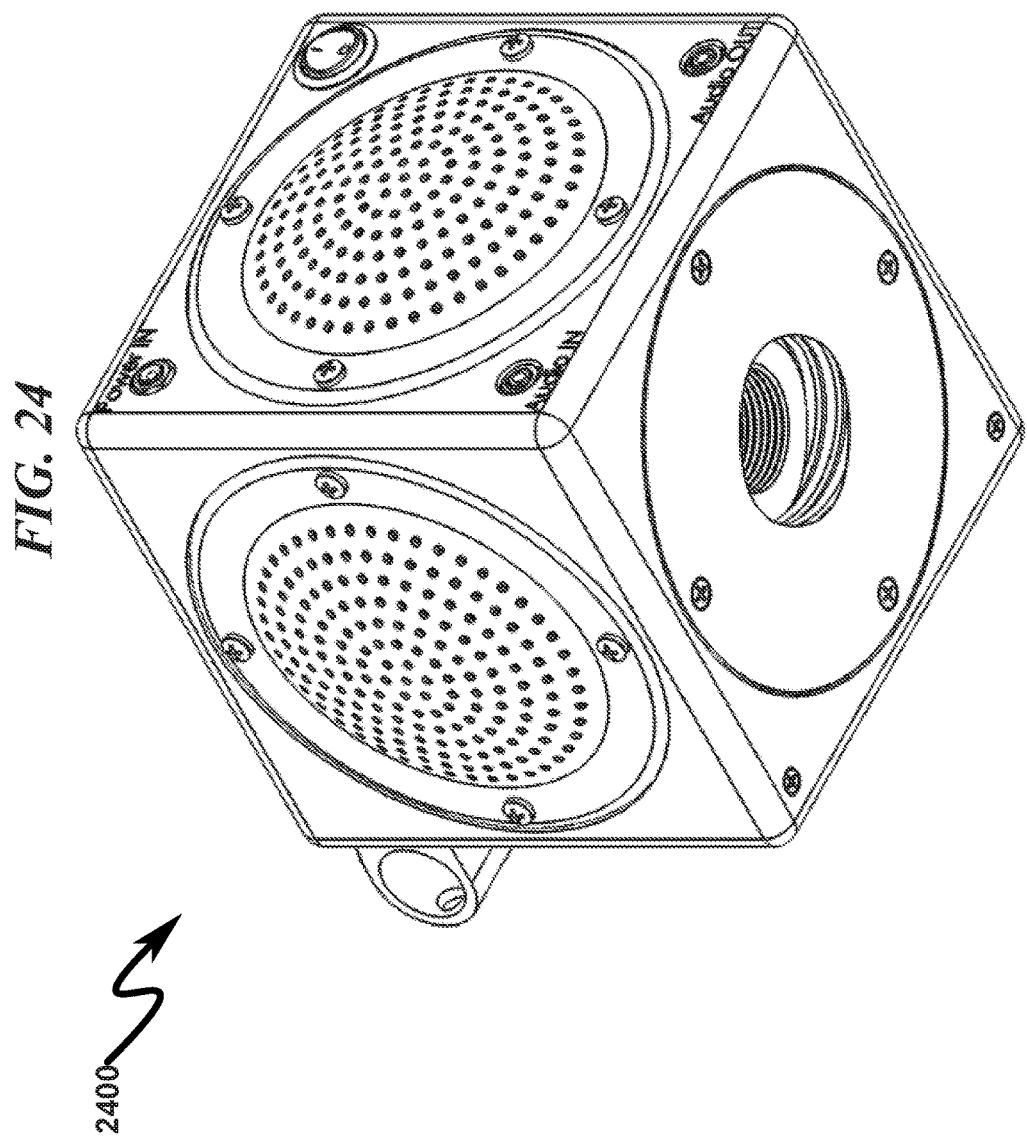
FIG. 24 illustrates a bottom left front perspective view of a preferred exemplary system embodiment depicting a modular audio module (MAM)
Figure 30:
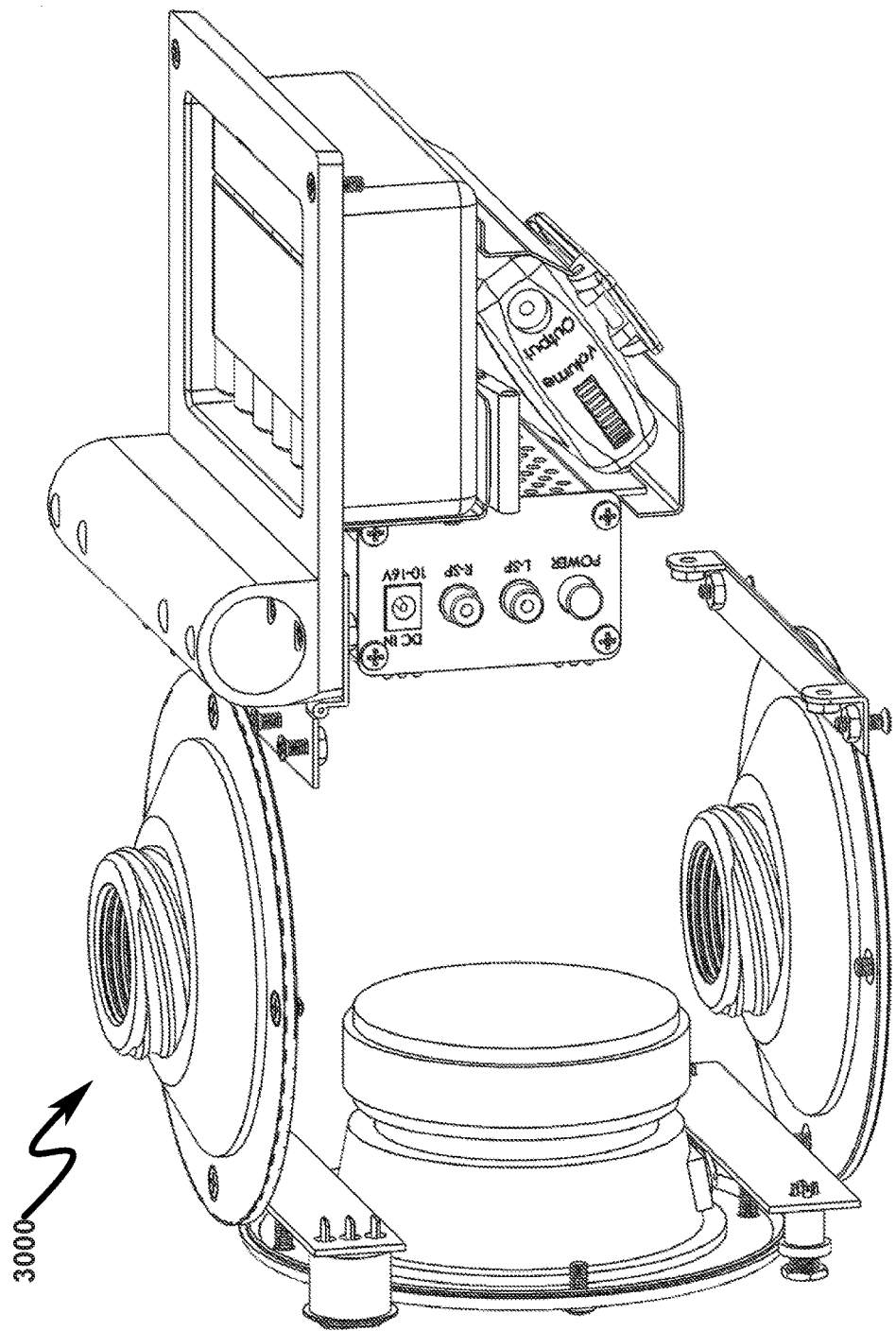
FIG. 30 illustrates a top right rear perspective view of a preferred exemplary system embodiment depicting a modular audio module (MAM) with mobile containing enclosure (MCE), side audio grills (SAGs), and battery cover removed and rear opening lid (ROL) extended.

A preferred exemplary system embodiment of a mobile audio module (MAM) is generally depicted in FIG. 9 (0900)-FIG. 30 (3000). The MAM (0910, 1010) generally comprises a mobile containing enclosure (MCE) (0911, 1011) comprising a box having a front face (FF), right face (RF), left face (LF), top face (TF), and bottom face (BF), and a rear opening (RO). The FF typically incorporates an audio speaker grill (ASG) (0912, 1012) covering a mobile audio speaker (MAS). The RF and LF incorporate one or more audio speaker grill (ASG) (0913, 0914, 1013, 1014). The FF may incorporate AUDIO INPUT (0915), AUDIO OUTPUT (0916), and POWER INPUT (0917) jacks as well as a MASTER POWER ON/OFF switch (0918). Typical configurations of the MAM (0910, 1010) incorporate one or more hermaphroditic plate connectors (HPC) (0931, 1031) that can be used to support the MAM (0910, 1010) or Interconnect one MAM (0910, 1010) with another MAM. The RO is covered with a rear opening lid (ROL) (1020) that is mechanically coupled to the mobile containing enclosure (0911, 1011) with a hinge (1019) or other equivalent articulating mechanical device.

Figure 25:
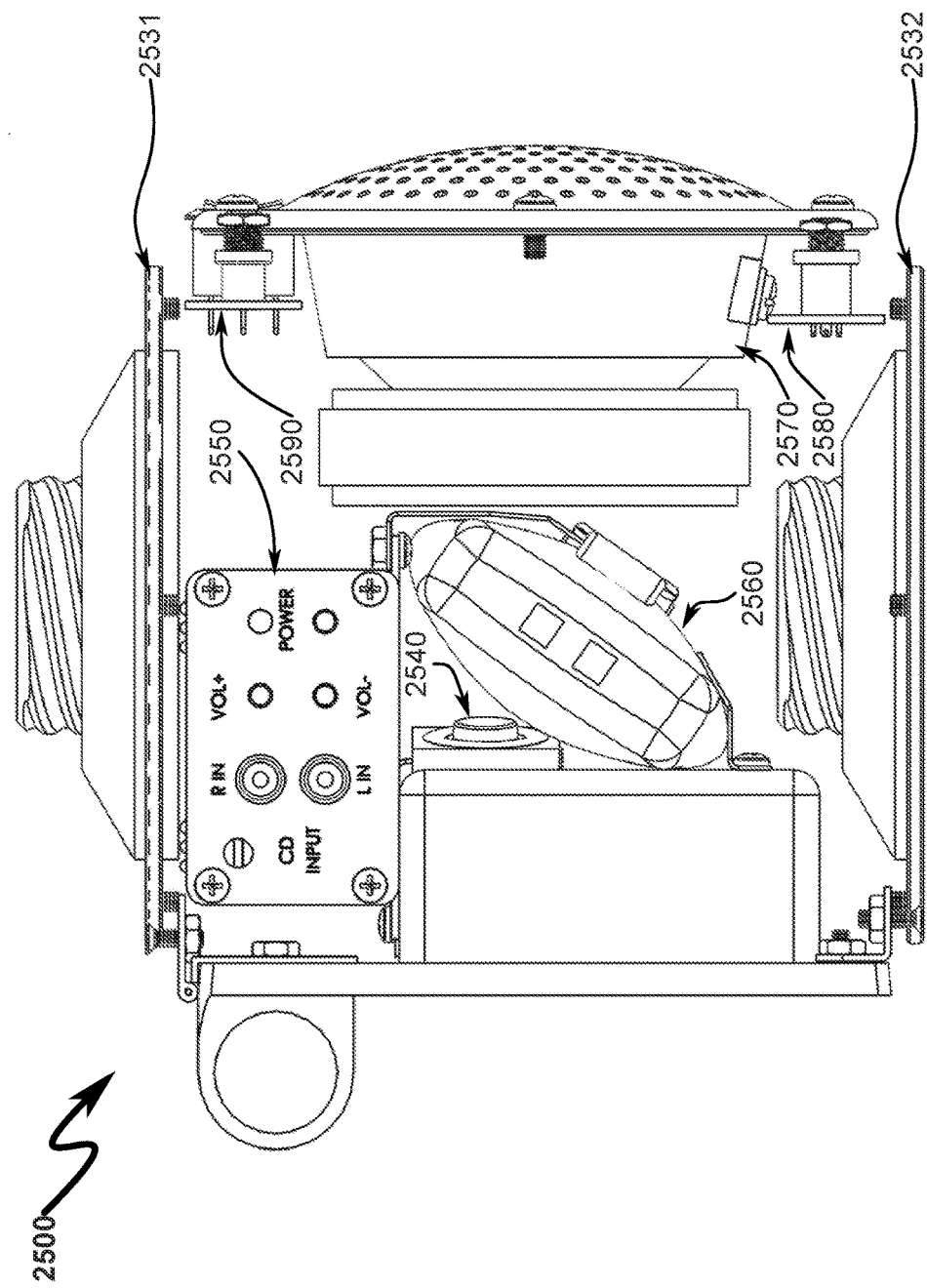
FIG. 25 illustrates a left side view of a preferred exemplary system embodiment depicting a modular audio module (MAM) with mobile containing enclosure (MCE), side audio grills (SAGs), and battery cover removed.
Figure 26:
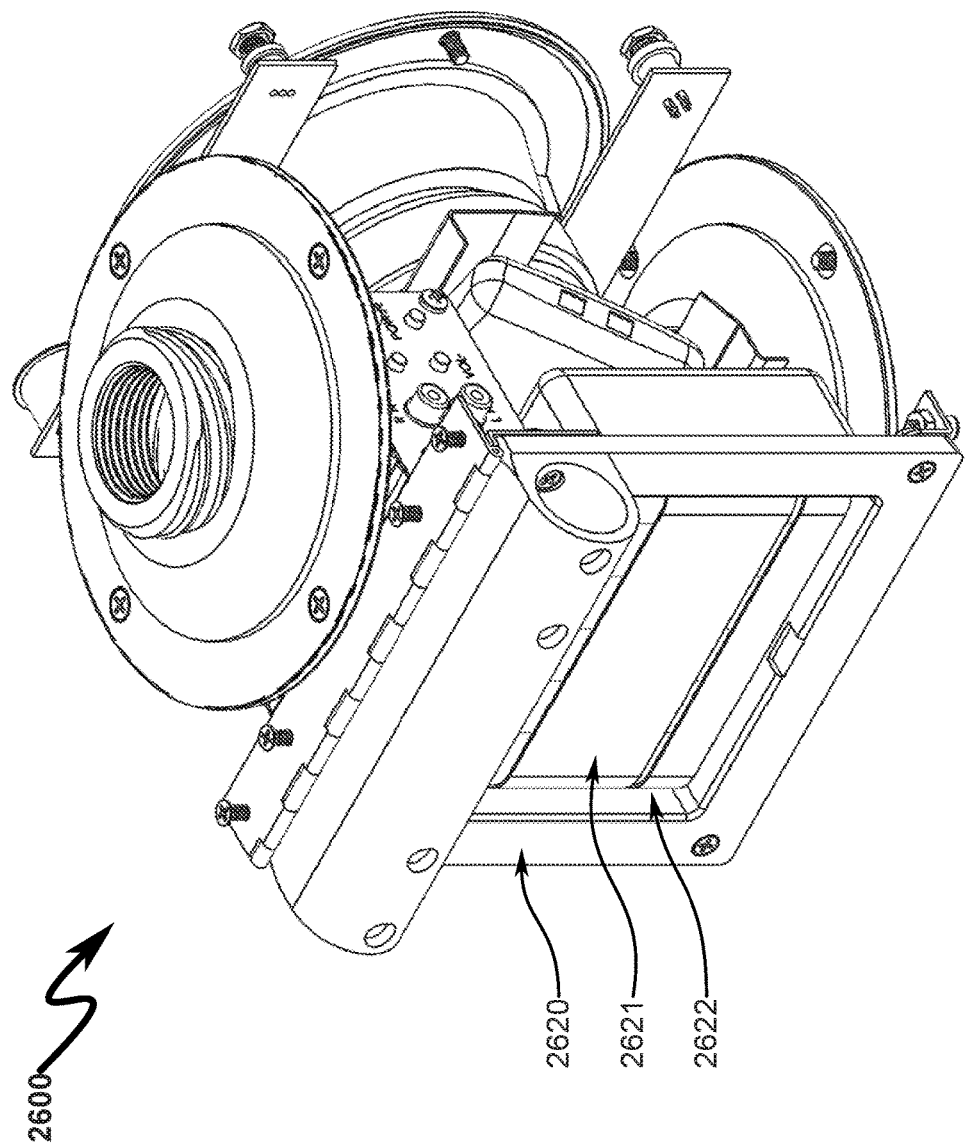
FIG. 26 illustrates a top left rear perspective view of a preferred exemplary system embodiment depicting a modular audio module (MAM) with mobile containing enclosure (MCE), side audio grills (SAGs), and battery cover removed.

Internals of the MAM may be seen by inspection of FIG. 25 (2500)-FIG. 30 (3000; wherein the top (2531) and bottom (2532) hermaphroditic plate connectors (HPC) are shown that serve as support for the MCE. Internal wiring harnesses are omitted for simplicity of explanation. The ROL supports mechanical attachment of an audio playback recorder (APR) (2540), mobile audio amplifier (2550), and optional radio frequency receiver (RFR) (2560). A mobile audio speaker (MAS) (2570) provides distribution of audio that is sourced to the mobile audio amplifier (2550) from either the audio playback recorder (APR) (2540), optional radio frequency receiver (RFR) (2560), or front panel AUDIO INPUT jack (0915). An audio distribution PCB (2580) incorporates circuitry necessary to make this selection. A power distribution PCB (2590) contains circuitry necessary to provide for recharging of a battery pack contained within the ROL or use of power from a front panel power jack (0917).

Figure 27:
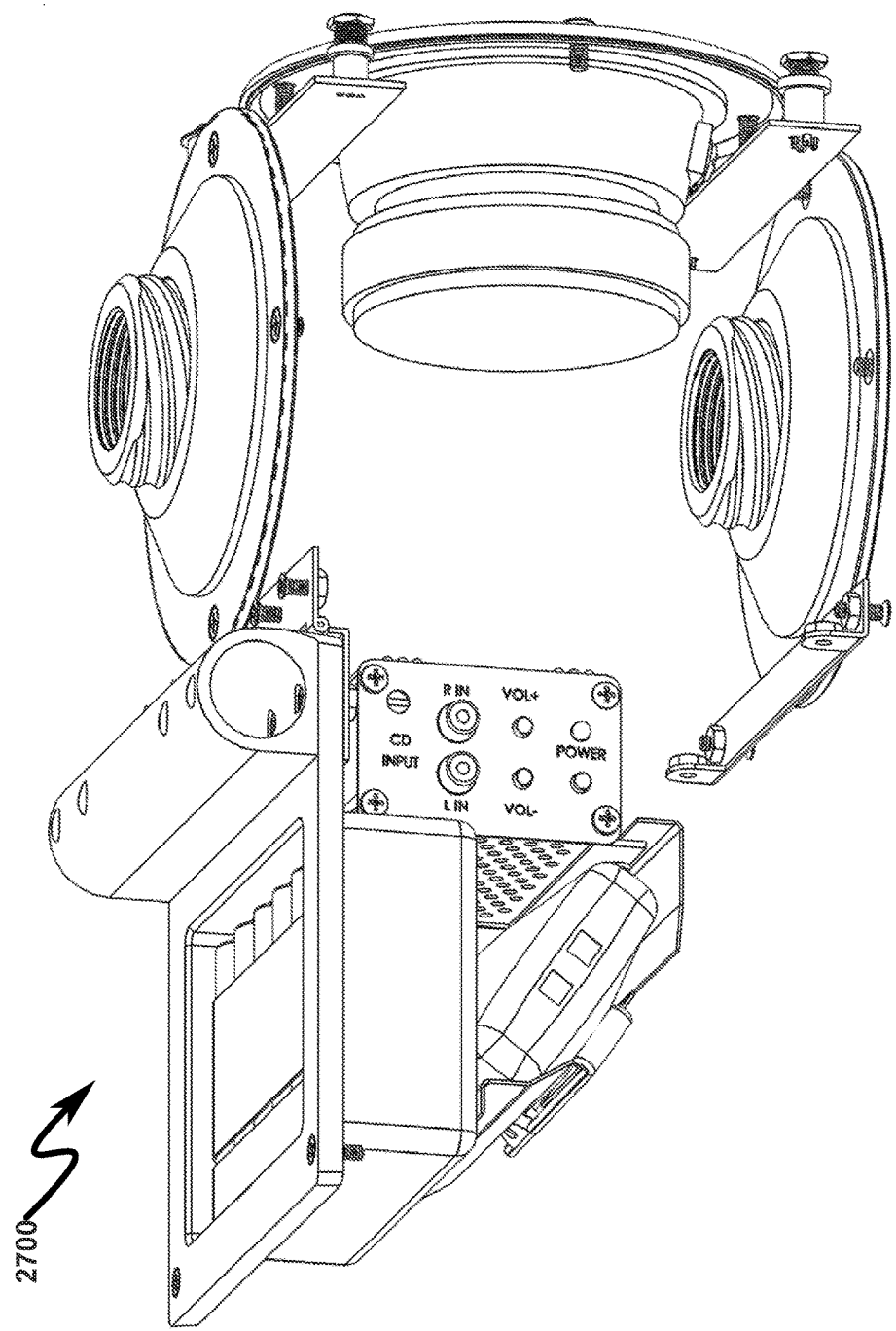
FIG. 27 illustrates a top left rear perspective view of a preferred exemplary system embodiment depicting a modular audio module (MAM) with mobile containing enclosure (MCE), side audio grills (SAGs), and battery cover removed and rear opening lid (ROL) extended.
Figure 28:
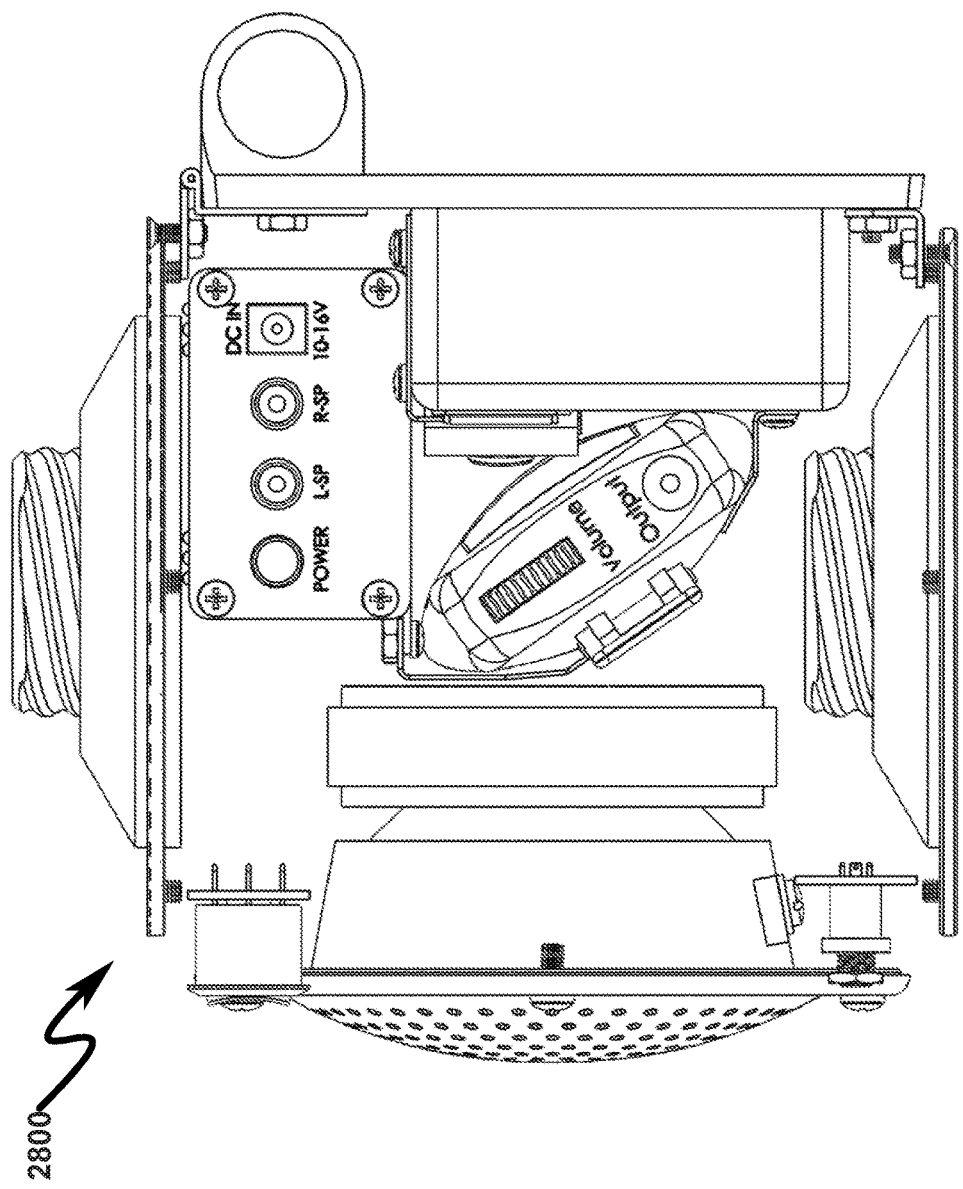
FIG. 28 illustrates a right side view of a preferred exemplary system embodiment depicting a modular audio module (MAM) with mobile containing enclosure (MCE), side audio grills (SAGs), and battery cover removed.
Figure 29:
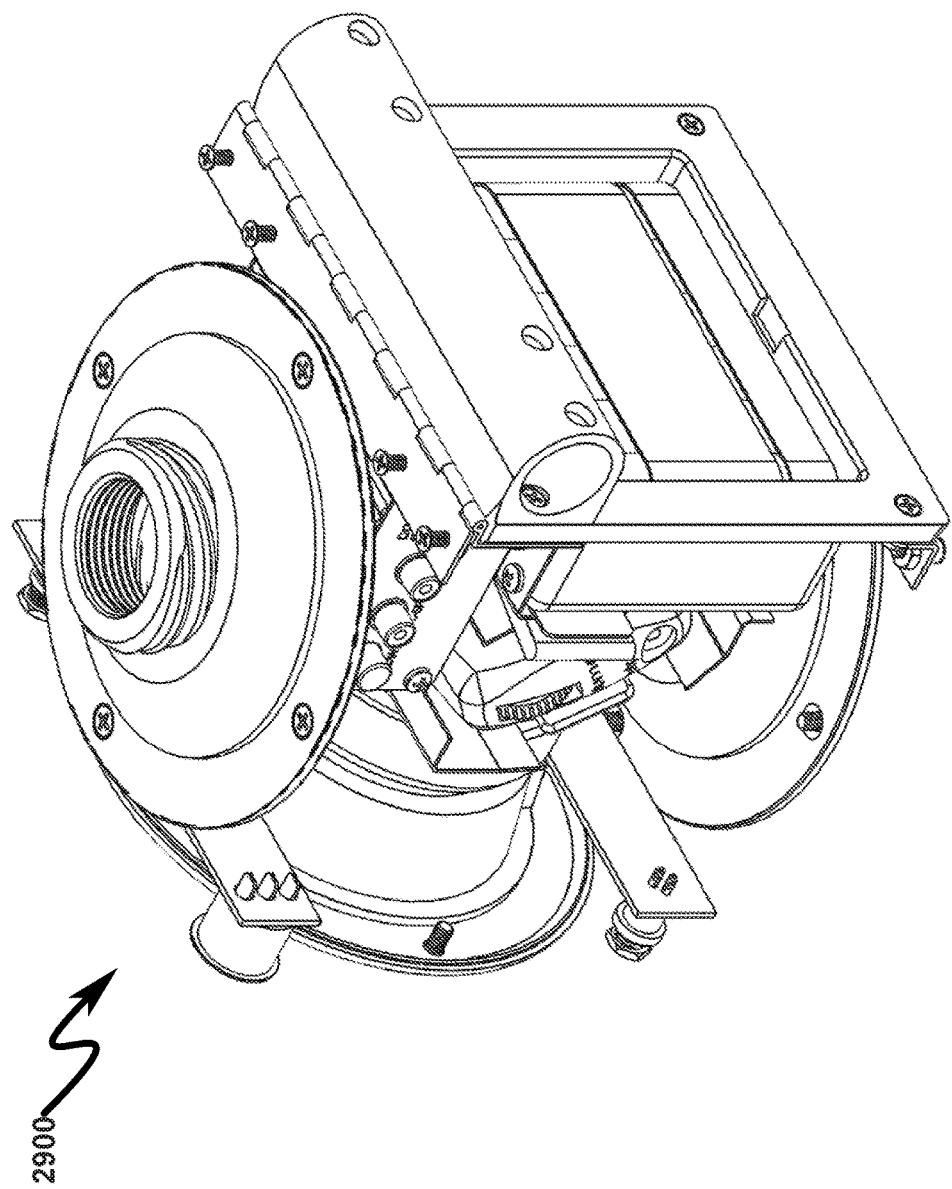
FIG. 29 illustrates a top right rear perspective view of a preferred exemplary system embodiment depicting a modular audio module (MAM) with mobile containing enclosure (MCE)side audio grills (SAGs), and battery cover removed.

Portable power for the MAM is provided as depicted in FIG. 27 (2700) with a mobile battery pack (MBP) (2621) retained within a compartments (2622) within the ROL (2620).

Rear Opening Lid (ROL) Mechanical Attachment (3100)-(3200)

Figure 31:
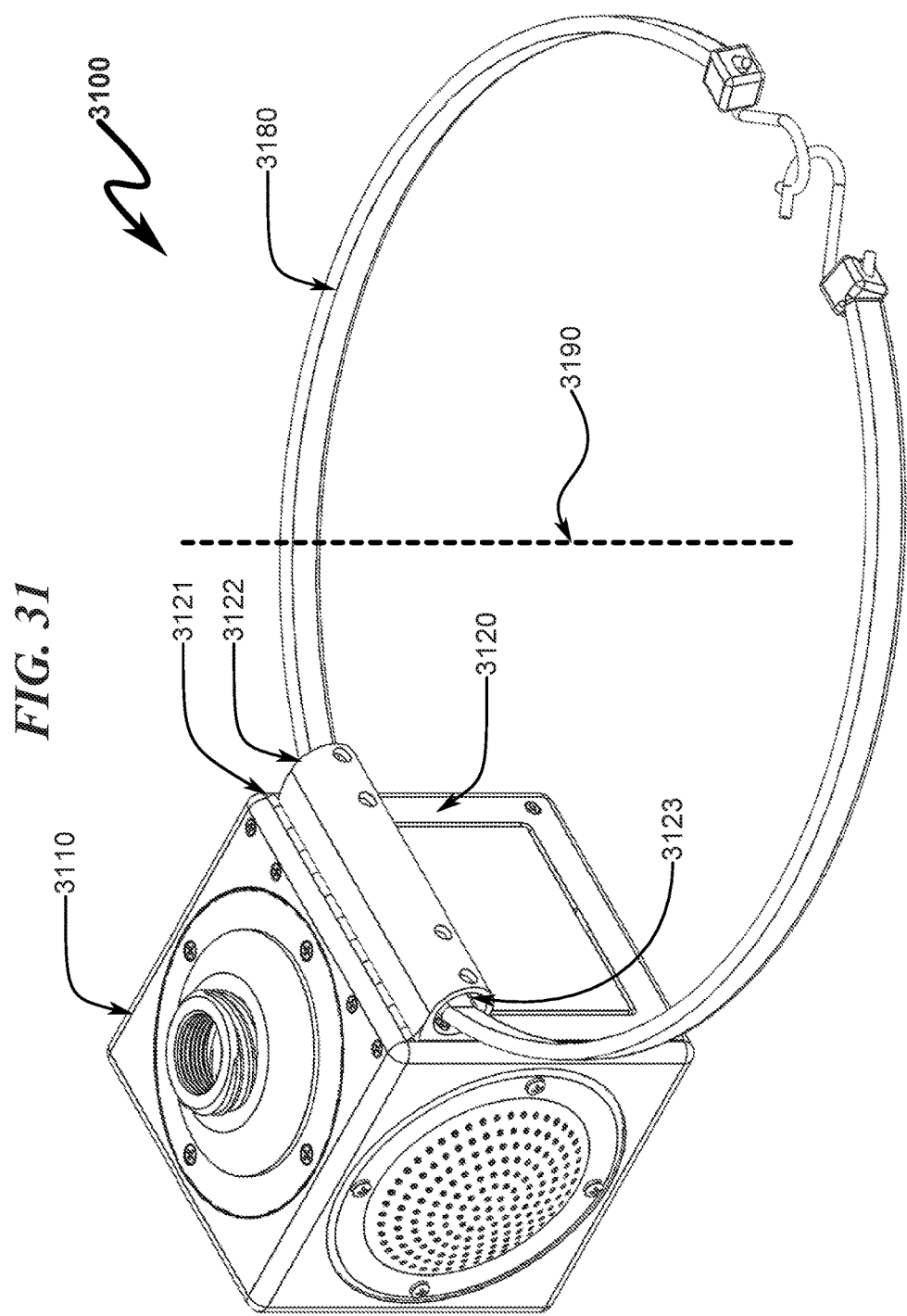
FIG. 31 illustrates a top right rear perspective view of a preferred exemplary system embodiment depicting a modular audio module (MAM) with bungee cord used to support the system using the rear opening lid (ROL) mechanical attachment void (MAV)
Figure 32:
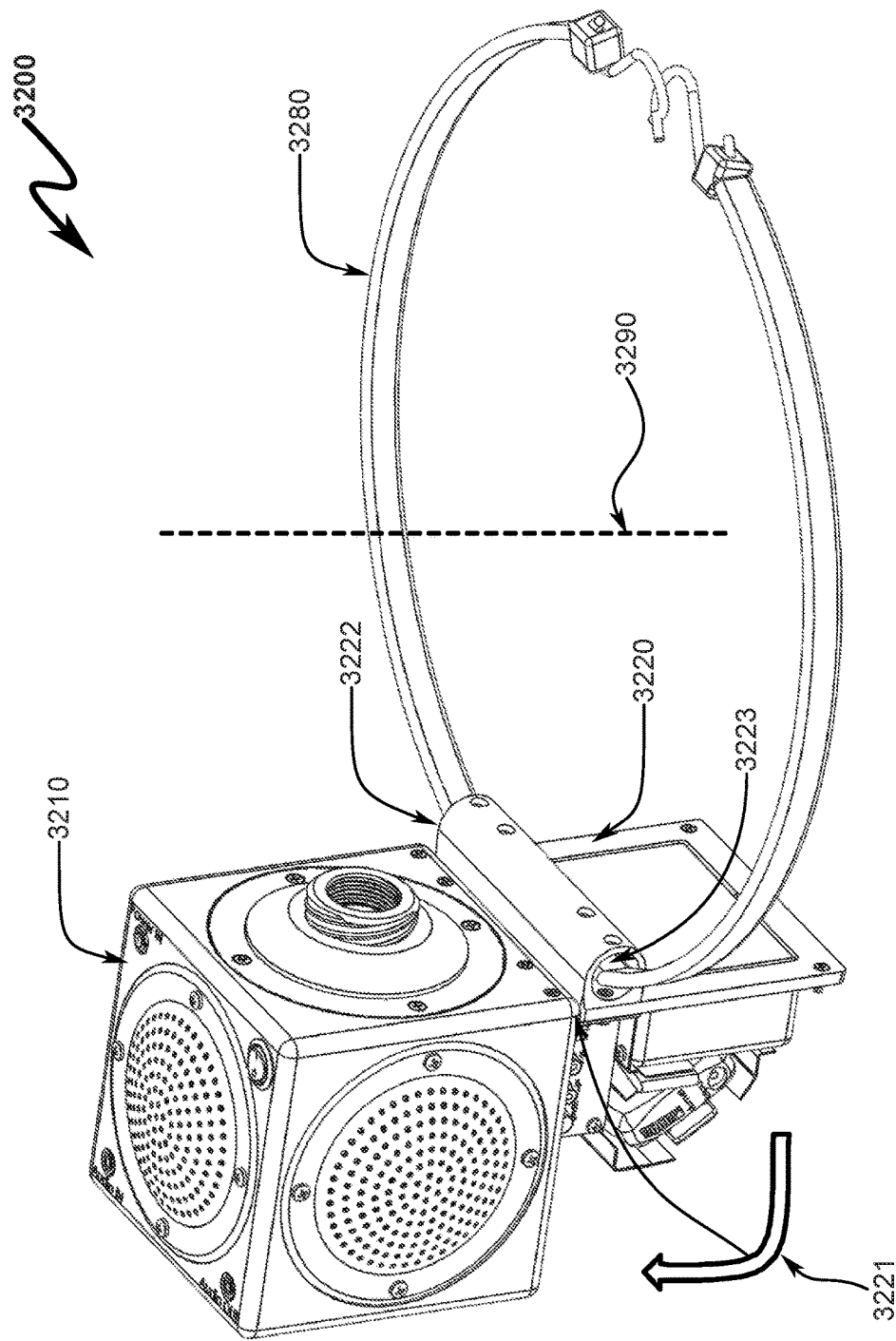
FIG. 32 illustrates a top right rear perspective view of a preferred exemplary system embodiment depicting a modular audio module (MAM) with bungee cord used to support the system using the rear opening lid (ROL) mechanical attachment void (MAV) with the modular audio module (MAM) articulated upward for access to internals within the modular audio module (MAM)

As generally depicted in FIG. 31 (3100)-FIG. 32 (3200), the mobile audio module (MAM) (3110, 3210) attaches to the rear opening lid (ROL) (3110, 3210) via a rotatable hinge (3121, 3221) allowing the mobile containing enclosure (MCE) to upwardly articulate (3221) with respect to the rear opening lid (ROL) (3110, 3210). This feature allows internal components of the mobile audio module (MAM) (3110, 3210) to be accessible in the field for adjustment and/or replacement as needed.

This feature may be used in conjunction with a mechanical attachment void (MAV) (3122, 3222) that allows a bungee cord (3180, 3280) or other strapping means to secure the mobile audio module (MAM) (3110, 3210) to a vertical standard (3190, 3290) such as a pole, tree, or other suitable support structure as may be available in the field of mobile audio deployment. This form of field-defined mechanical support is highly desirable in situations where deployment of traditional tripods or other standards is not physically practical or affordable. It is notable that this form of mechanical attachment also permits the rear opening lid (ROL) (3110, 3210) to articulate above the cylindrical void (3123, 3223) in which the bungee cord (3180, 3280) or other strapping material is retained to allow access to the battery compartment contained within the rear opening lid (ROL) (3110, 3210).

Hermaphroditic Plate Connector (HPC) (3300)-(4000)

Figure 33:
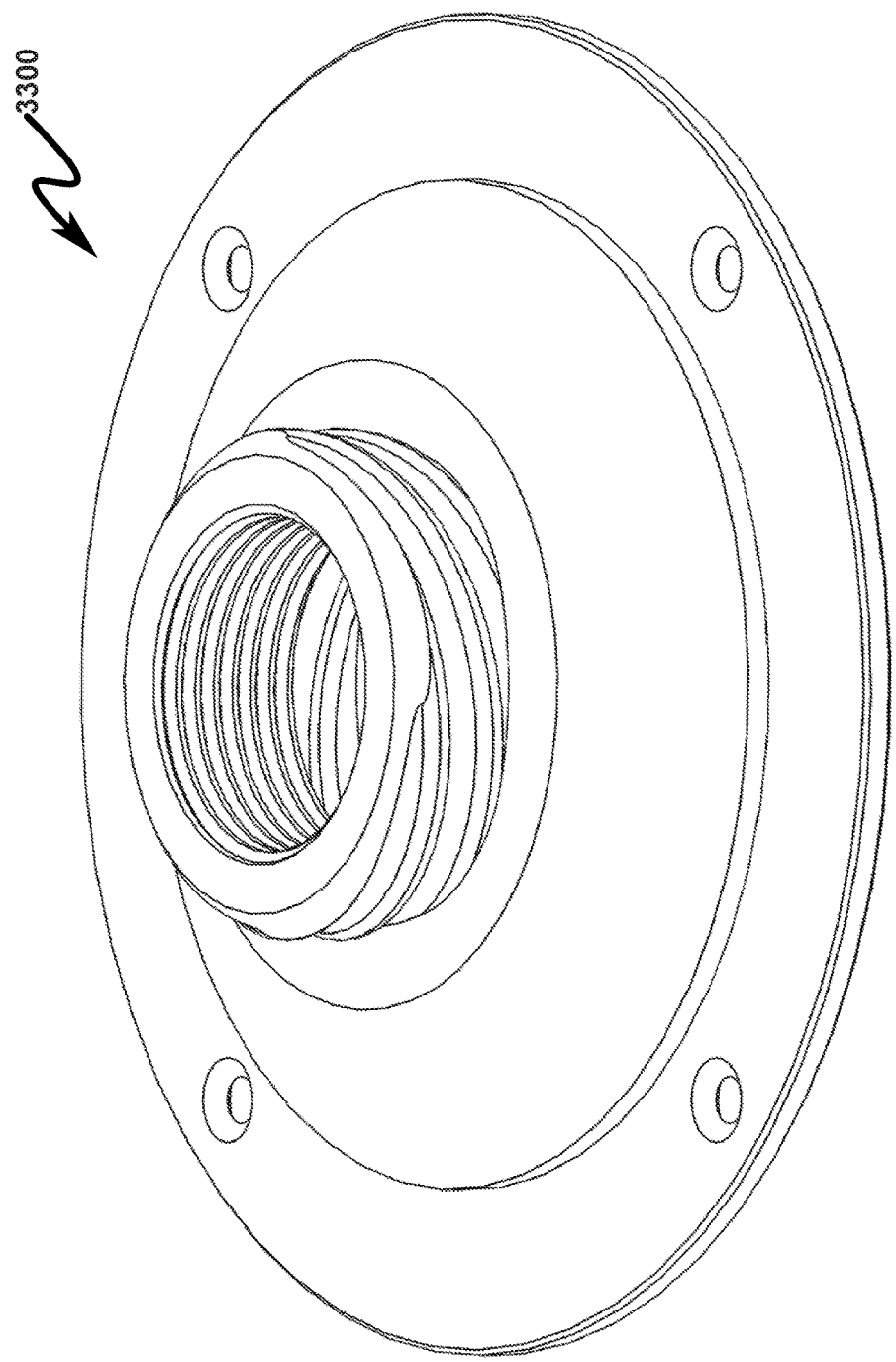
FIG. 33 illustrates a top right front perspective view of a preferred exemplary embodiment of a hermaphroditic plate connector (HPC) used in many preferred invention embodiments.

Within the application contexts of the present invention, it is anticipated that the MAMs may be interlocked using hermaphroditic plate connectors (HPC) that are attached to the mobile containing enclosure (MCE) that constitutes the structural frame of each MAM. This generic mechanical interlocking methodology permits the system to be dynamically tailorable as to the quantity of required audio output without the need for tailoring of individual audio distribution speakers. With the system depicted, it is possible to link a number of mobile audio module (MAM) components together to achieve a desired level of audio saturation for a given spatial area. This also allows in-the-field upgrades to audio saturation levels should the need arise without the need for complete replacement of the already-in-place audio distribution system. While this HPC methodology may take many forms, a preferred embodiment is generally illustrated in FIG. 33 (3300)-FIG. 40 (4000).

Figure 34:
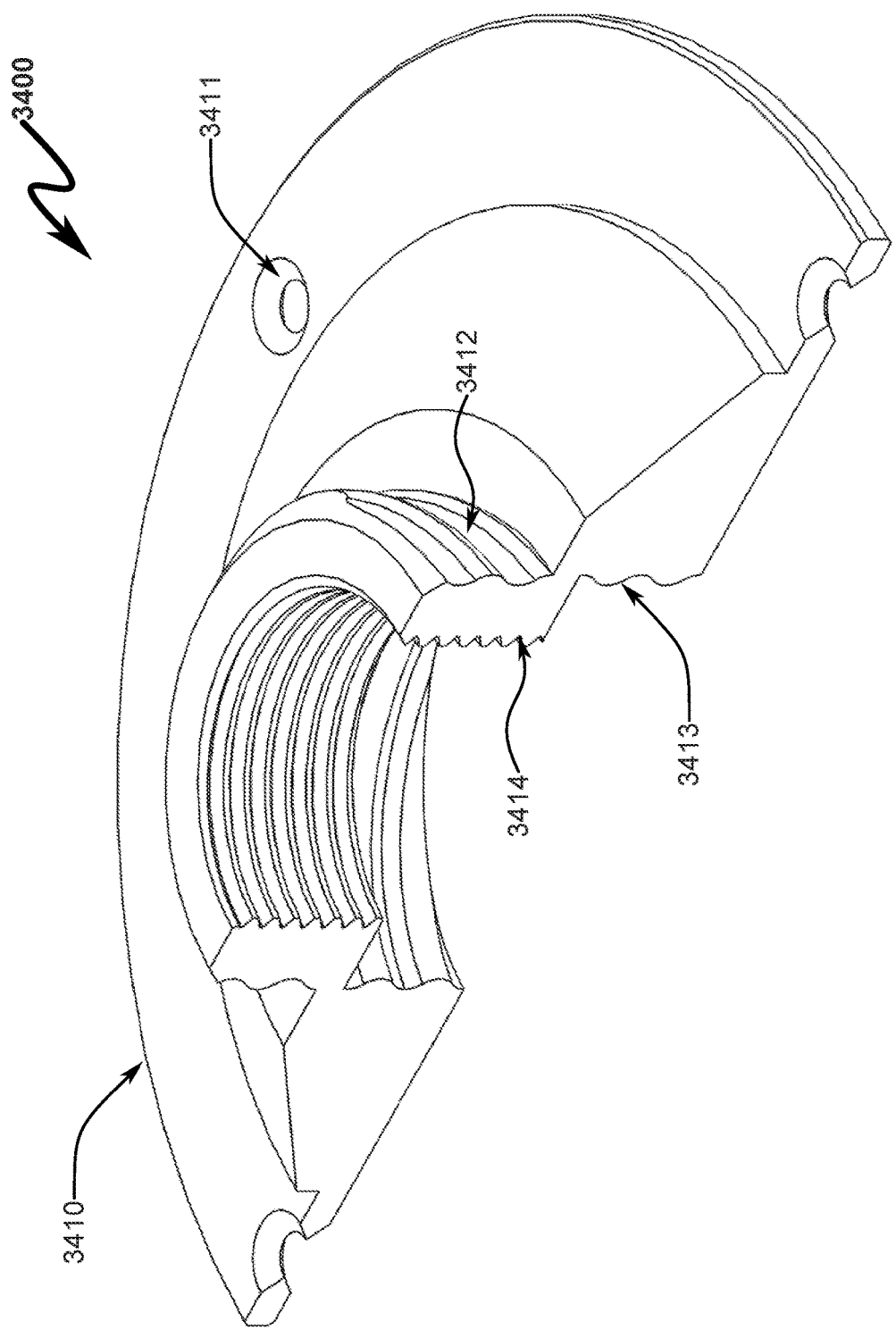
FIG. 34 illustrates a top right front perspective front side section view of a preferred exemplary embodiment of a hermaphroditic plate connector (HPC) used in many preferred invention embodiments.
Figure 35:
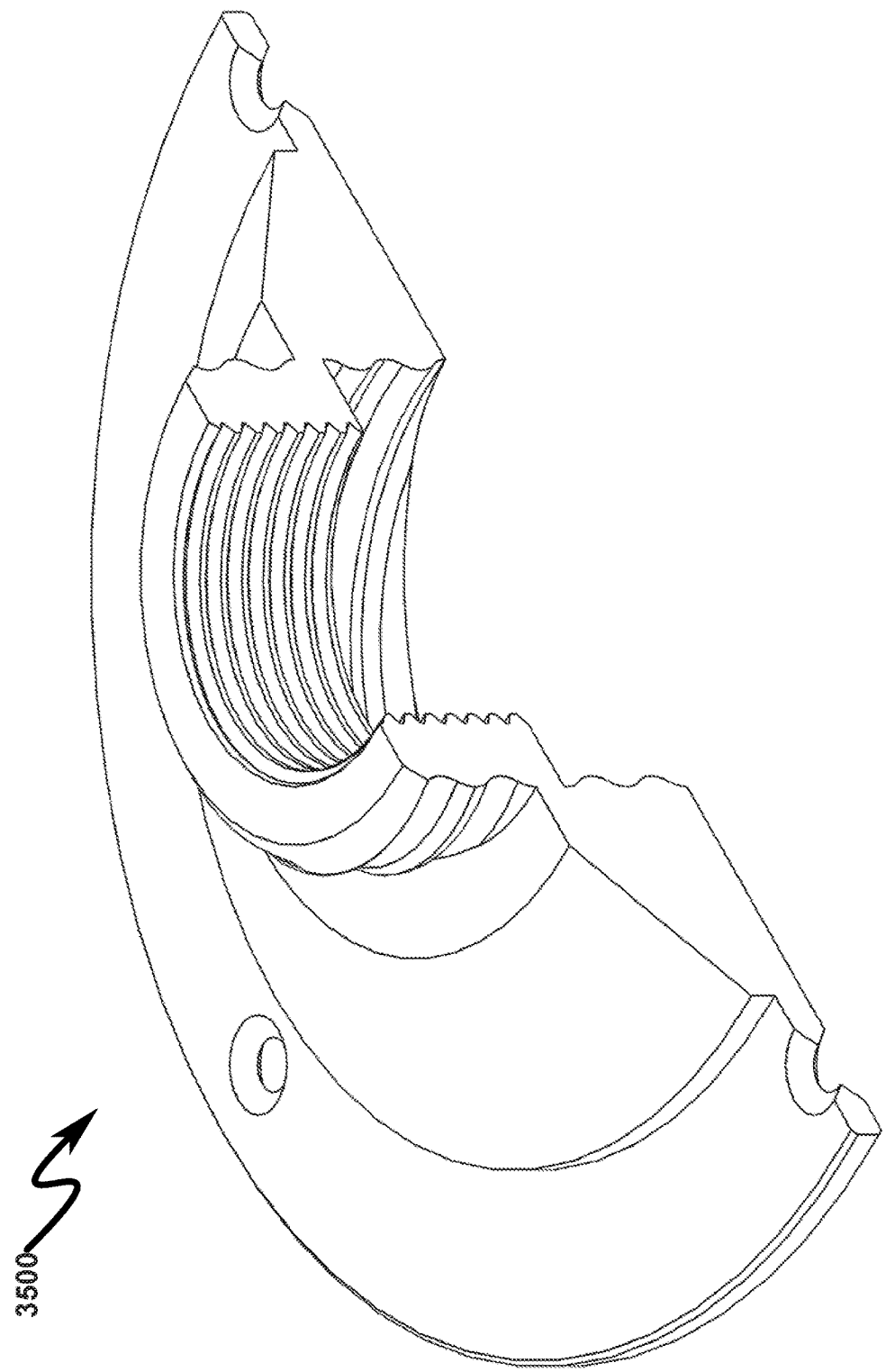
FIG. 35 illustrates a top right front perspective right side section view of a preferred exemplary embodiment of a hermaphroditic plate connector (HPC) used in many preferred invention embodiments.
Figure 36:
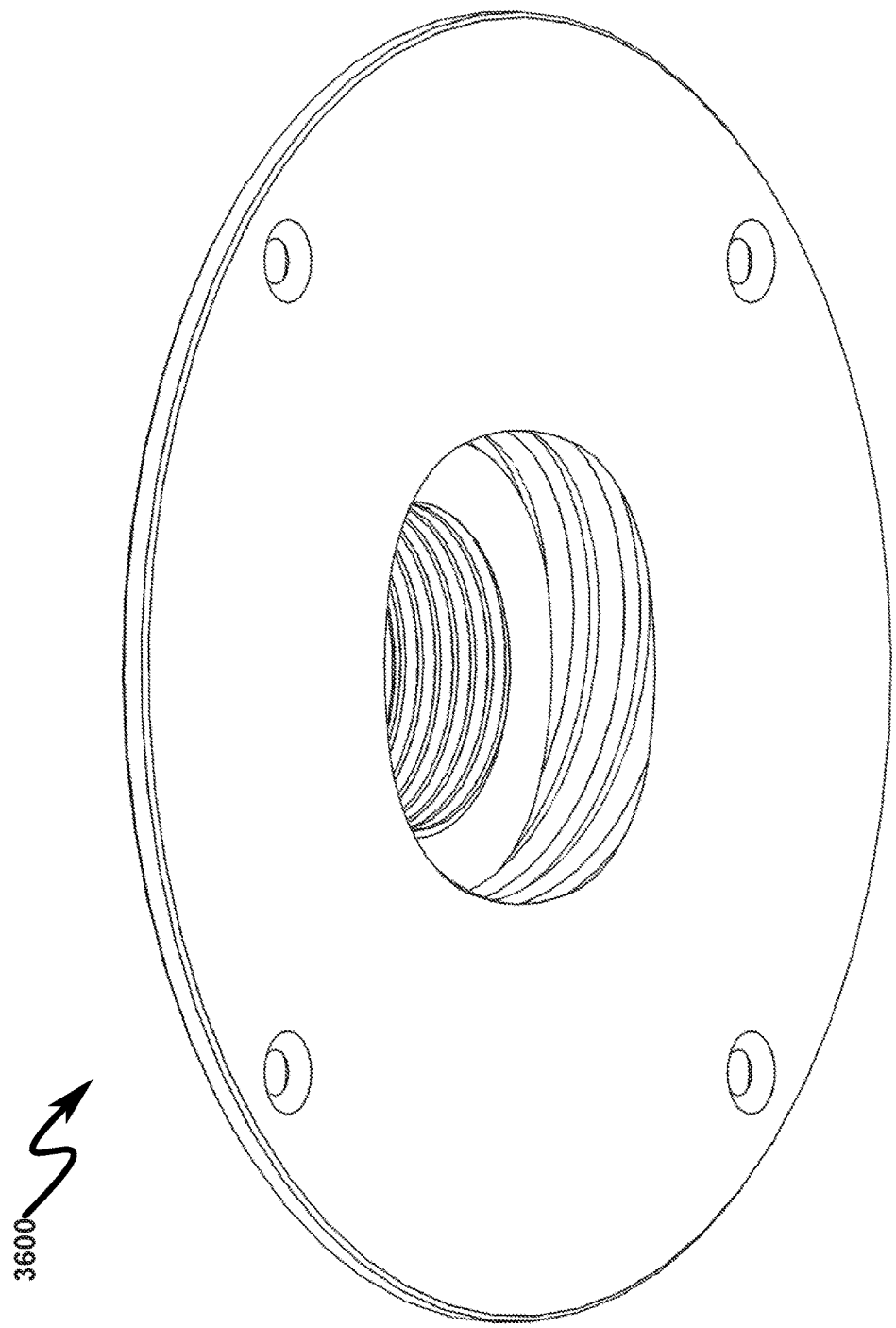
FIG. 36 illustrates a bottom right front perspective view of a preferred exemplary embodiment of a hermaphroditic plate connector (HPC) used in many preferred invention embodiments.
Figure 37:
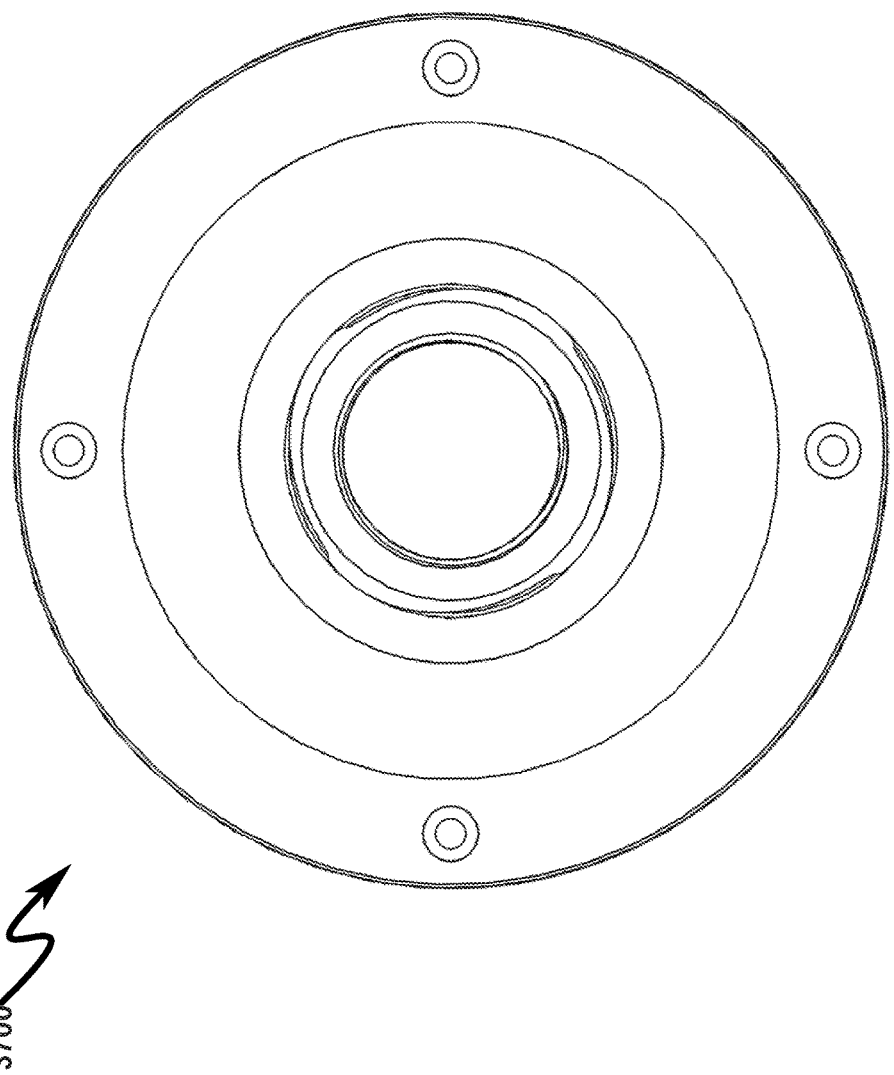
FIG. 37 illustrates a top view of a preferred exemplary embodiment of a hermaphroditic plate connector (HPC) used in many preferred invention embodiments.
Figure 38:
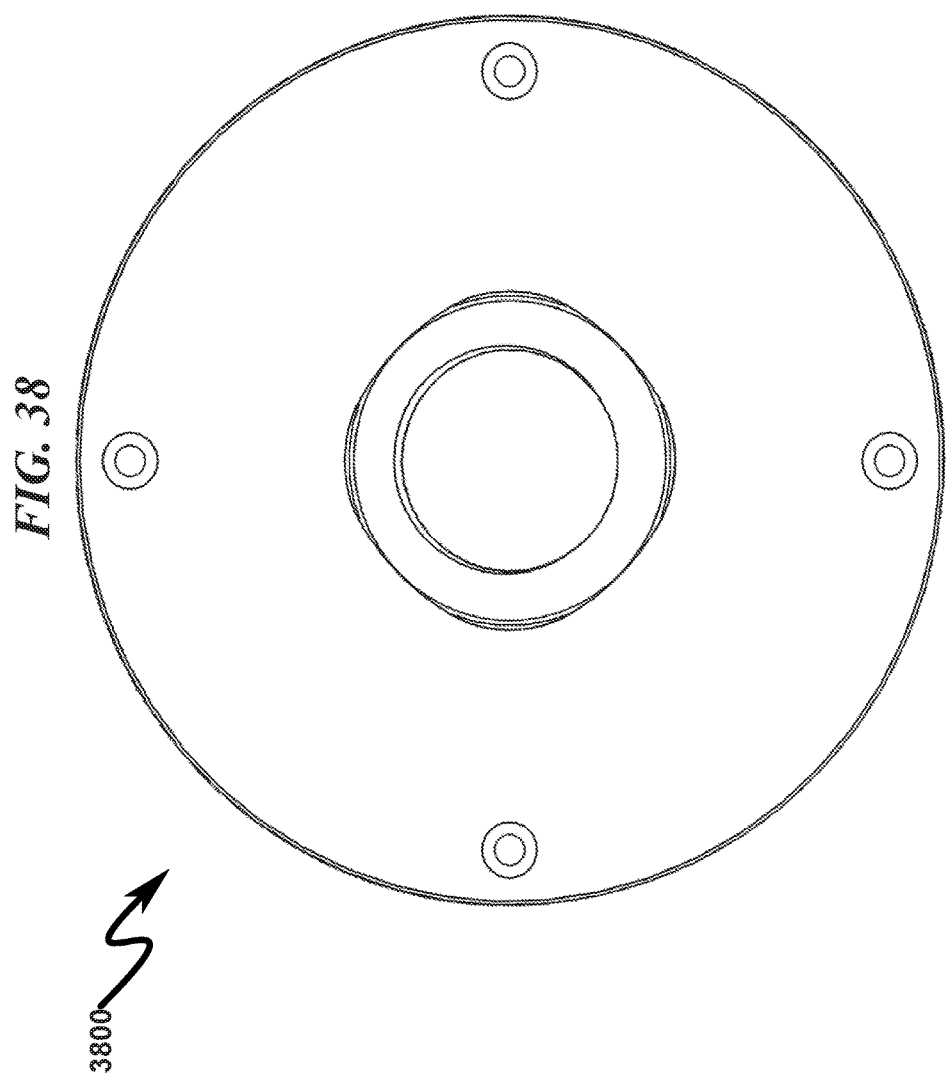
FIG. 38 illustrates a bottom view of a preferred exemplary embodiment of a hermaphroditic plate connector (HPC) used in many preferred invention embodiments.
Figure 39:
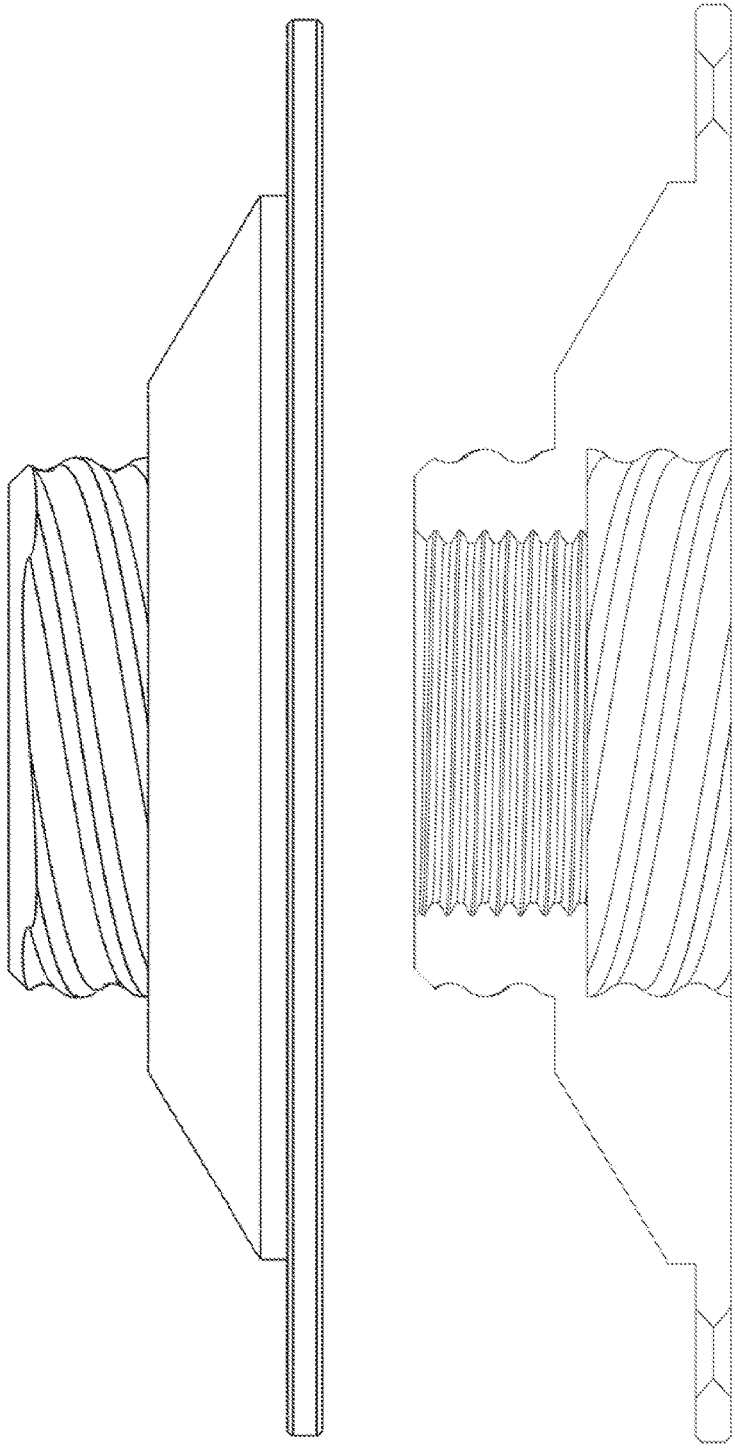
FIG. 39 illustrates a front side view and a front side section view of a preferred exemplary embodiment of a hermaphroditic plate connector (HPC) used in many preferred invent ion embodiments.

As can be seen from the side section view of FIG. 34 (3400), the HPC (3410) is configured to attach using fastener holes (3411) to a face plate connection void within the mobile containing enclosure (MCE) that constitutes the support frame of the MAM. The HPC (3410) is configured with a male thread (3412) that mates with a corresponding female thread (3413) in a corresponding HPC attached to another MAM. The HPC (3410) may also be optionally configured with a National Pipe Taper (NPT) pipe threading profile (3414) suitable for attachment to a pipe positioned on a tripod or other vertical support. This allows a single mold fabrication of the HPC (3410) that covers support of both MAM-interlocking and tripod support using conventional NPT pipe threads. This is important in field operations where the maintenance of additional parts to support in-the-field upgrades is problematic, especially in spatially-diverse audio distribution service areas.

While the HPC (3410) male mounting thread (3412) and female mounting thread (3413) may take many forms, the preferred invention embodiments as illustrated utilize rounded threads having a thread lead of two or greater. The illustrated example utilizes a thread, lead of 4 with rounded thread profiles of 4 threads-per-inch (TPI) and 0.25 inch radius corresponding to an Edison mogul lamp threading profile having a major radius of 2 inches. This permits two HPC (3410) to be mated with a rapid half-turn connection using the depicted 1-inch long threading profile. A correspondingly compatible NPT pipe thread (3414) for this example is depicted as a 1-inch 11.5 TPI NPT female pipe fitting, compatible with standard 1-inch NPT male pipe thread fittings found on structural pipe and many commercially available tripods.

Modular Construction (4100)-(4800)

Figure 40:
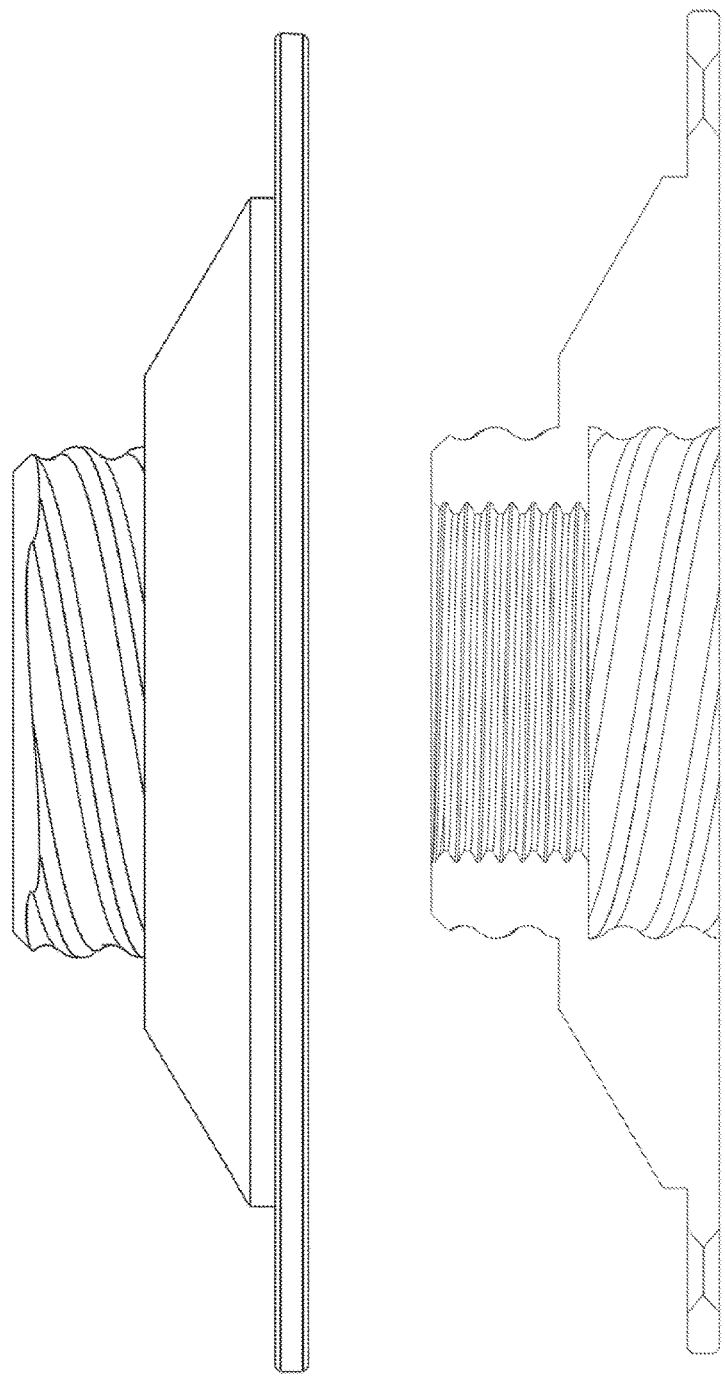
FIG. 40 illustrates a right side view and a right side section view of a preferred exemplary embodiment of a hermaphroditic plate connector (HPC) used in many preferred invention embodiments.
Figure 42:
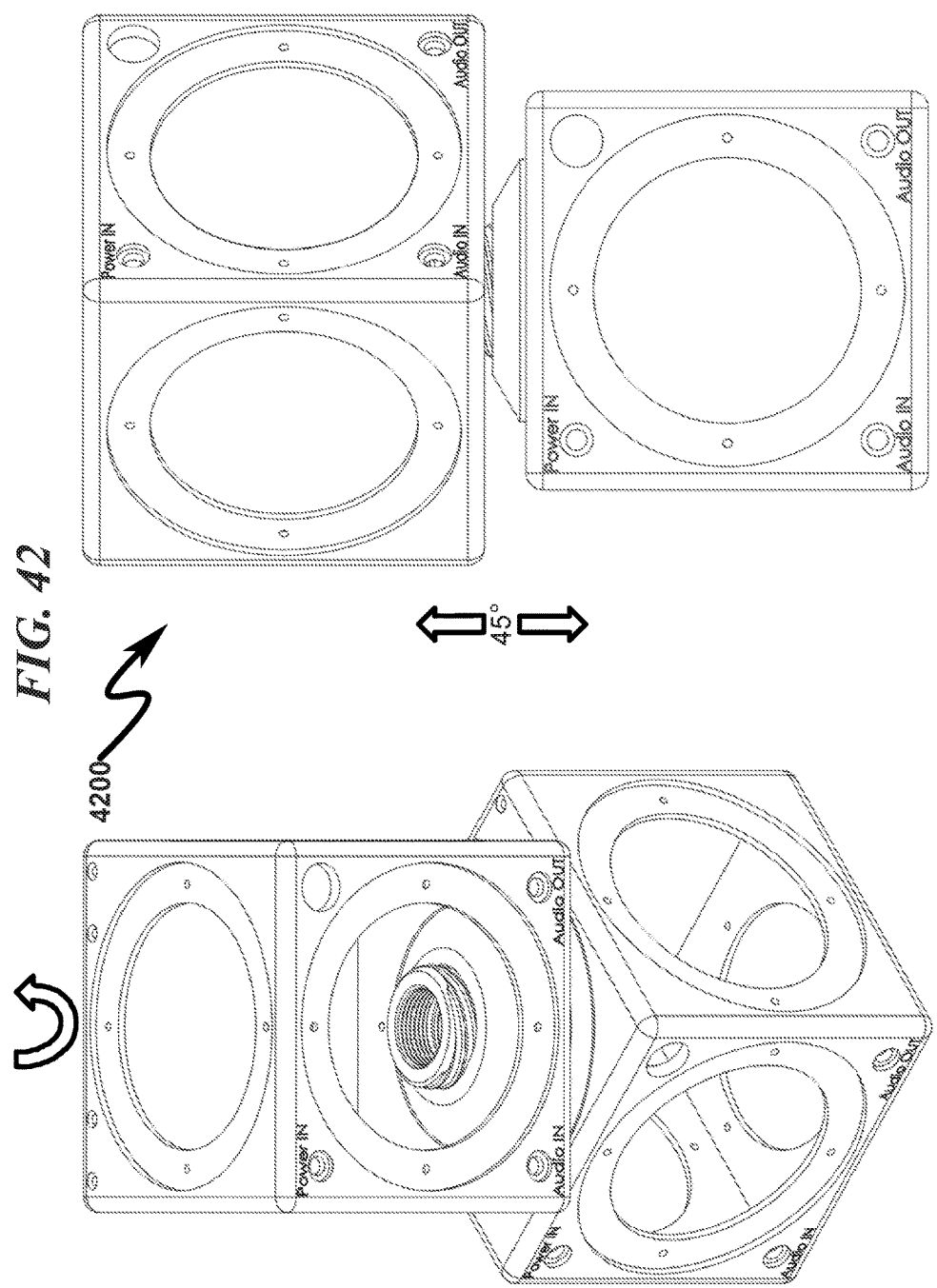
FIG. 42 illustrates top right front perspective and front face views of preferred exemplary invention mobile containing enclosures (MCEs) mated together using hermaphroditic plate connectors (HPCs) depicting a rotational engagement angle of 45 degrees.
Figure 44:
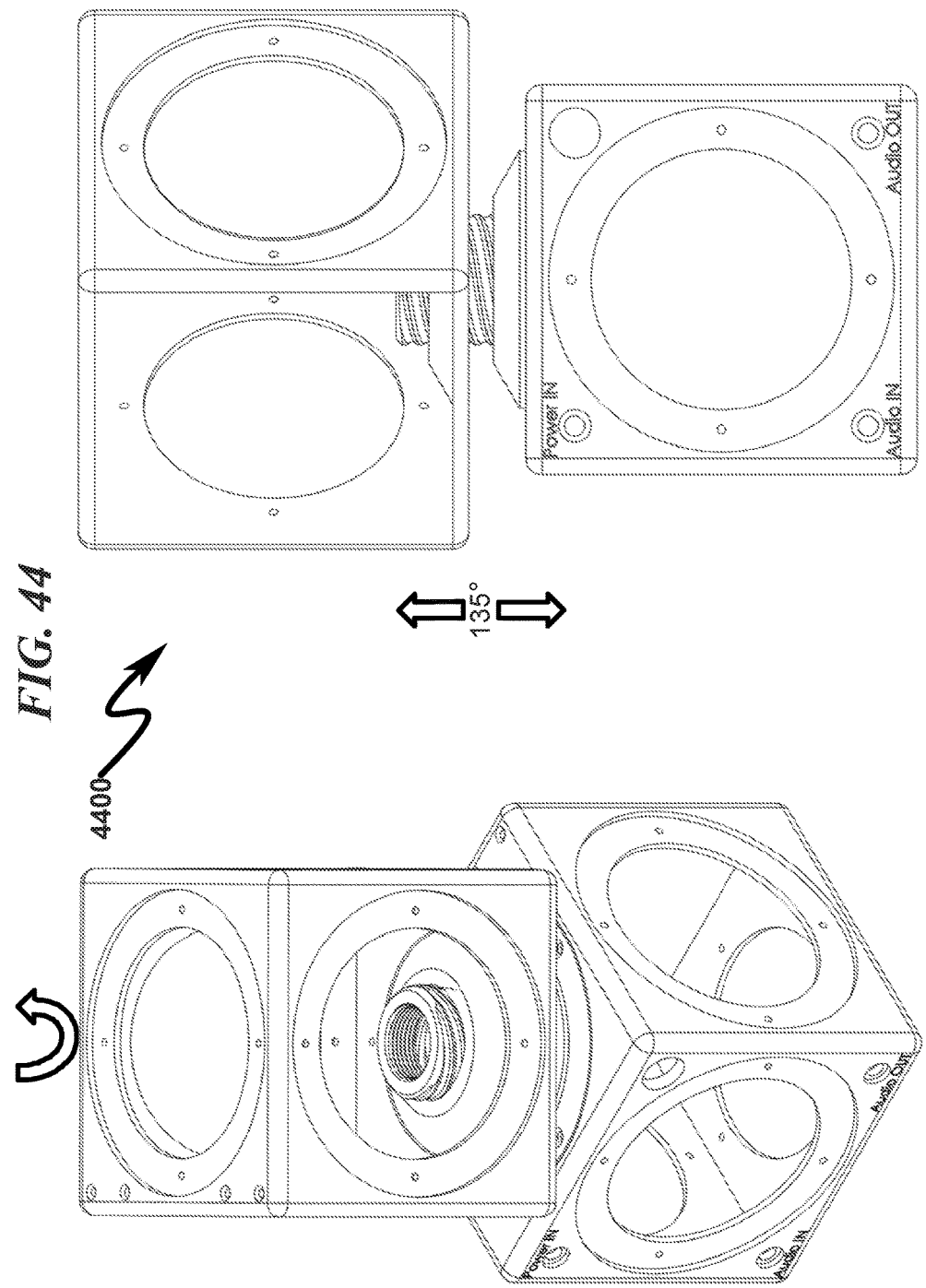
FIG. 44 illustrates top right front perspective and front face views of preferred exemplary invention mobile containing enclosures (MCEs) mated together using hermaphroditic plate connectors (HPCs) depicting a rotational engagement angle of 135 degrees.
Figure 45:
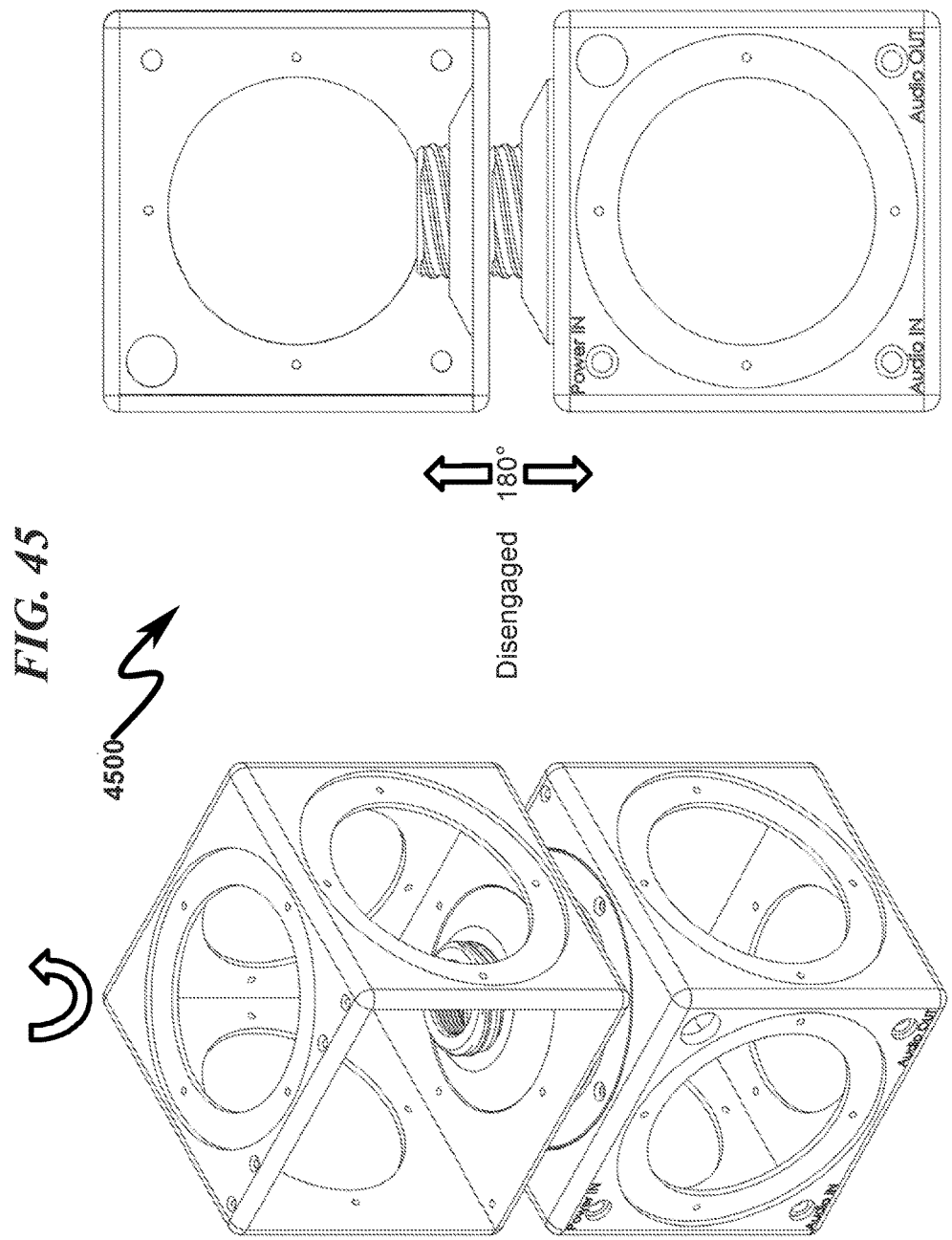
FIG. 45 illustrates top right front perspective and front face views of preferred exemplary invention mobile containing enclosures (MCEs) mated together using hermaphroditic plate connectors (HPCs) depicting a rotational engagement angle of 180 degrees.
Figure 46:
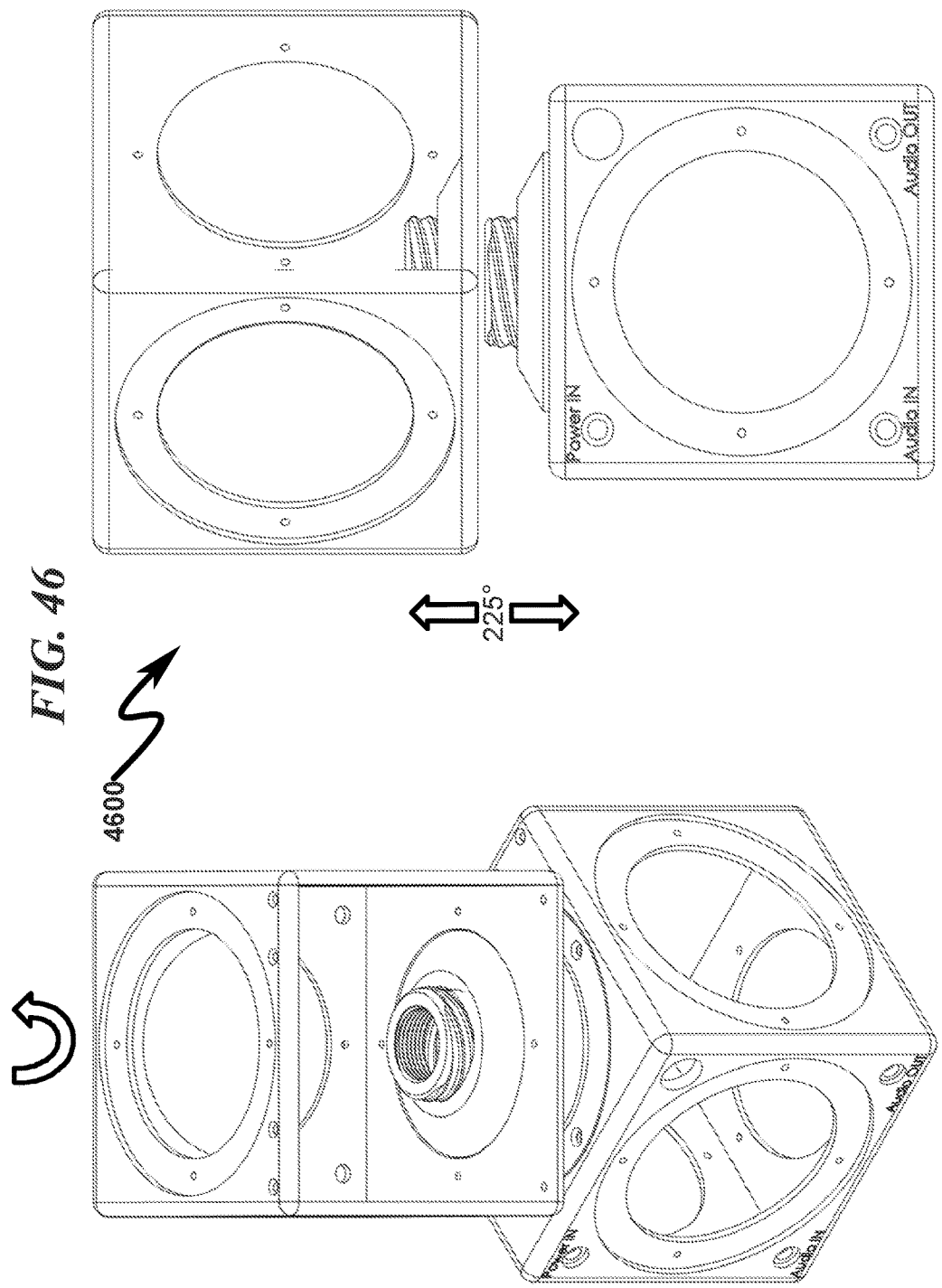
FIG. 46 illustrates top right front perspective and front face views of preferred exemplary invention mobile containing enclosures (MCEs) mated together using hermaphroditic plate connectors (HPCs) depicting a rotational engagement angle of 225 degrees.
Figure 48:
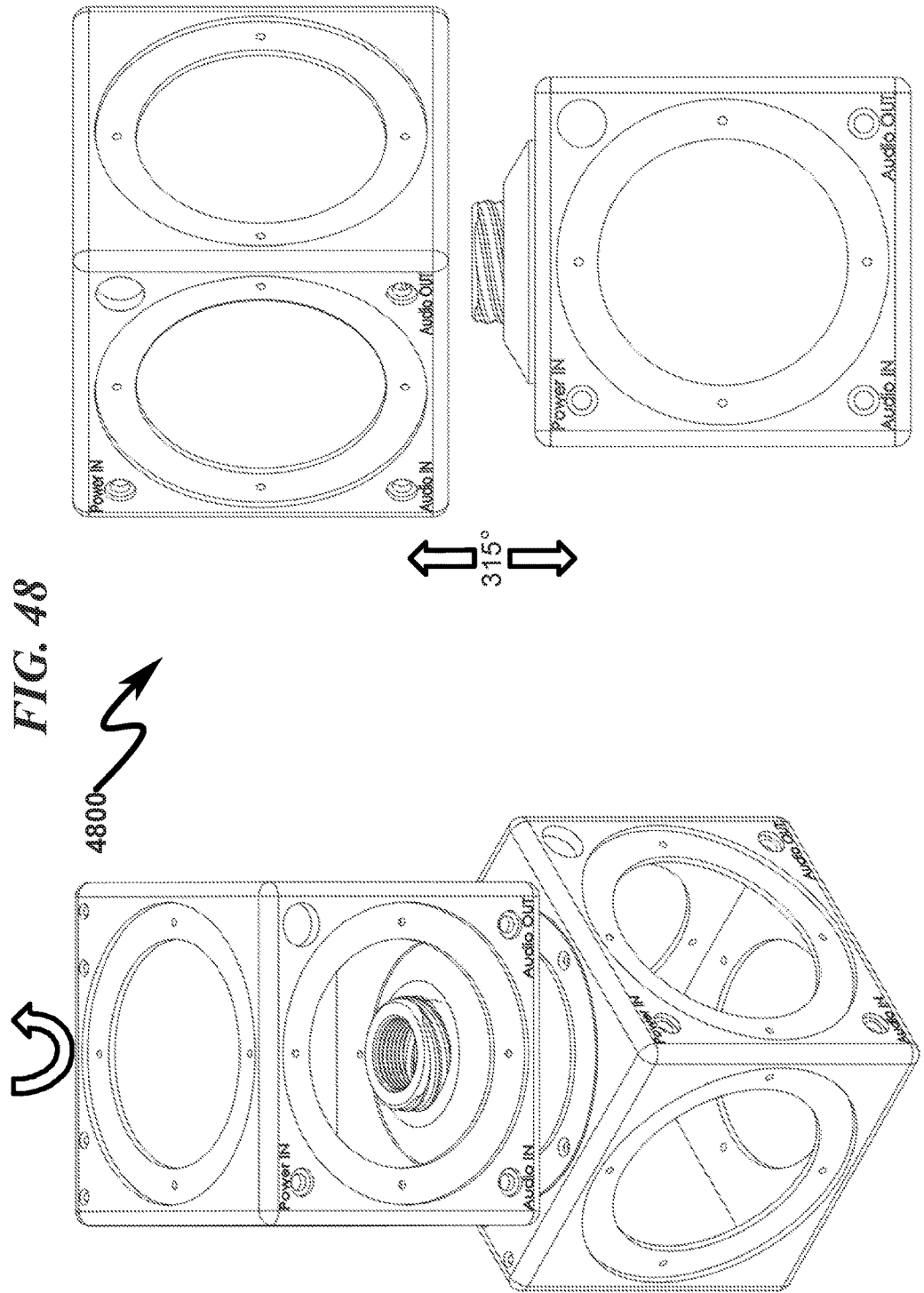
FIG. 48 illustrates top left front perspective and front face views of preferred exemplary invention mobile containing enclosures (MCEs) mated together using hermaphroditic plate connectors (HPCs) depicting a rotational engagement angle of 315 degrees.

FIG. 41 (4100)-FIG. 48 (4800) depict use of the hermaphroditic plate connectors (HPC) generally illustrated in FIG. 33 (3300)-FIG. 40 (4000) in conjunction with preferred exemplary invention mobile containing enclosures (MCEs) mated together with varying degrees of rotational engagement. These illustrated modular construction assemblies depict only the mobile containing enclosures (MCEs) without other elements of the invention to more clearly illustrate the assembly process. The depicted preferred exemplary embodiment of the HPC provides for a half-turn engagement of the MCEs using the HPC attached to each individual MCE.

Exemplary Modular Forms (4900)-(5600)

Figure 56:
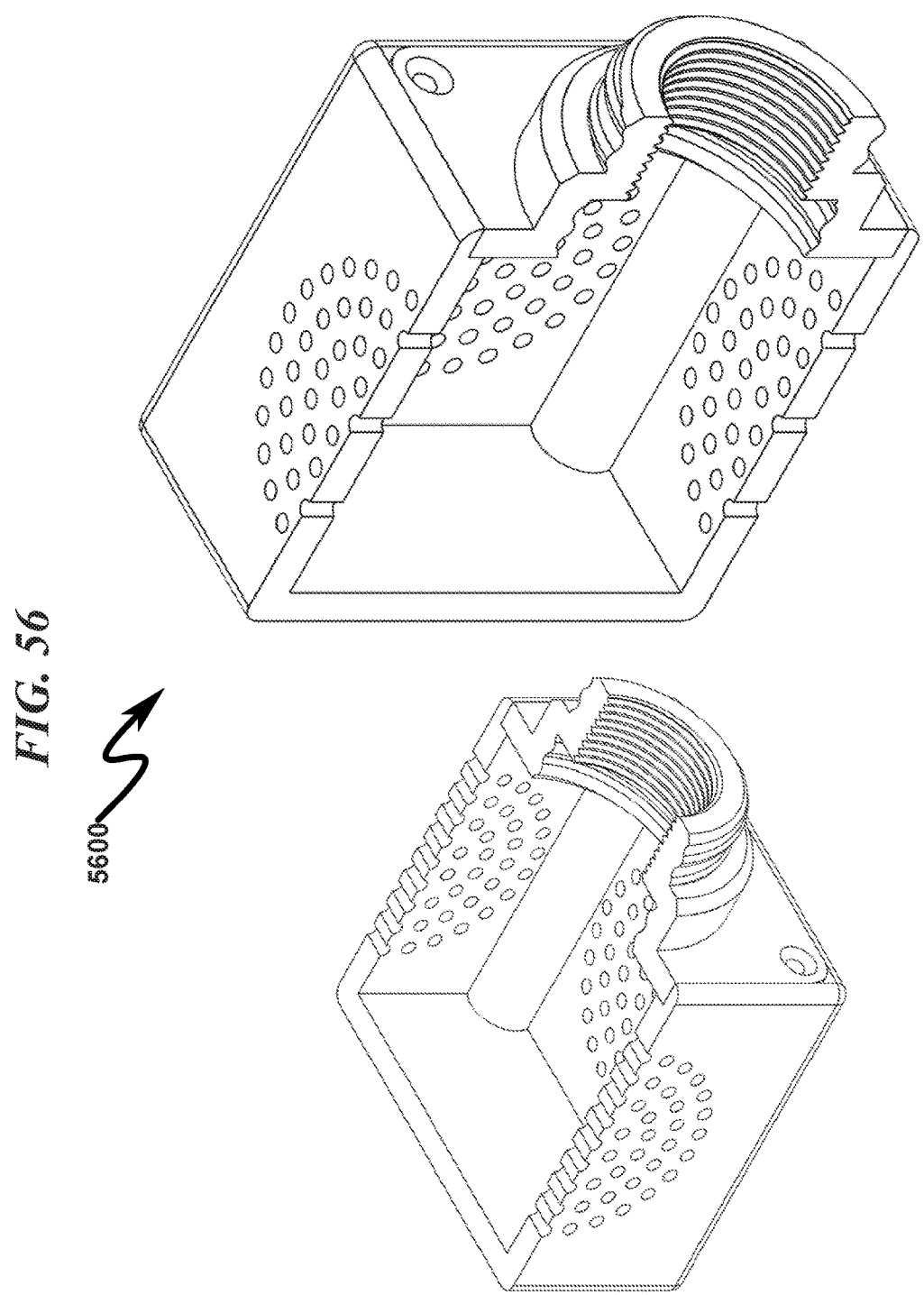
FIG. 56 illustrates perspective section views of an exemplary audio attachment module (AAM) suitable for connection to a MAM using a HPC.

This modular construction permits a wide variety of construction options for the present invention that may be determined in the field based on application context. Several of these are depicted in FIG. 49 (4900)-FIG. 56 (5600).

Figure 49:
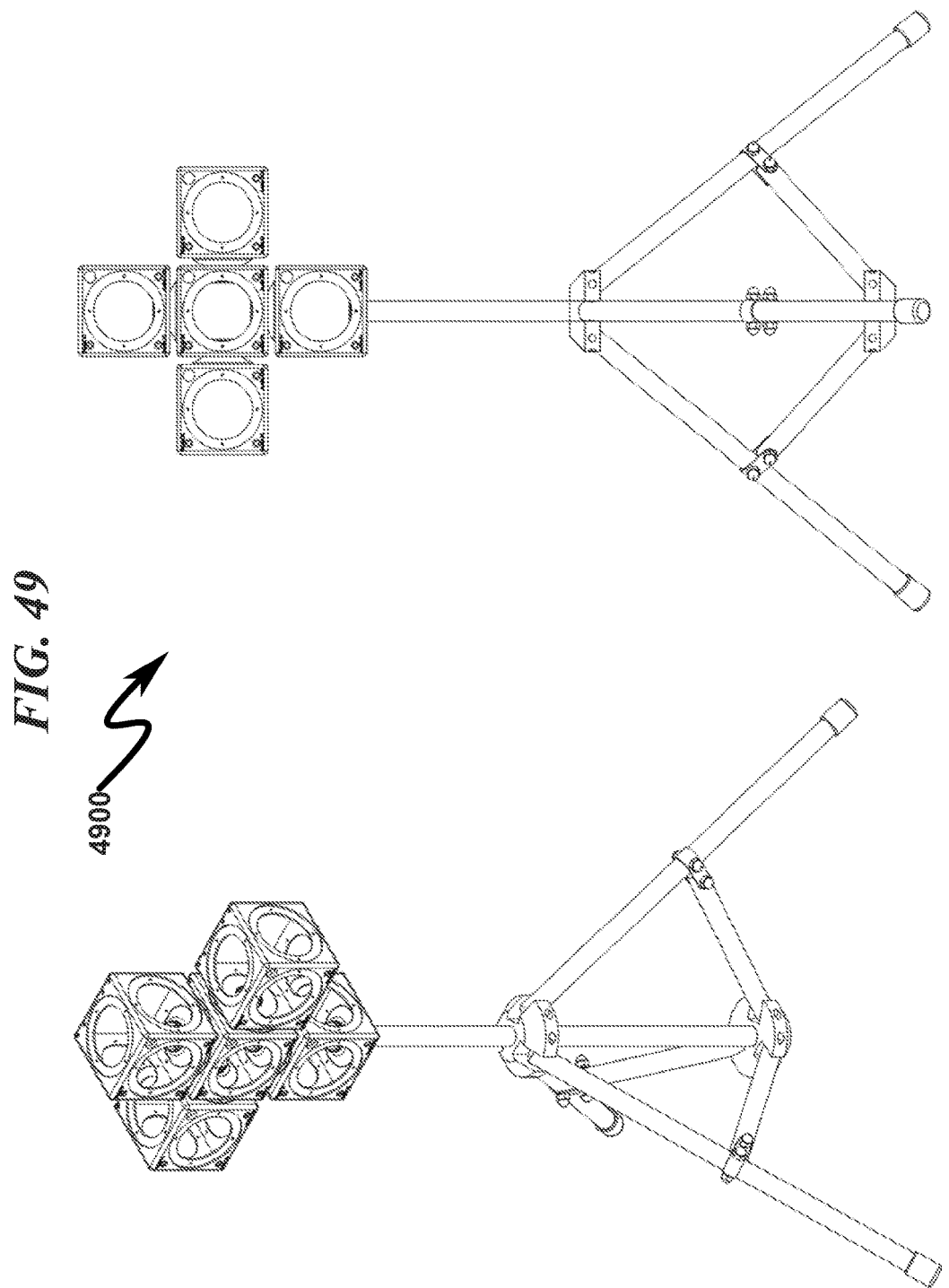
FIG. 49 illustrates perspective and front views of an exemplary application context in which five mobile audio modules (MAMs) (each comprising a mobile containing enclosure (MCE)) are attached together to form a unified mobile audio distribution node.
Figure 50:
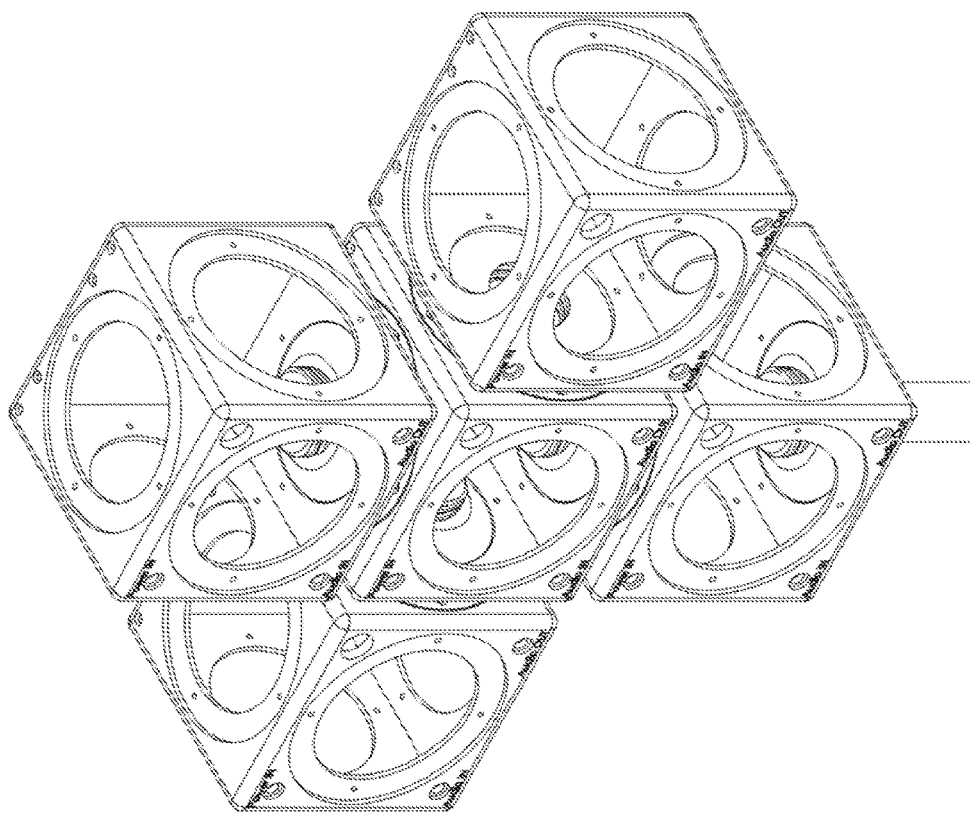
FIG. 50 illustrates a perspective detail view of an exemplary application context in which five mobile audio modules (MAMs) (each comprising a mobile containing enclosure (MCE)) are attached together to form a unified mobile audio distribution node.
Figure 51:
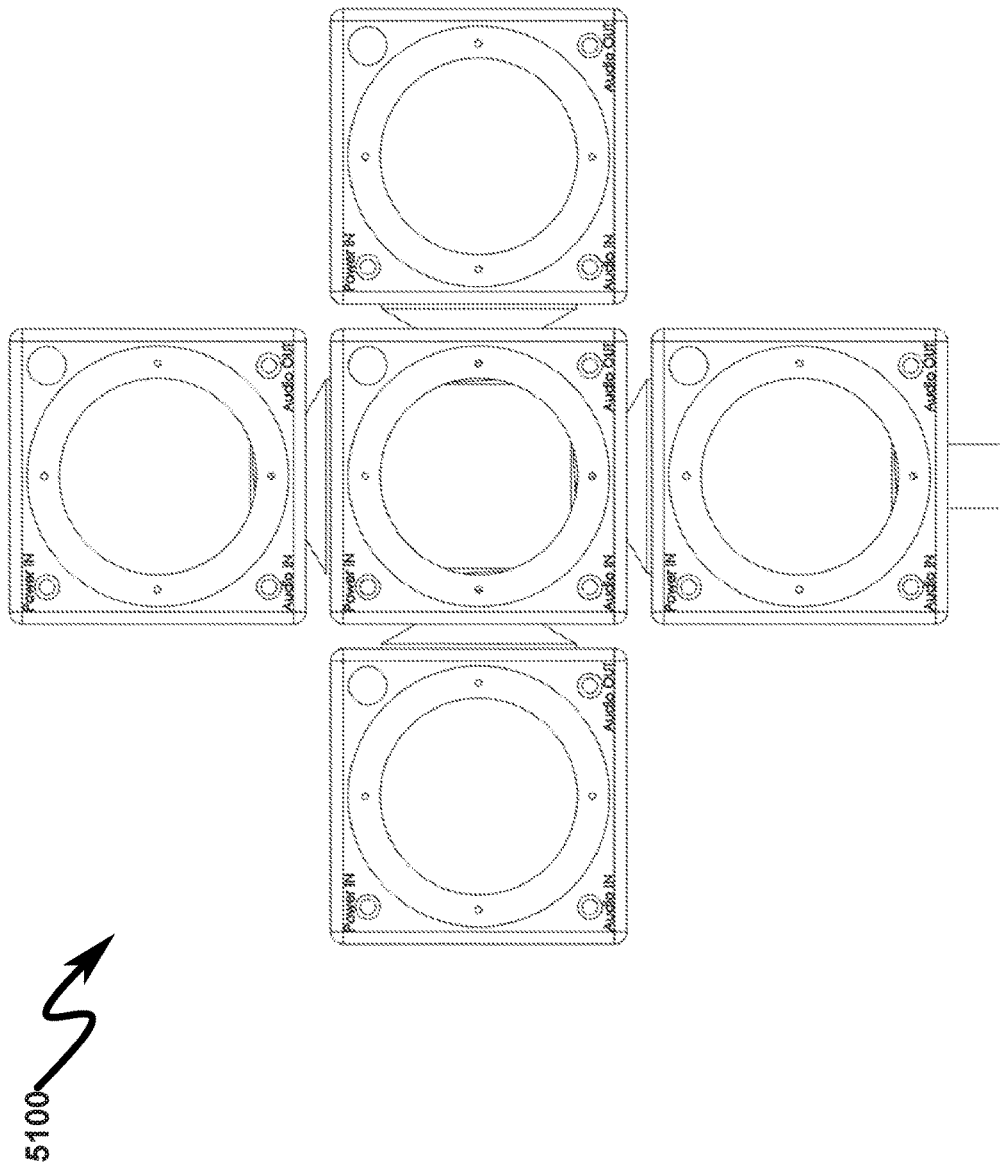
FIG. 51 illustrates a front detail view of an exemplary application context in which five mobile audio modules (MAMs) (each comprising a mobile containing enclosure (MCE)) are attached together to form a unified mobile audio distribution node.

FIG. 49 (4900)-FIG. 51 (5100) illustrates an exemplary application context in which five mobile audio modules (MAMs) (each comprising a mobile containing enclosure (MCE)) are attached together to form a unified mobile audio distribution node. For clarity of illustration, the internal components of the MAMs are omitted in this example. This configuration illustrates how the audio power distribution may be incrementally increased by combining MAMs onto a single support standard such as the illustrated tripod.

Figure 52:
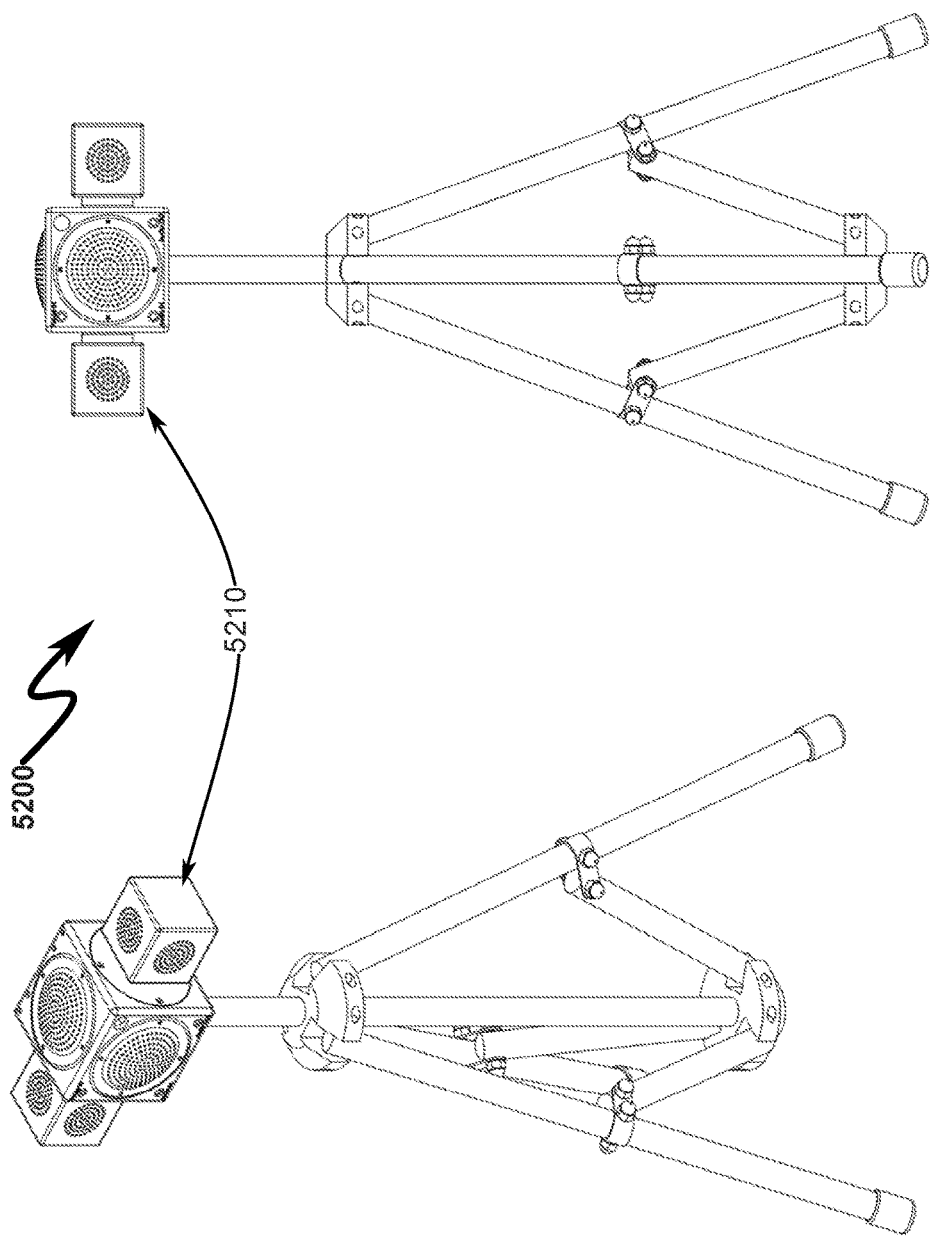
FIG. 52 illustrates perspective and front views of an exemplary application context in which a mobile audio module (MAM) (comprising a mobile containing enclosure (MCE)) is augmented with audio attachment modules (AAMs) to form a unified mobile audio distribution node.
Figure 53:
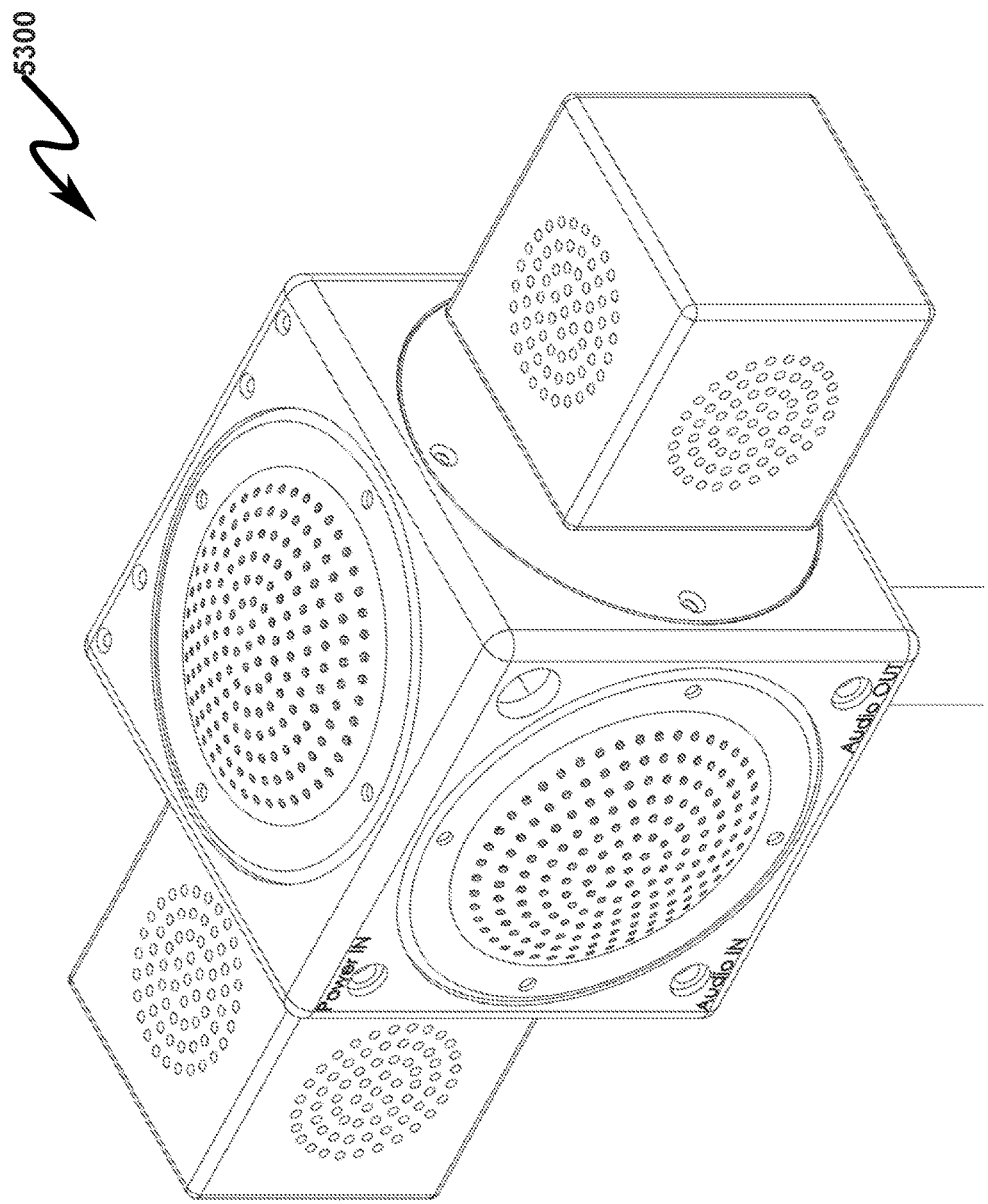
FIG. 53 illustrates a perspective detail view of an exemplary application context in which a mobile audio module (MAM) (comprising a mobile containing enclosure (MCE)) is augmented with audio attachment modules (AAMs) to form a unified mobile audio distribution node.
Figure 54:
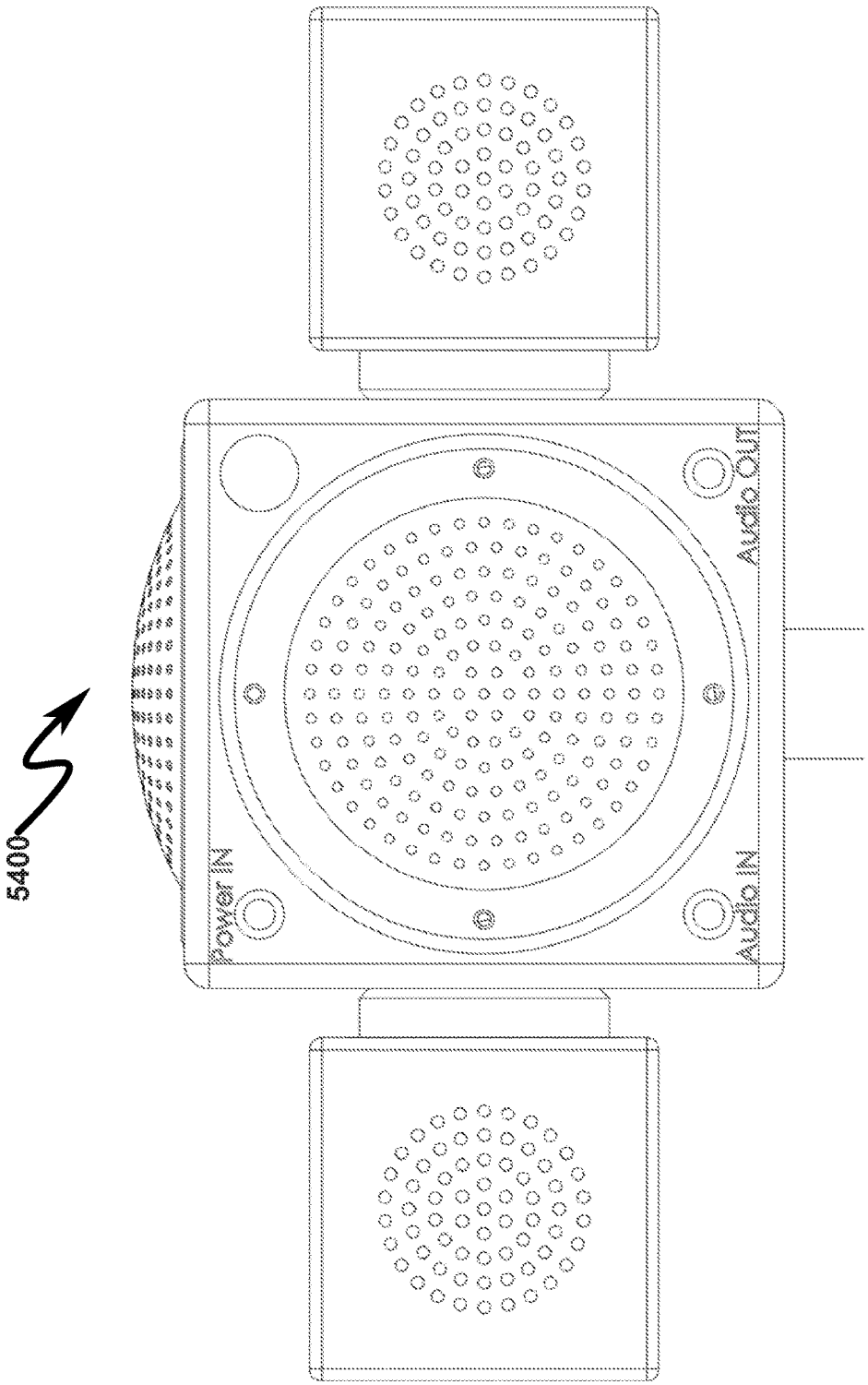
FIG. 54 illustrates a front detail view of an exemplary application context in which a mobile audio module (MAM) (comprising a mobile containing enclosure (MCE)) is augmented with audio attachment modules (AAMs) to form a unified mobile audio distribution node.
Figure 55:
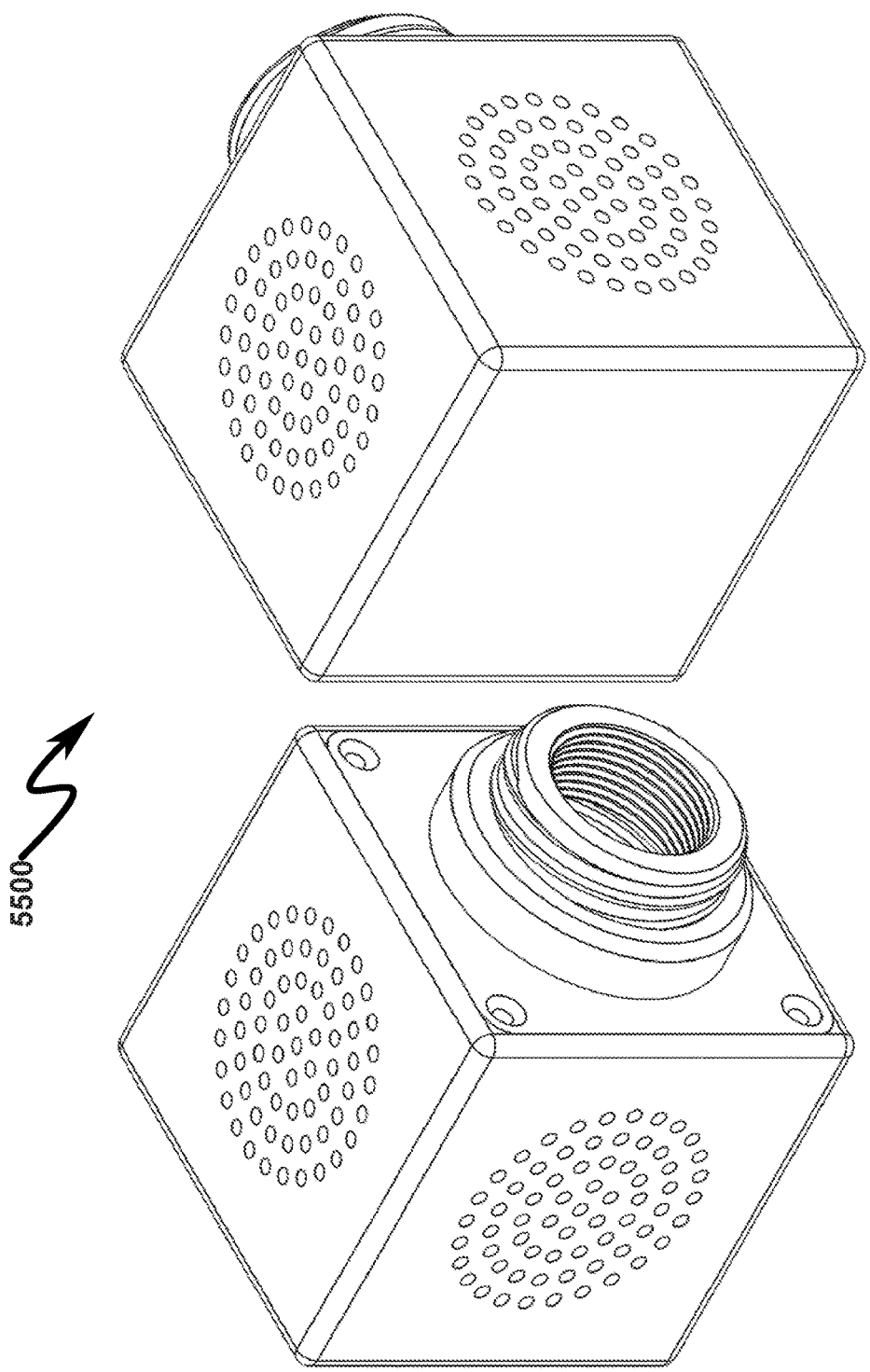
FIG. 55 illustrates perspective views of an exemplary audio attachment module (AAM) suitable for connection to a MAM using a HPC.

As generally depicted in FIG. 52 (5200)-FIG. 54 (5400), the HPC used to interconnect the MAMs may also be used to interconnect a MAM with an audio attachment module (AAM) (5210) that may contain a directional speaker output (to direct audio to a particular area of the surrounding area), additional speakers, battery modules, and/or lighting/control functions that are controlled via wireless communication. FIG. 55 (5500)-FIG. 56 (5600) provide additional detail on the structure of the AAM (5210).

Mobile Containing Enclosure (MCE) (5700)-(5800)

Figure 57:
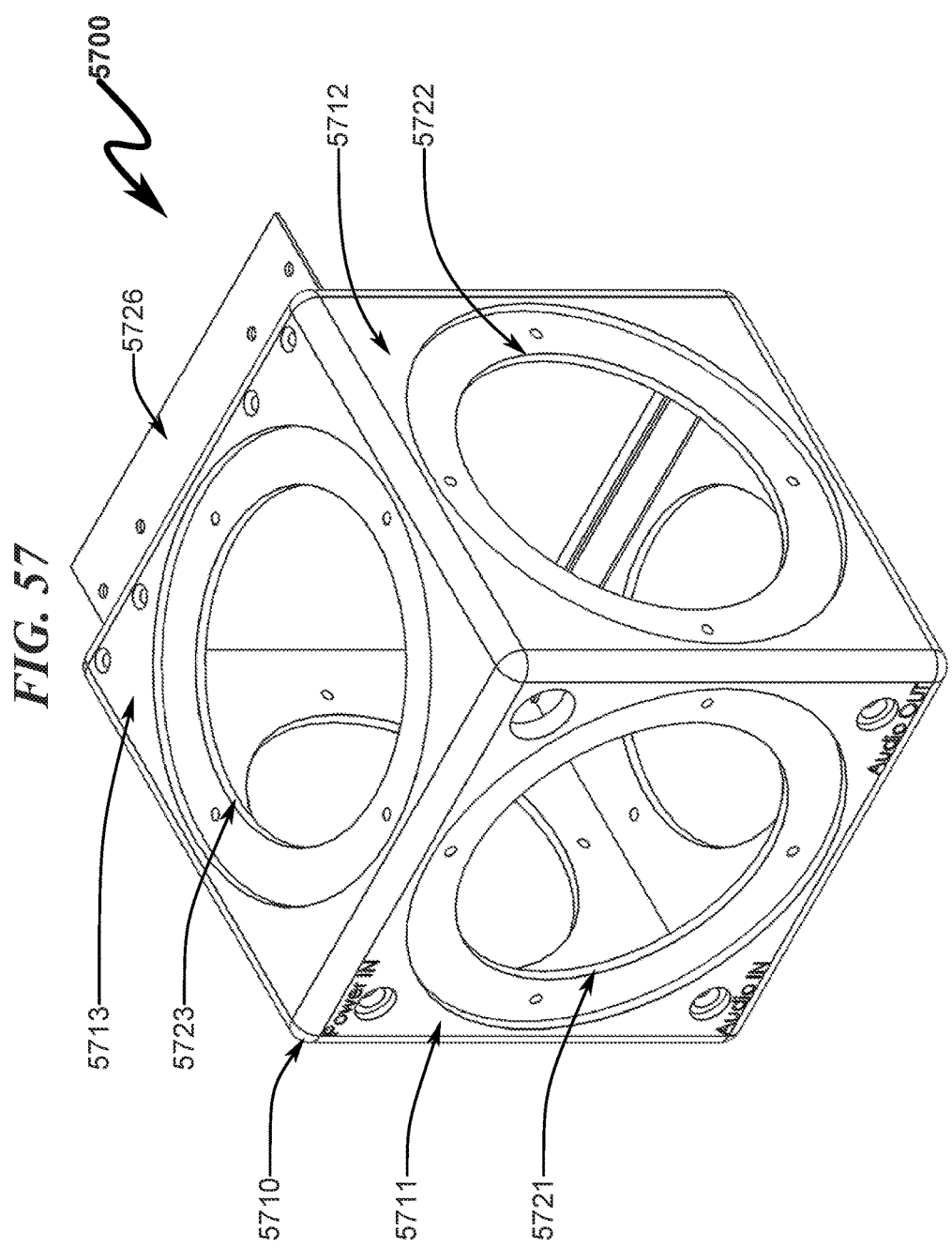
FIG. 57 illustrates a top right front perspective view of a preferred exemplary mobile containing enclosure (MCE) embodiment with rotatable hinge.
Figure 58:
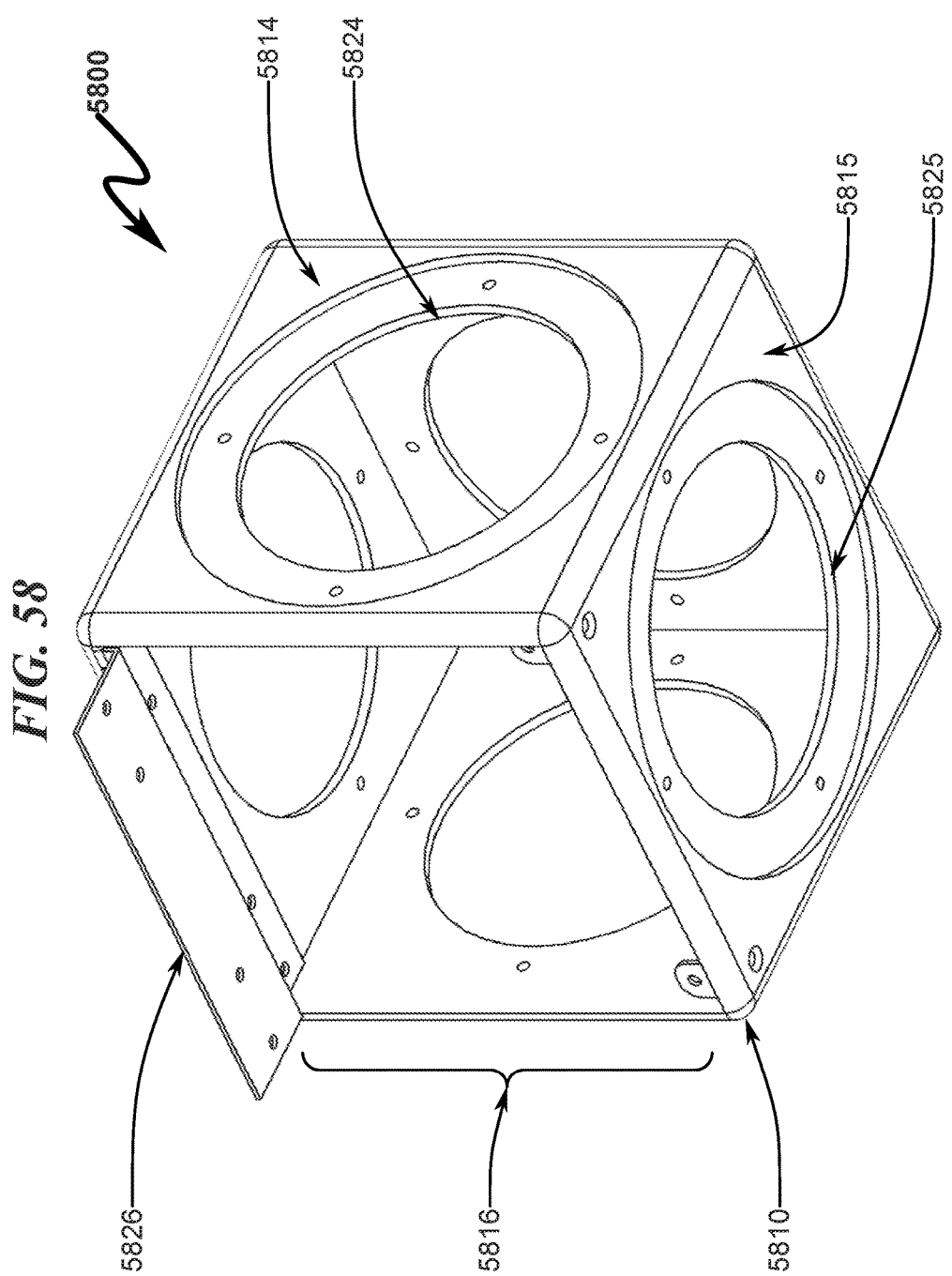
FIG. 58 illustrates a bottom left rear perspective view of a preferred exemplary mobile containing enclosure (MCE) embodiment with rotatable hinge.

As generally illustrated in FIG. 57 (5700)-FIG. 58 (5800), the mobile audio mobile (MAM) in many preferred embodiments incorporates a mobile containing enclosure (MCE) (5710, 5810) comprising a box having a front face (FF) (5711), right face (RF) (5812), top face (TF) (5713), left face (LF) (5814), bottom face (BF) (5815), and a rear opening (RO) (5816).

The front face (FF) (5711), right face (RF) (5812), top face (TF) (5713), left face (LF) (5814), and bottom face (BF) (5815) each contain a respective front face plate connection void (FFV) (5721), right face plate connection void (RFV) (5722), top face plate connection void (TFV) (5723), left face plate connection void (LFV) (5924), and bottom face plate connection void (BFV) (5925).

In most configurations, the front face plate connection void (FFV) (5721) incorporates a mobile audio speaker (MAS). The right face plate connection void (RFV) (5722), top face plate connection void (TFV) (5723), left face plate connection void (LFV) (5924), and bottom face plate connection void (BFV) (5925) are each covered individually by one or more types of removable plate connector (RPC) with at least one of the RPC covering the right face plate connection void (RFV) (5722), top face plate connection void (TFV) (5723), left face plate connection void (LFV) (5924), and bottom face plate connection void (BFV) (5925) comprising a hermaphroditic plate connector (HPC). Remaining plate connection voids are typically covered with audio speaker grills (ASGs), but may in some circumstances be covered with circular plates conforming to the dimensions of the plate connection voids.

Rear Opening Lid (5900)-(6400)

Figure 59:
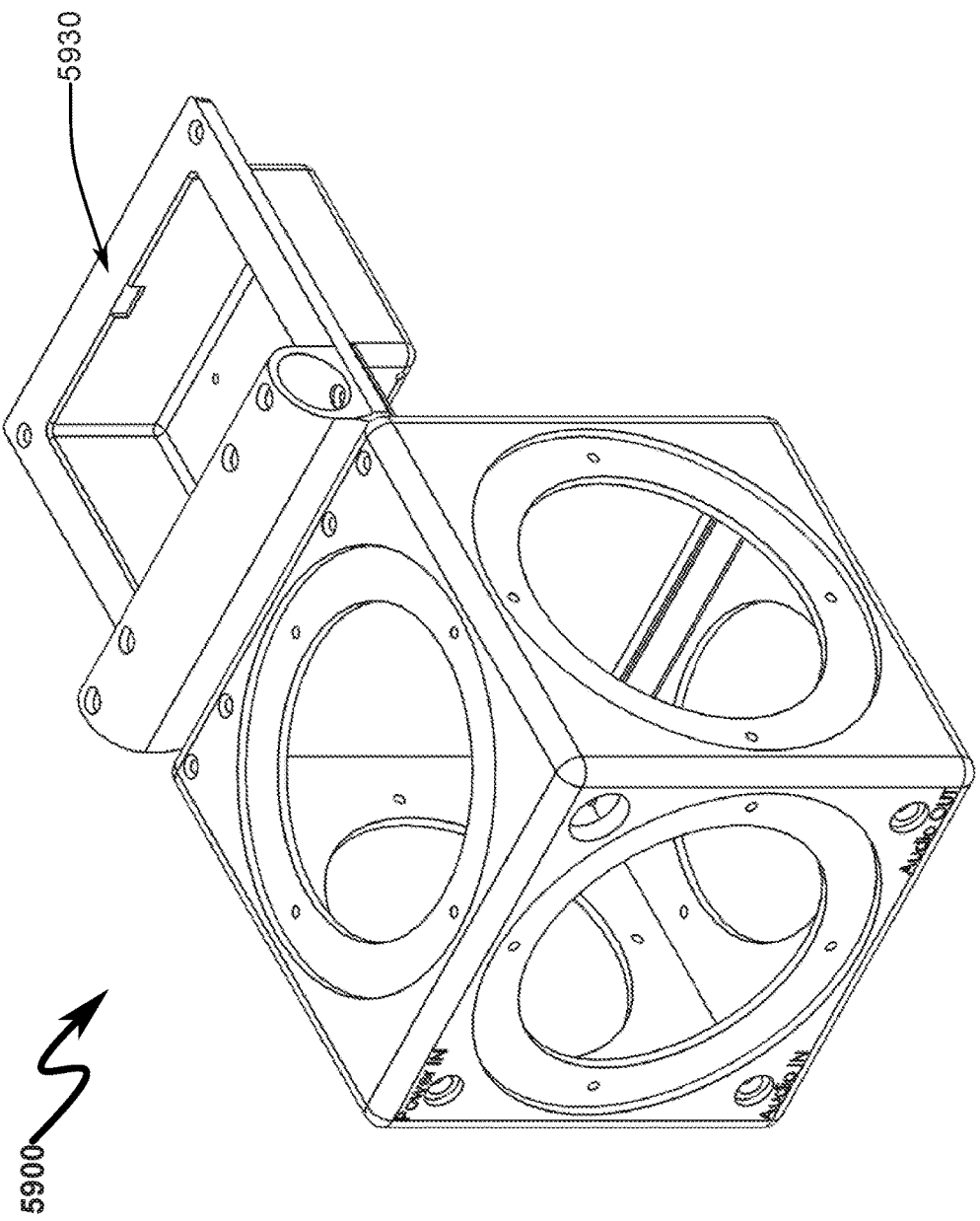
FIG. 59 illustrates a top right front perspective view of a preferred exemplary mobile containing enclosure (MCE) embodiment with rotatable hinge and rear opening lid (ROL)
Figure 60:
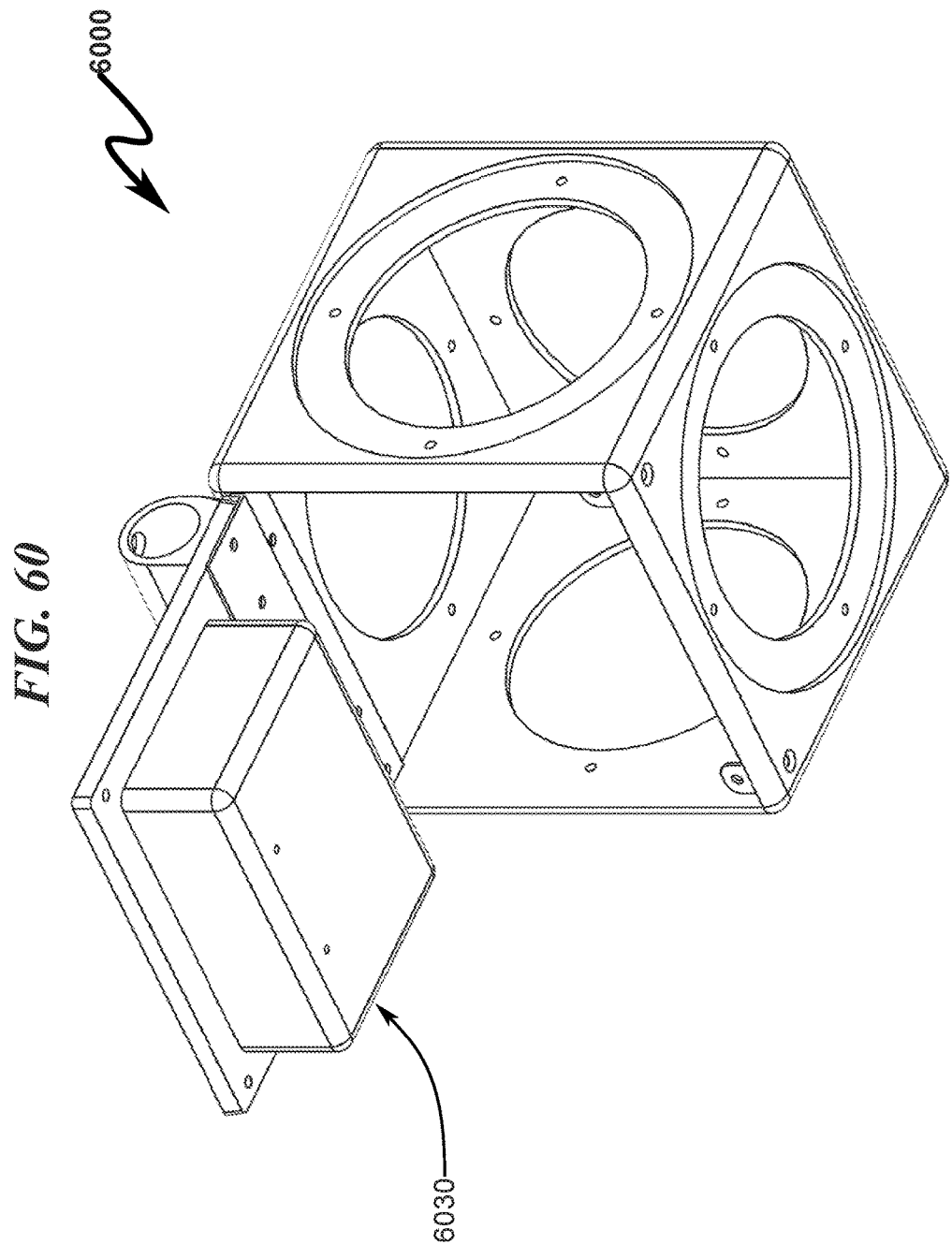
FIG. 60 illustrates a bottom left rear perspective view of a preferred exemplary mobile containing enclosure (MCE) embodiment with rotatable hinge and rear opening lid (ROL)
Figure 64:
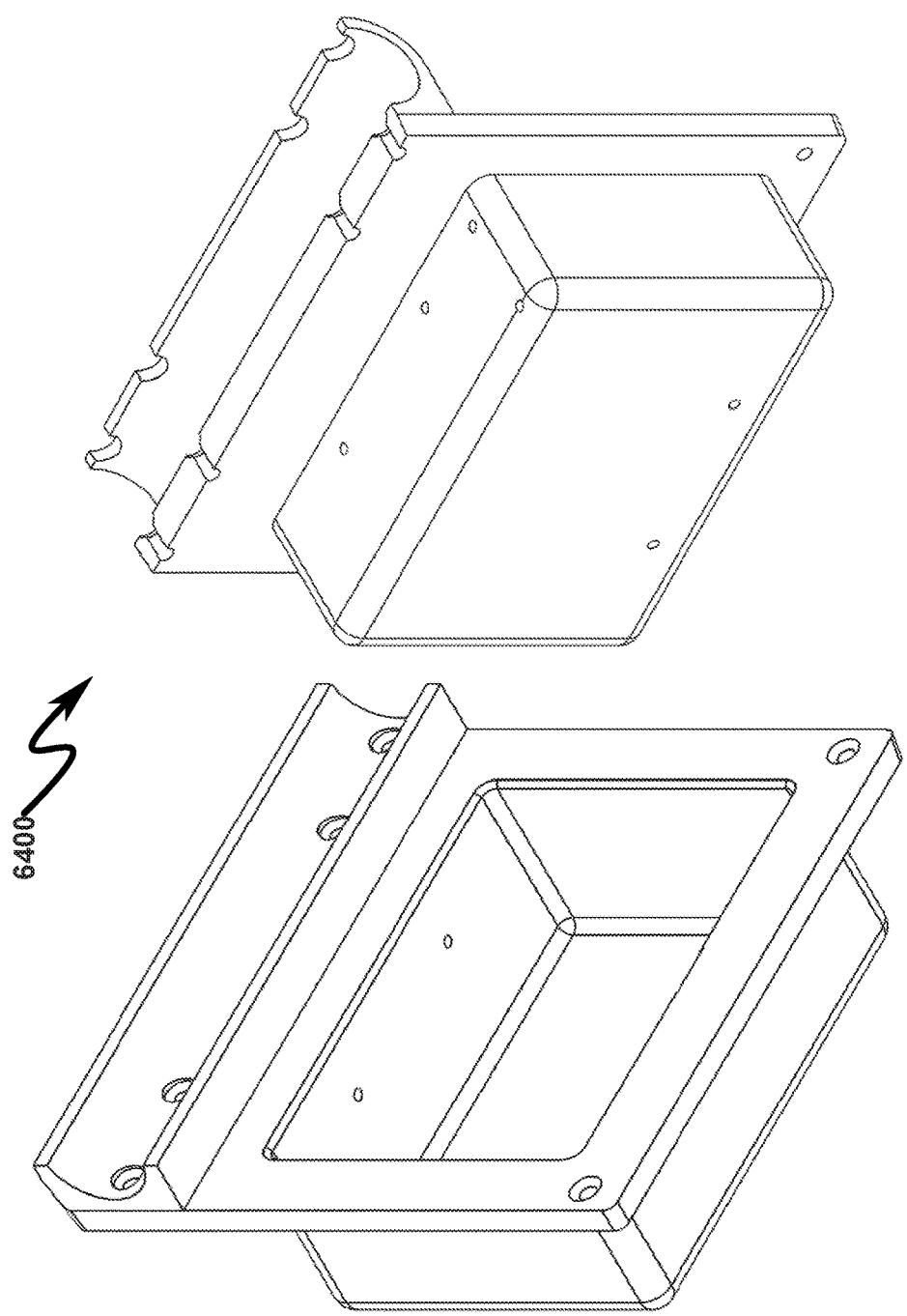
FIG. 64 illustrates top and front detail perspective section views of a preferred exemplary rear opening lid (ROL) embodiment.

As generally depicted in FIG. 57 (5700)-FIG. 58 (5800), a rotatable hinge (5726, 5826) is attached to the top face (TF) (5713) and configured for mechanical connection to a rear opening lid (ROL) that covers the rear opening (RO) (5816). As depicted, the ROL (5930, 6030) is configured to accept one of the APR when the APR is electrically decoupled from the ASM. As depicted in other figures, the ROL (5930, 6030) comprises a mobile battery pack (MBP) and a mobile audio amplifier (MAA) with a battery retention compartment (BRC) configured to accept the MBP and supporting structures configured to mechanically attach and support the MAA. Further detail of the ROL (5930, 6030) is depicted in FIG. 59 (5900)-FIG. 64 (6400).

Audio Synchronization Module (ASM) (6500)-(8800)

Figure 65:
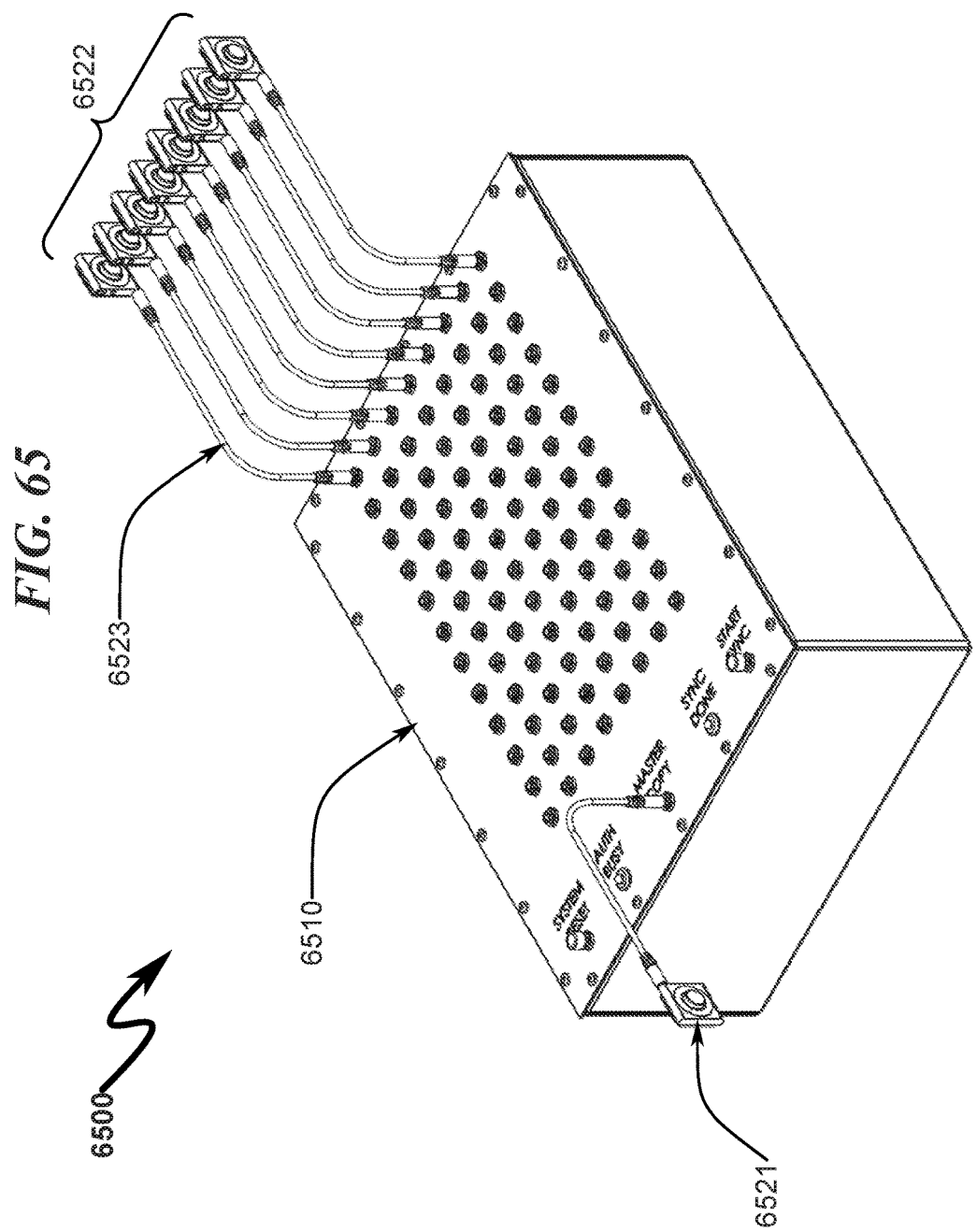
FIG. 65 illustrates a top right front perspective view of a preferred exemplary audio synchronization module (ASM) with attached master recording device (MRD) and multiple synchronized APR devices attached.
Figure 66:
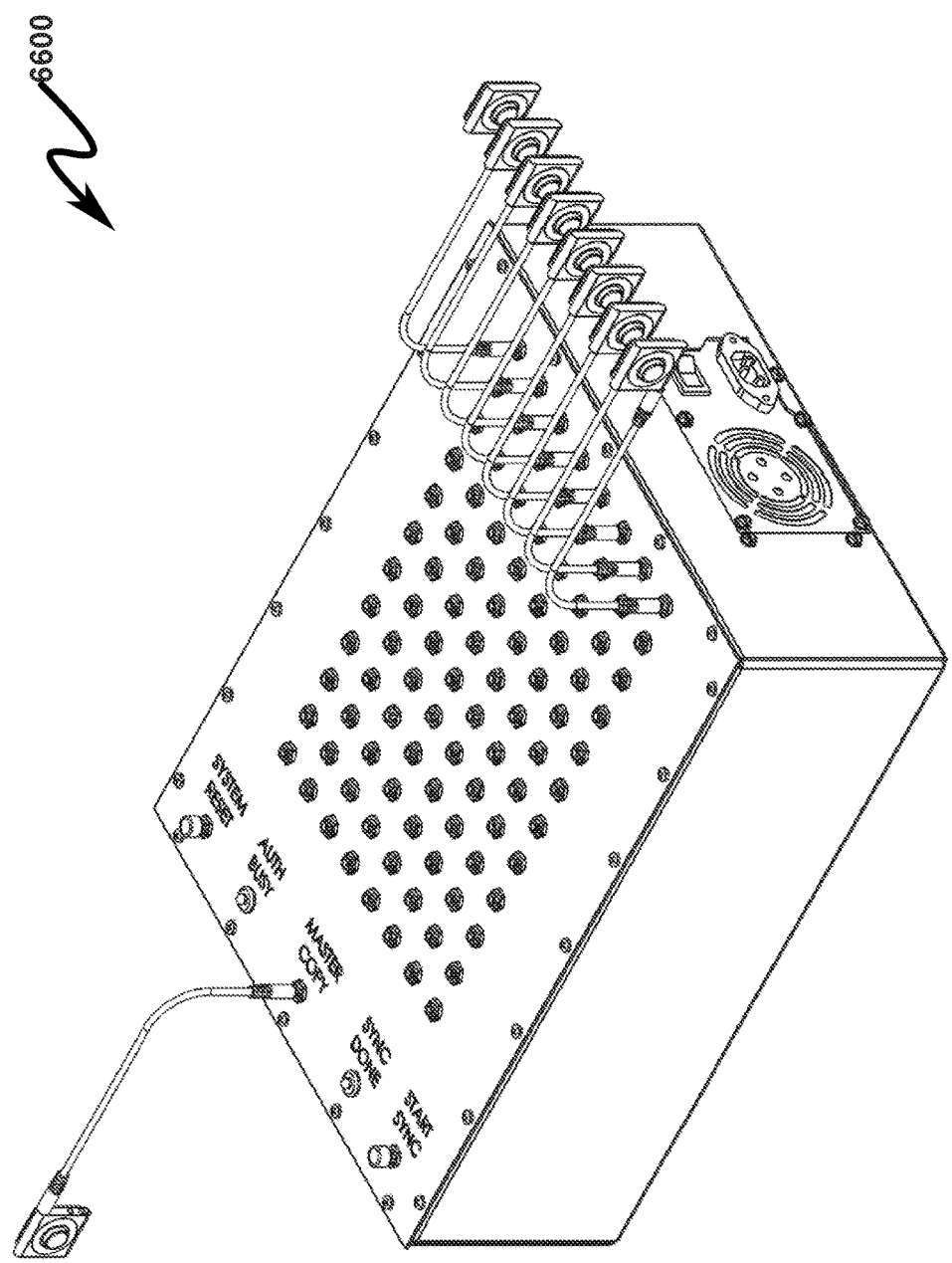
FIG. 66 illustrates a top right rear perspective view of a preferred exemplary audio synchronization module (ASM) with attached master recording device (MRD) and multiple synchronized APR devices attached.
Figure 67:
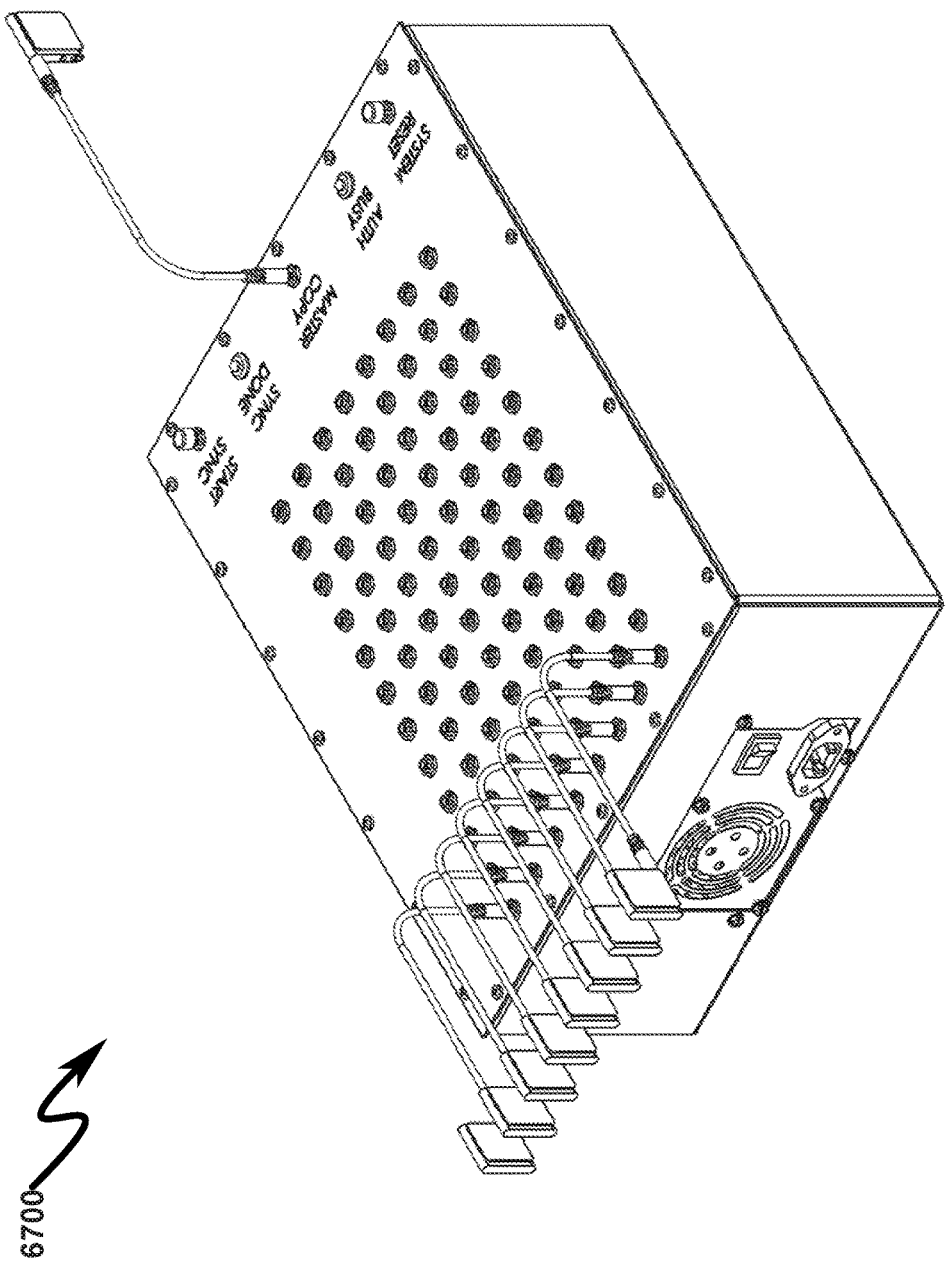
FIG. 67 illustrates a top left rear perspective view of a preferred exemplary audio synchronization module (ASM) with attached master recording device (MRD) and multiple synchronized APR devices attached.
Figure 68:
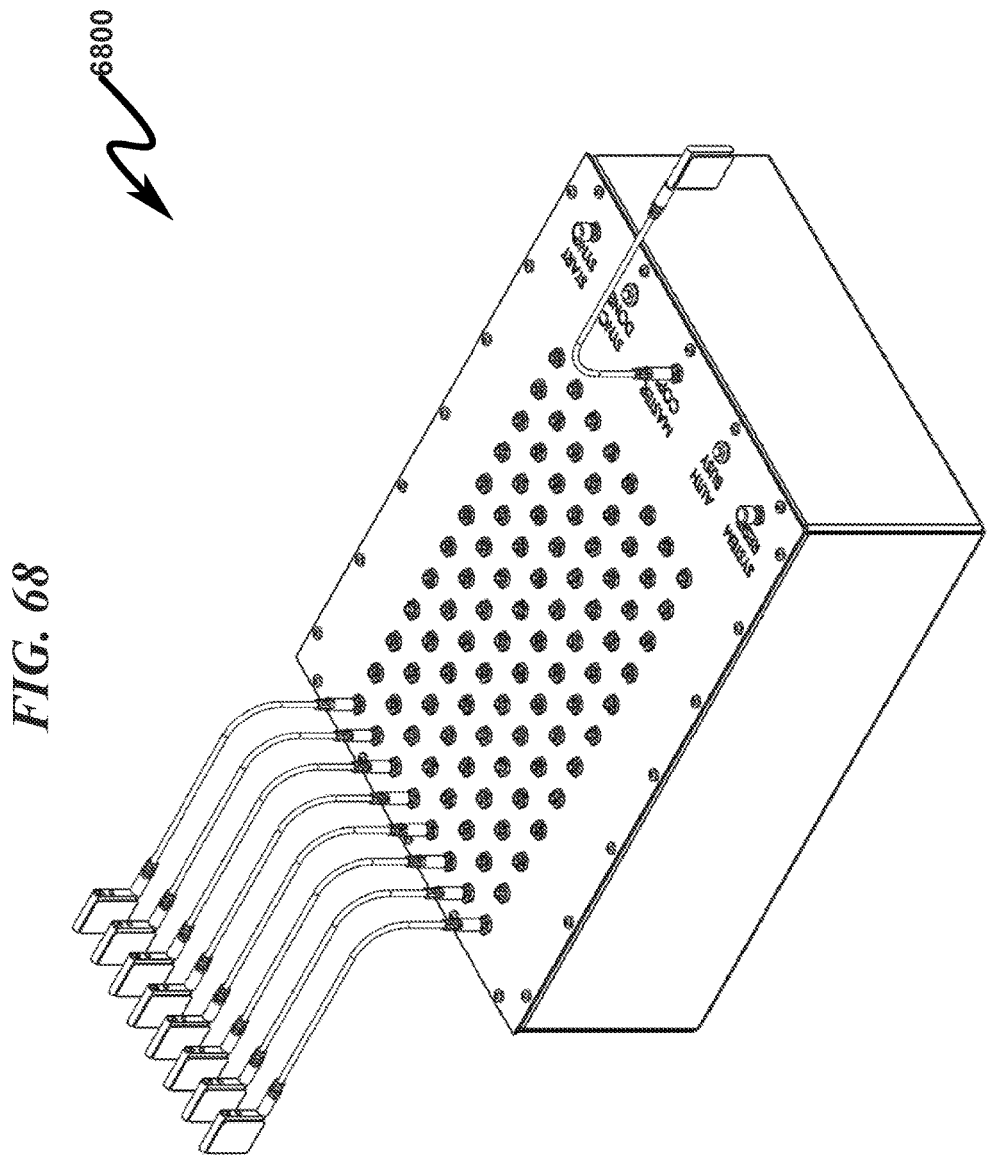
FIG. 68 illustrates a top left front perspective view of a preferred exemplary audio synchronization module (ASM) with attached master recording device (MRD) and multiple synchronized APR devices attached.
Figure 88:
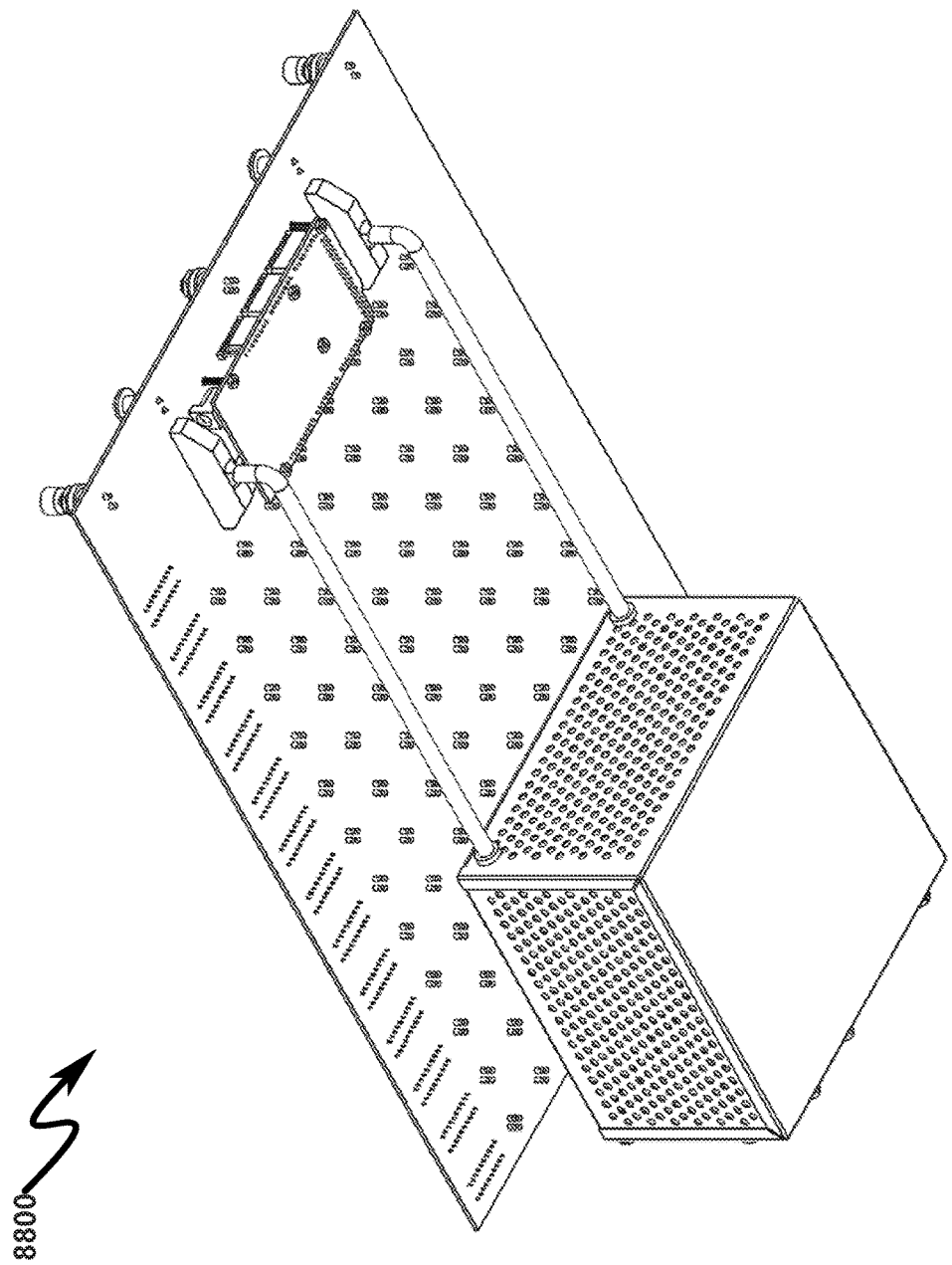
FIG. 88 illustrates a bottom left front perspective view of a preferred exemplary audio synchronization module (ASM) with enclosure case and enclosure cover removed.

A preferred exemplary embodiment of an audio synchronization module (ASM) is generally depicted in the views of FIG. 65 (6500)-FIG. 88 (8800). Referencing FIG. 65 (6500), the ASM (6510) is depicted in a typical application context in which a master recording device (MRD) (6521) is replicated to a plurality of APRs (6522) that are attached to the ASM (6510) using TRRS (tip-ring-ring-shield) USB male-male cable connectors (6523).

Figure 69:
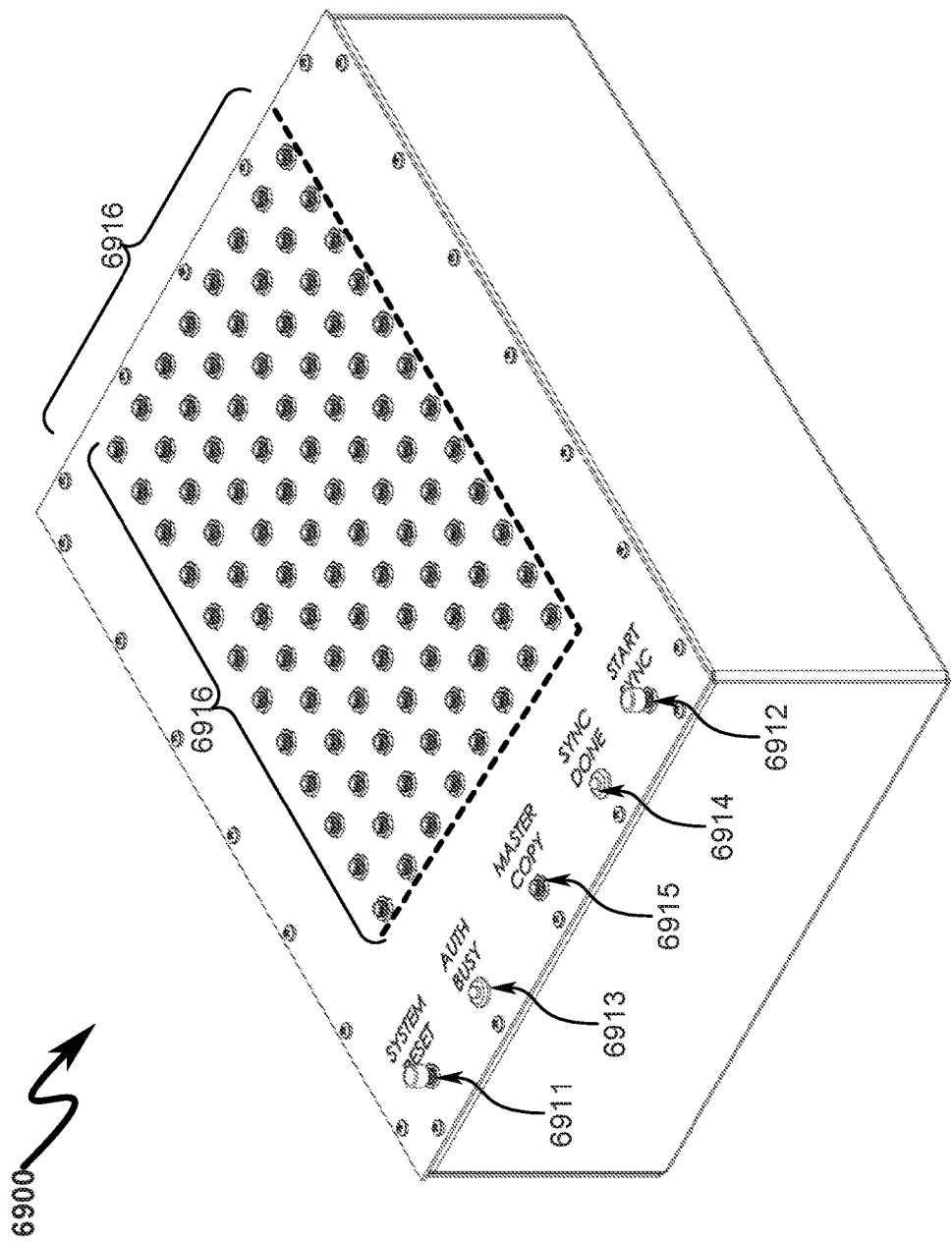
FIG. 69 illustrates a top right front perspective view of a preferred exemplary audio synchronization module (ASM)
Figure 70:
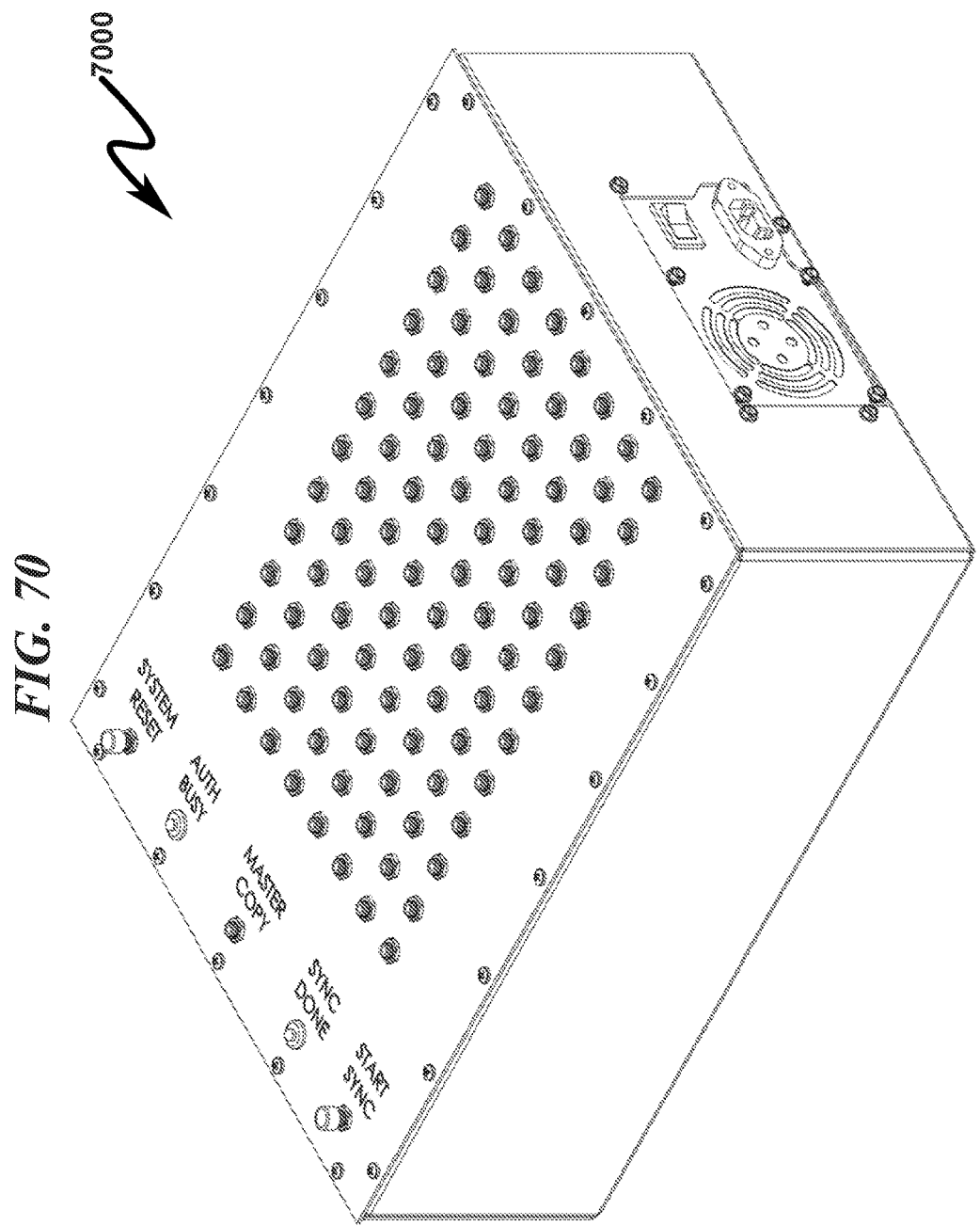
FIG. 70 illustrates a top right rear perspective view of a preferred exemplary audio synchronization module (ASM)
Figure 71:
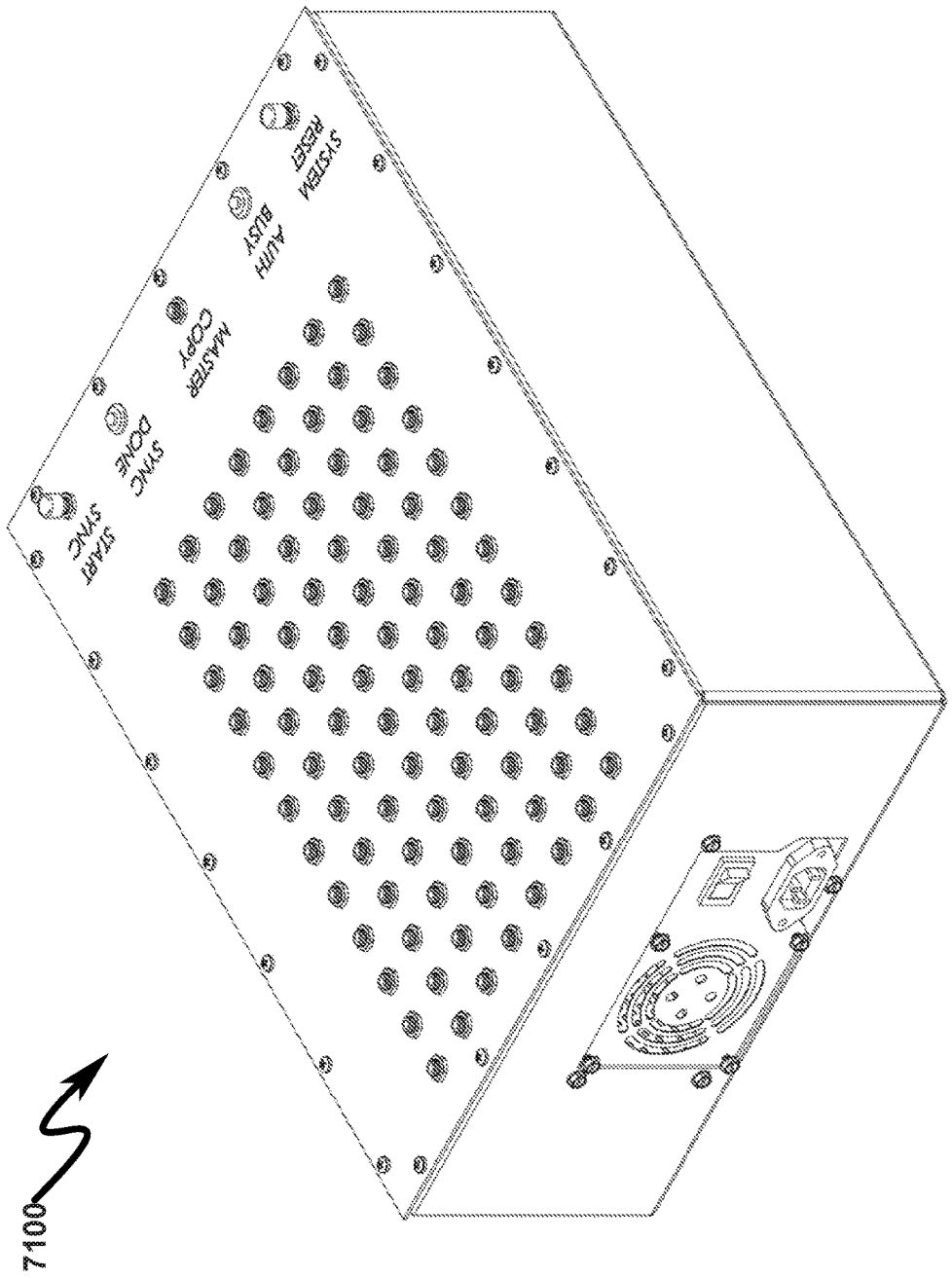
FIG. 71 illustrates a top left rear perspective view of a preferred exemplary audio synchronization module (ASM)
Figure 72:
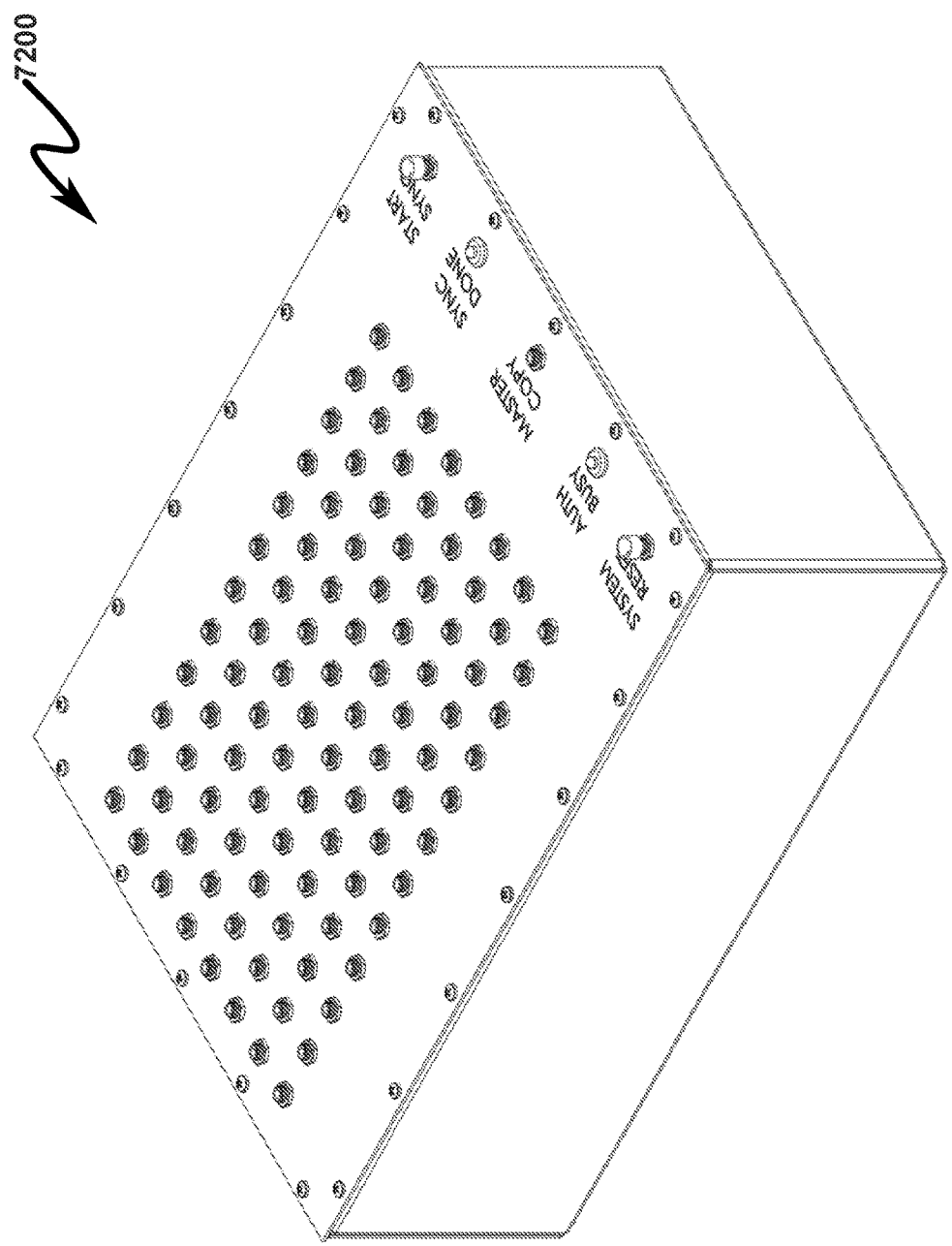
FIG. 72 illustrates a top left front perspective view of a preferred exemplary audio synchronization module (ASM)

Control functions and indicators depicted in FIG. 69 (6900)-FIG. 72 (7200) correspond to previously discussed ASM functions and indicators and include MASTER RESET pushbutton (6911) to place the system in a known state, START SYNCHRONIZATION pushbutton (6912) to begin the replication/synchronization process for all attached APRs, and AUTHENTICATION BUSY indicator (6913) to indicate authentication in progress for the attached APRs, and a SYNCHRONIZATION DONE indicator (6914) to indicate that all attached APRs have been replicated and properly synchronized in time. A MASTER RECORDING input (6915) is provided to allow input of a master audio recording for the replication process. In some circumstances this input may be obtained from one of the APR TRRS jacks provided in the APR connection matrix (6916).

Figure 73:
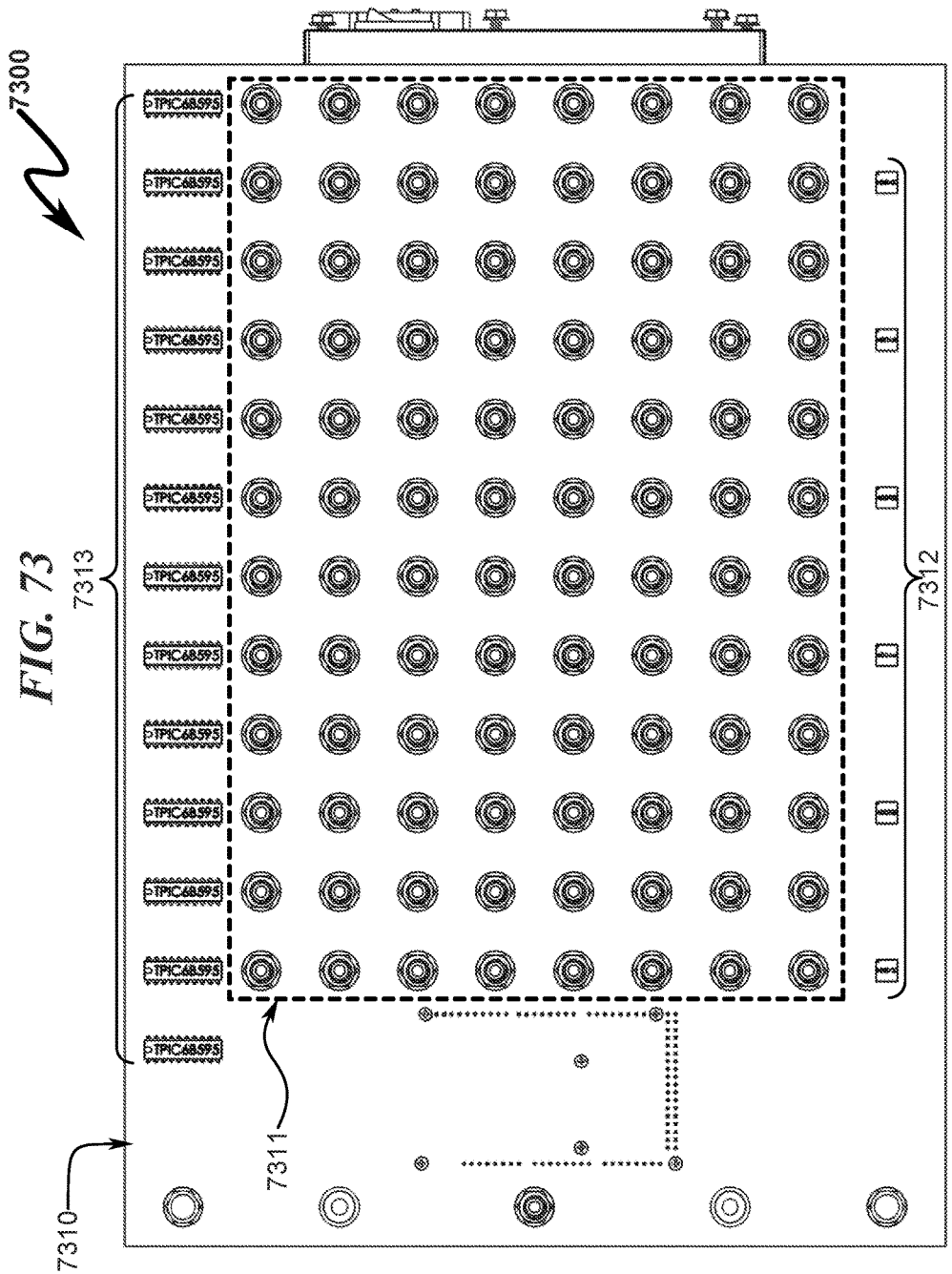
FIG. 73 illustrates a top view of a preferred exemplary audio synchronization module (ASM) with enclosure case and enclosure cover removed.
Figure 74:
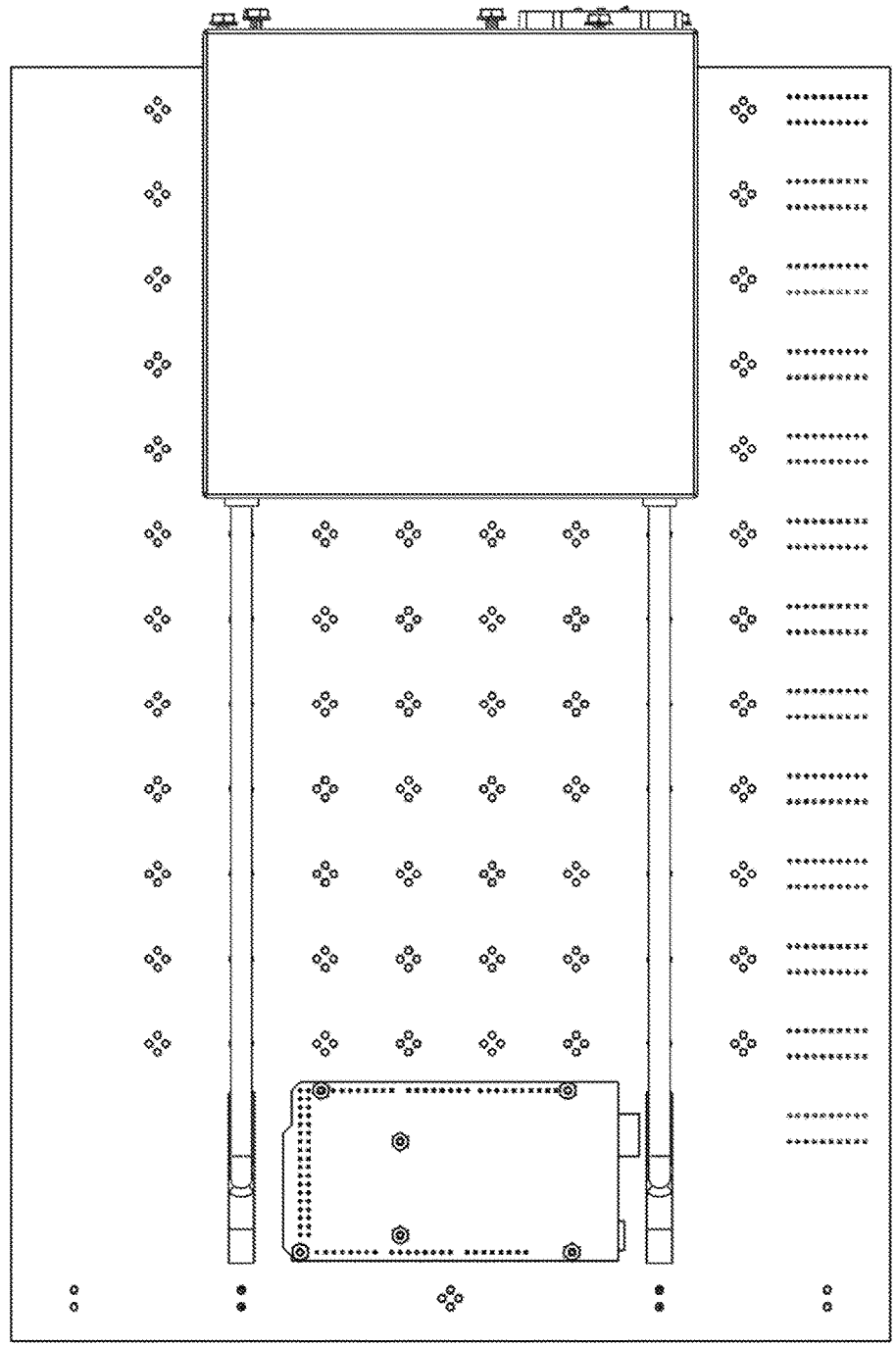
FIG. 74 illustrates a bottom view of a preferred exemplary audio synchronization module (ASM) with enclosure case and enclosure cover removed.
Figure 75:
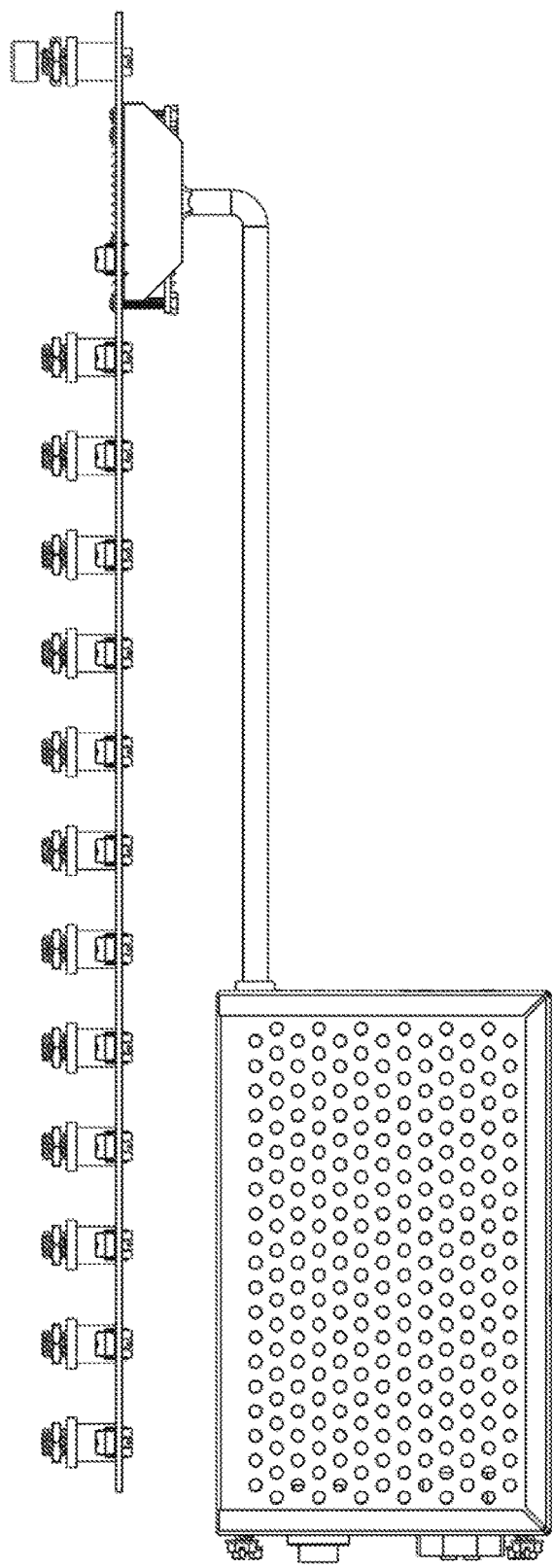
FIG. 75 illustrates a left side view of a preferred exemplary audio synchronization module (ASM) with enclosure case and enclosure cover removed.
Figure 76:
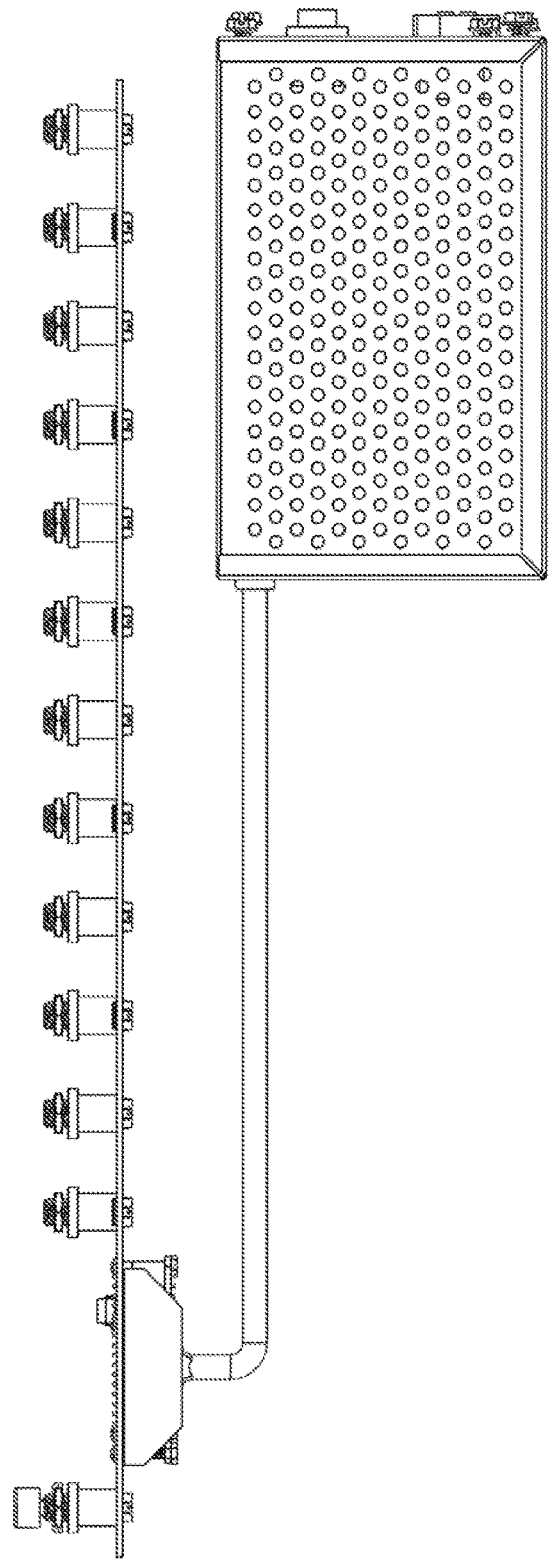
FIG. 76 illustrates a right side view of a preferred exemplary audio synchronization module (ASM) with enclosure case and enclosure cover removed.
Figure 77:
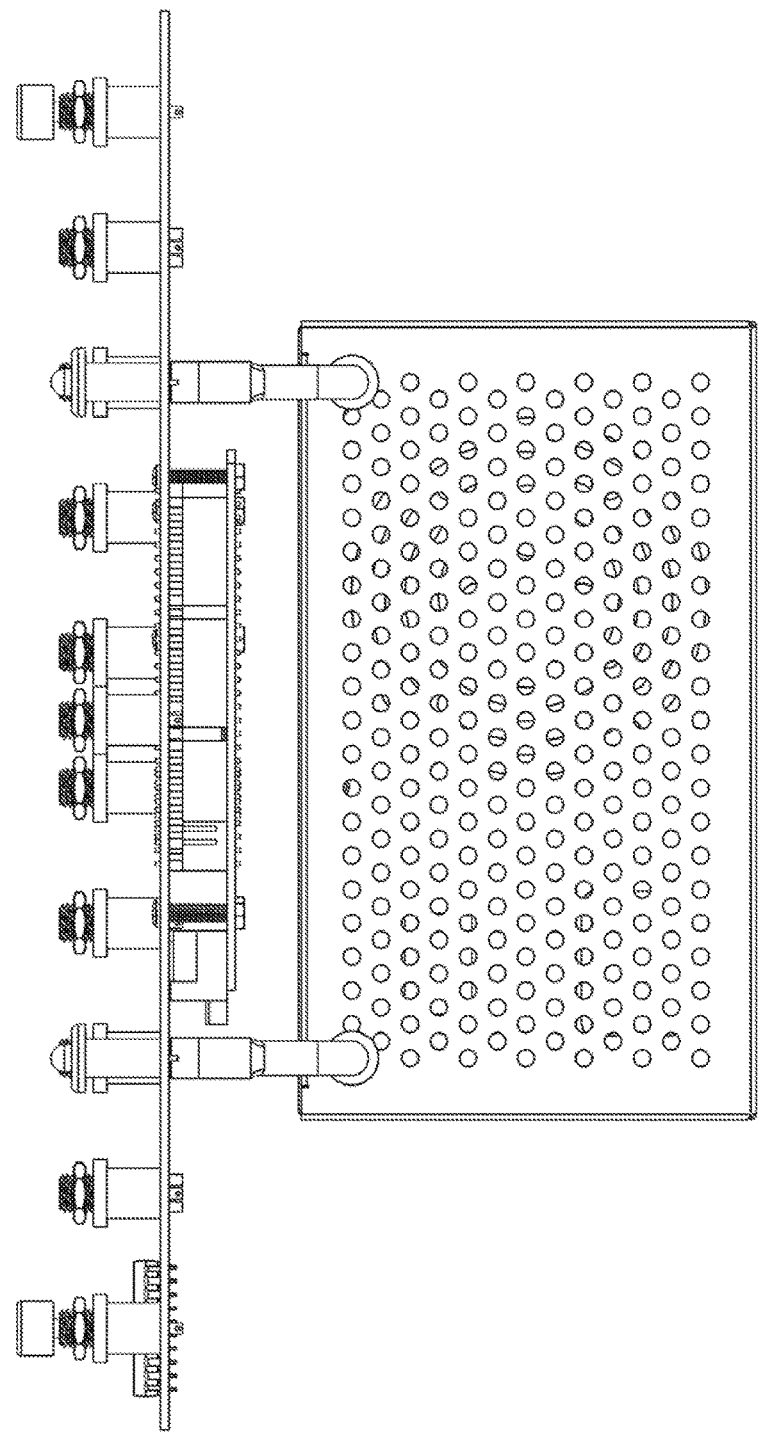
FIG. 77 illustrates a front side view of a preferred exemplary audio synchronization module (ASM) with enclosure case and enclosure cover removed.
Figure 78:
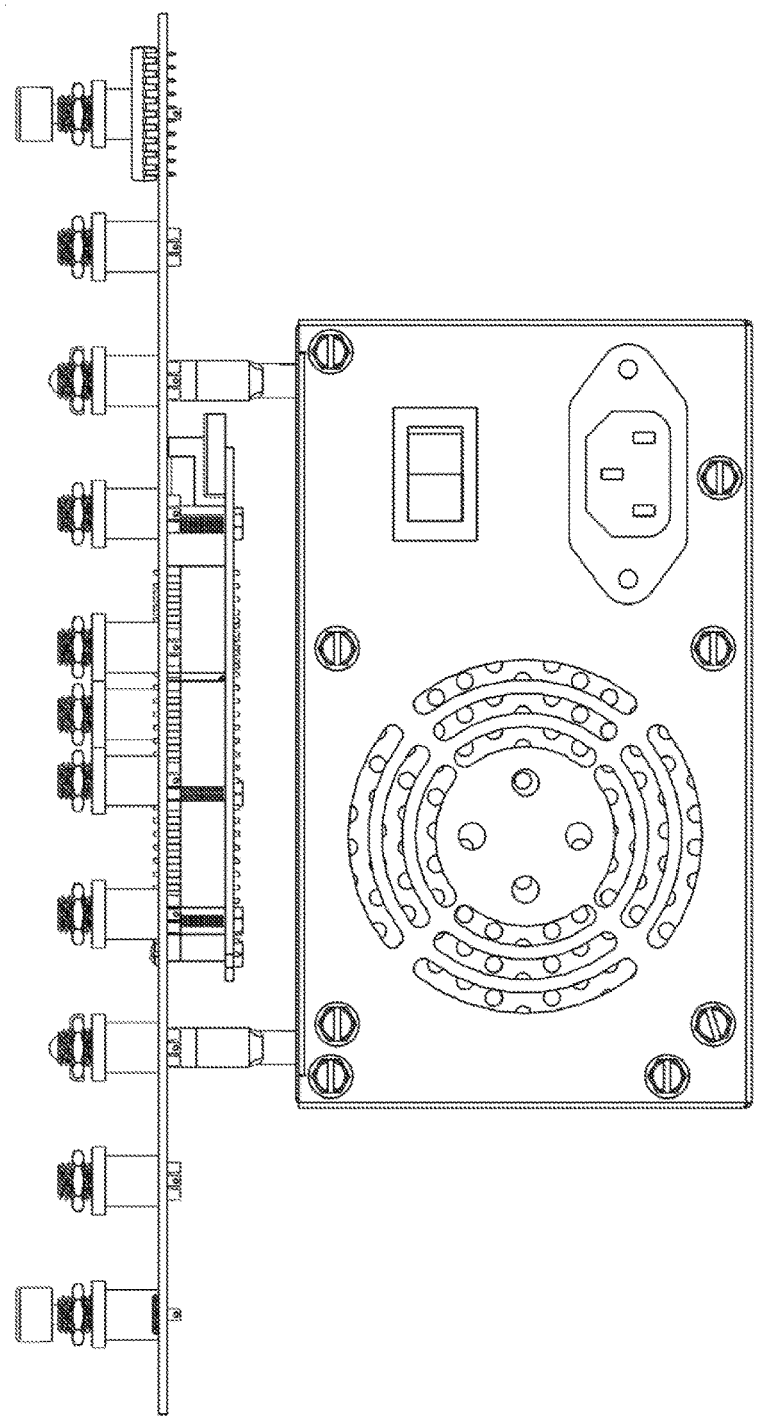
FIG. 78 illustrates a rear side view of a preferred exemplary audio synchronization module (ASM) with enclosure case and enclosure cover removed.
Figure 79:
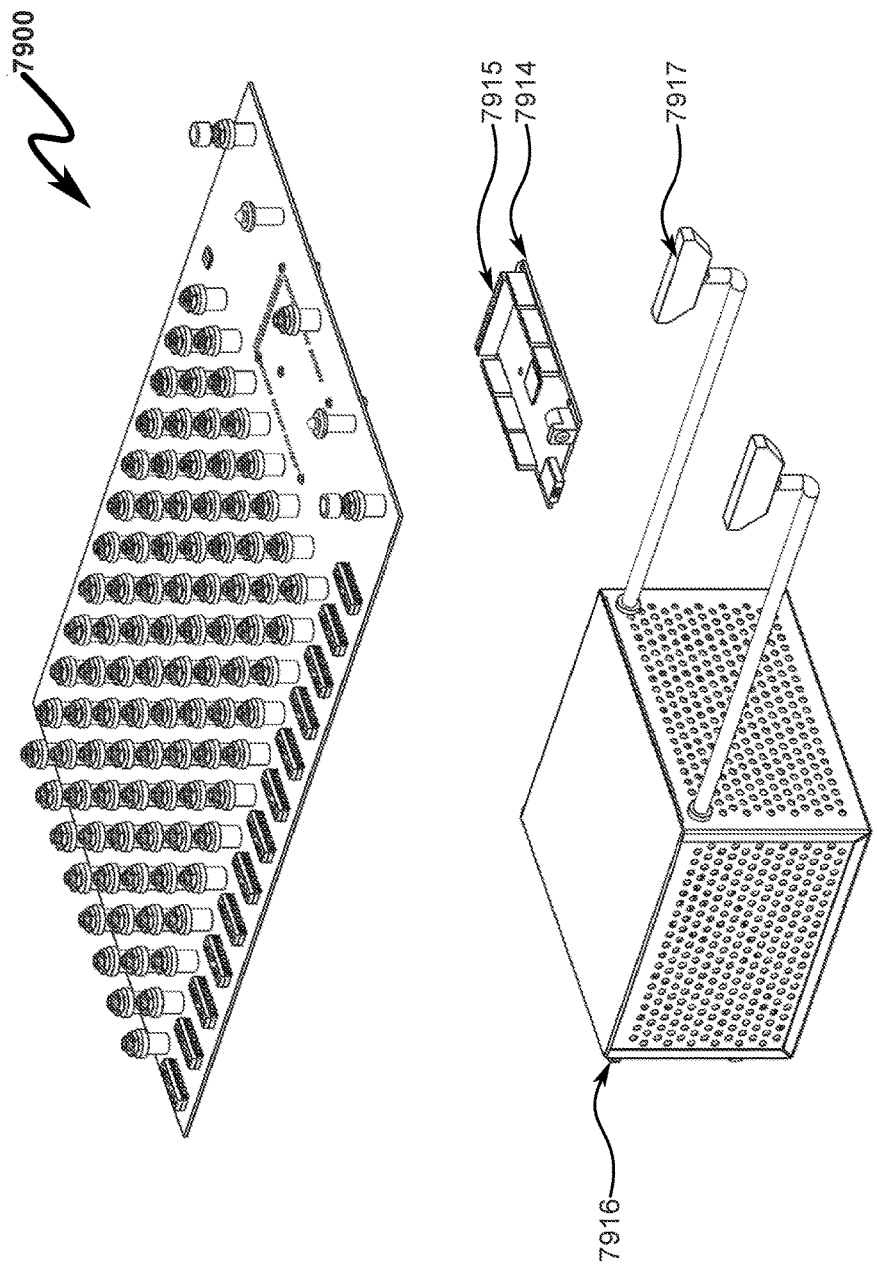
FIG. 79 illustrates a top left front perspective assembly view of a preferred exemplary audio synchronization module (ASM) with enclosure case and enclosure cover removed.
Figure 80:
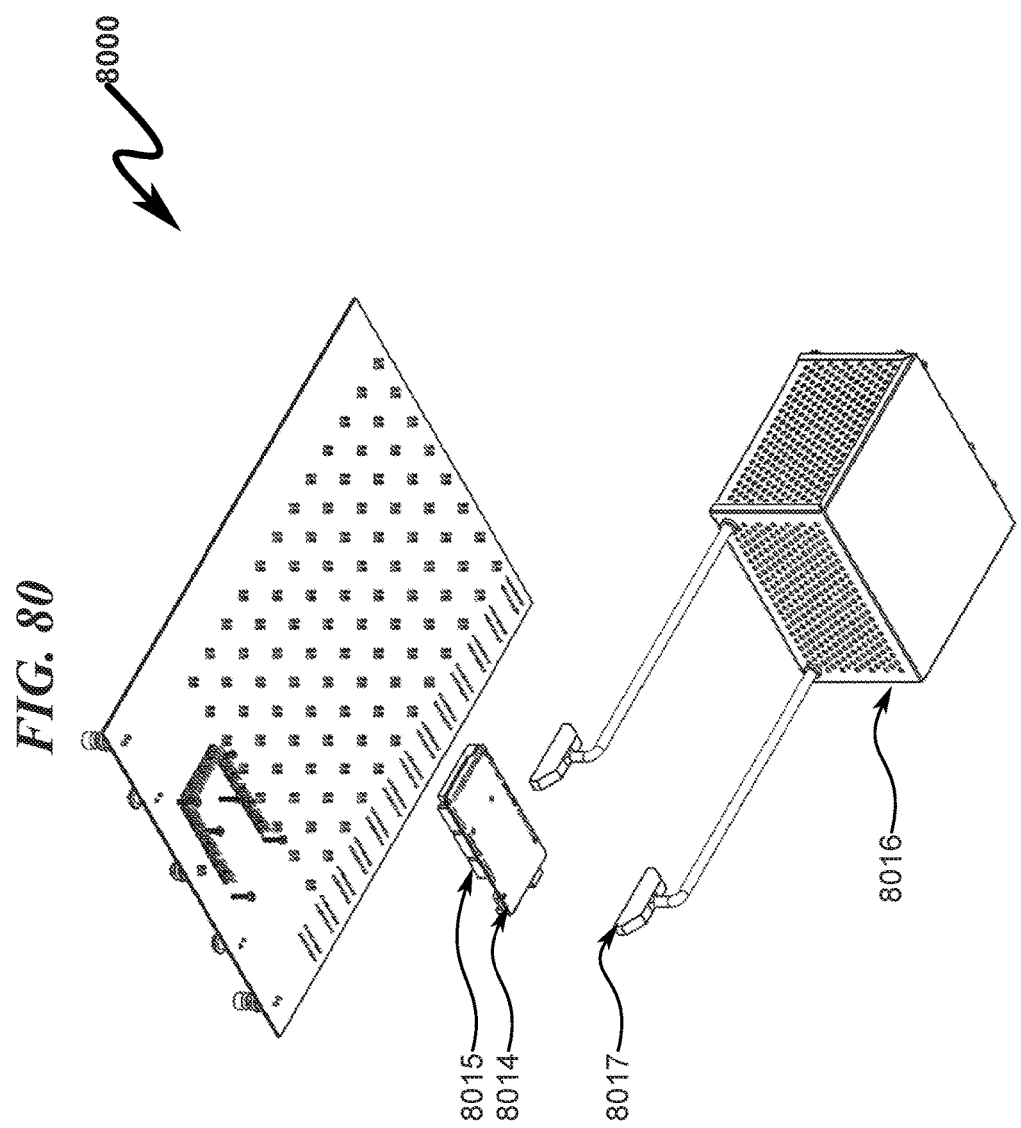
FIG. 80 illustrates a bottom right front perspective assembly view of a preferred exemplary audio synchronization module (ASM) with enclosure case and enclosure cover removed.
Figure 81:
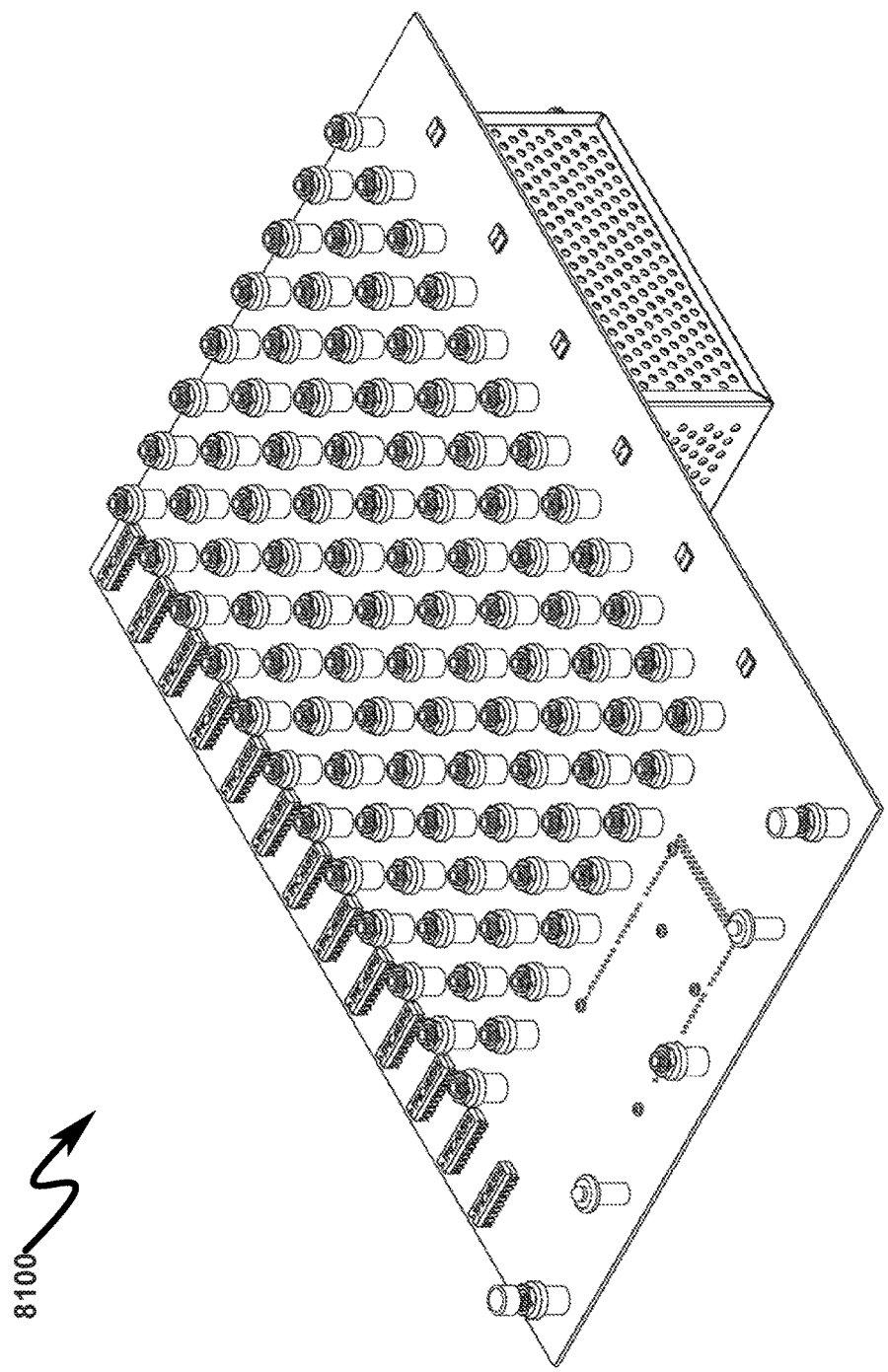
FIG. 81 illustrates a top right front perspective view of a preferred exemplary audio synchronization module (ASM) with enclosure case and enclosure cover removed.
Figure 82:
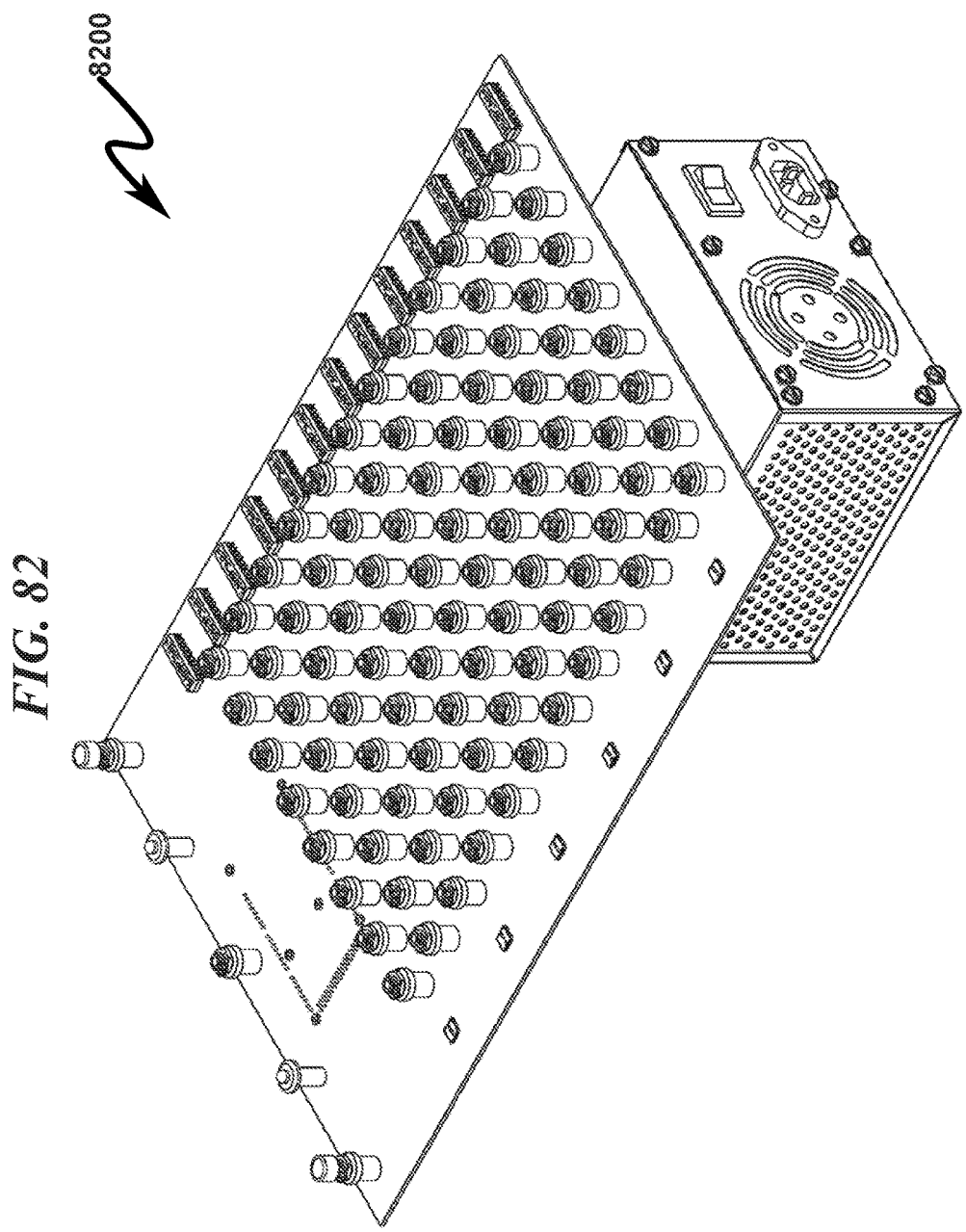
FIG. 82 illustrates a top right rear perspective view of a preferred exemplary audio synchronization module (ASM) with enclosure case and enclosure cover removed.
Figure 83:
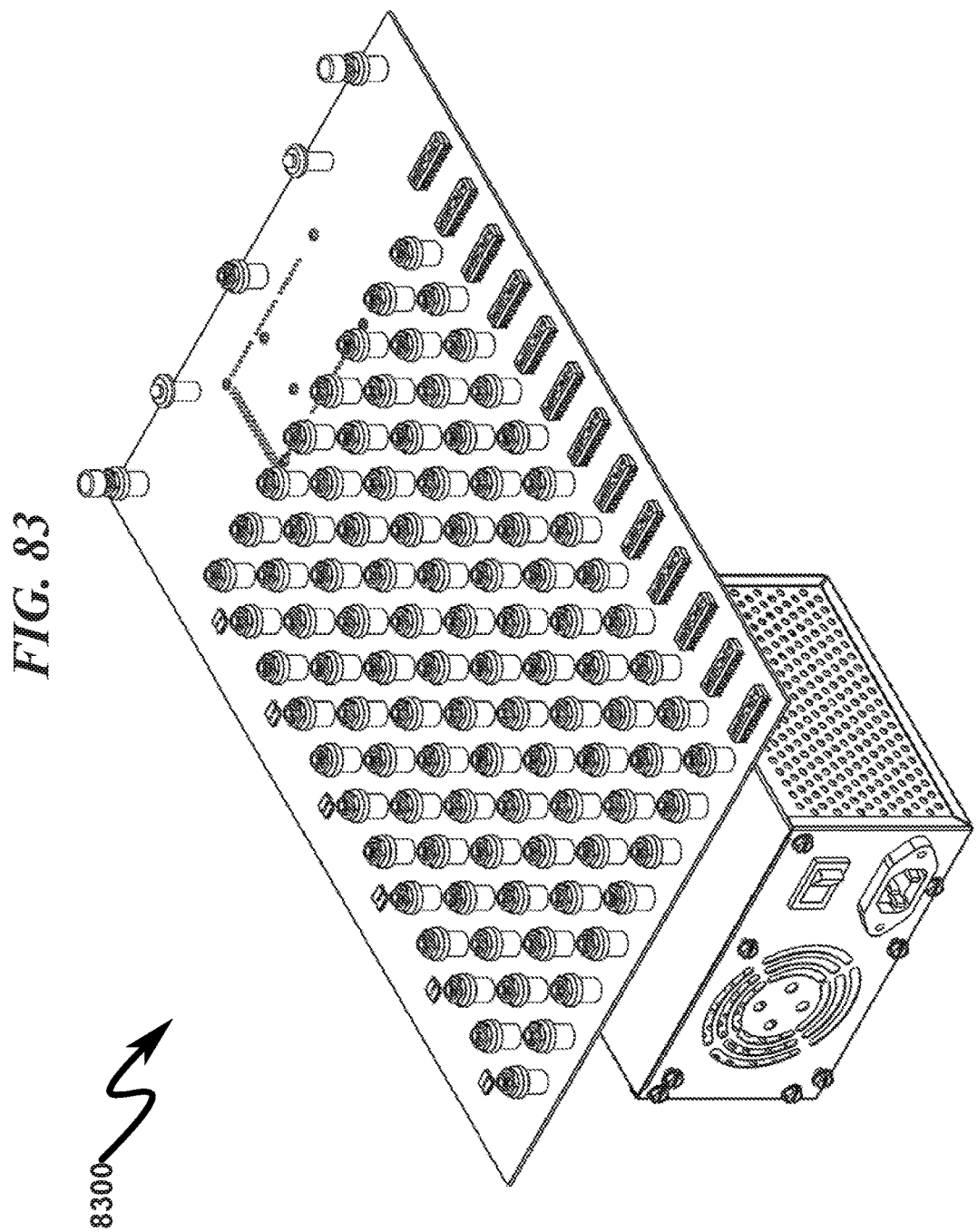
FIG. 83 illustrates a top left rear perspective view of a preferred exemplary audio synchronization module (ASM) with enclosure case and enclosure cover removed.
Figure 84:
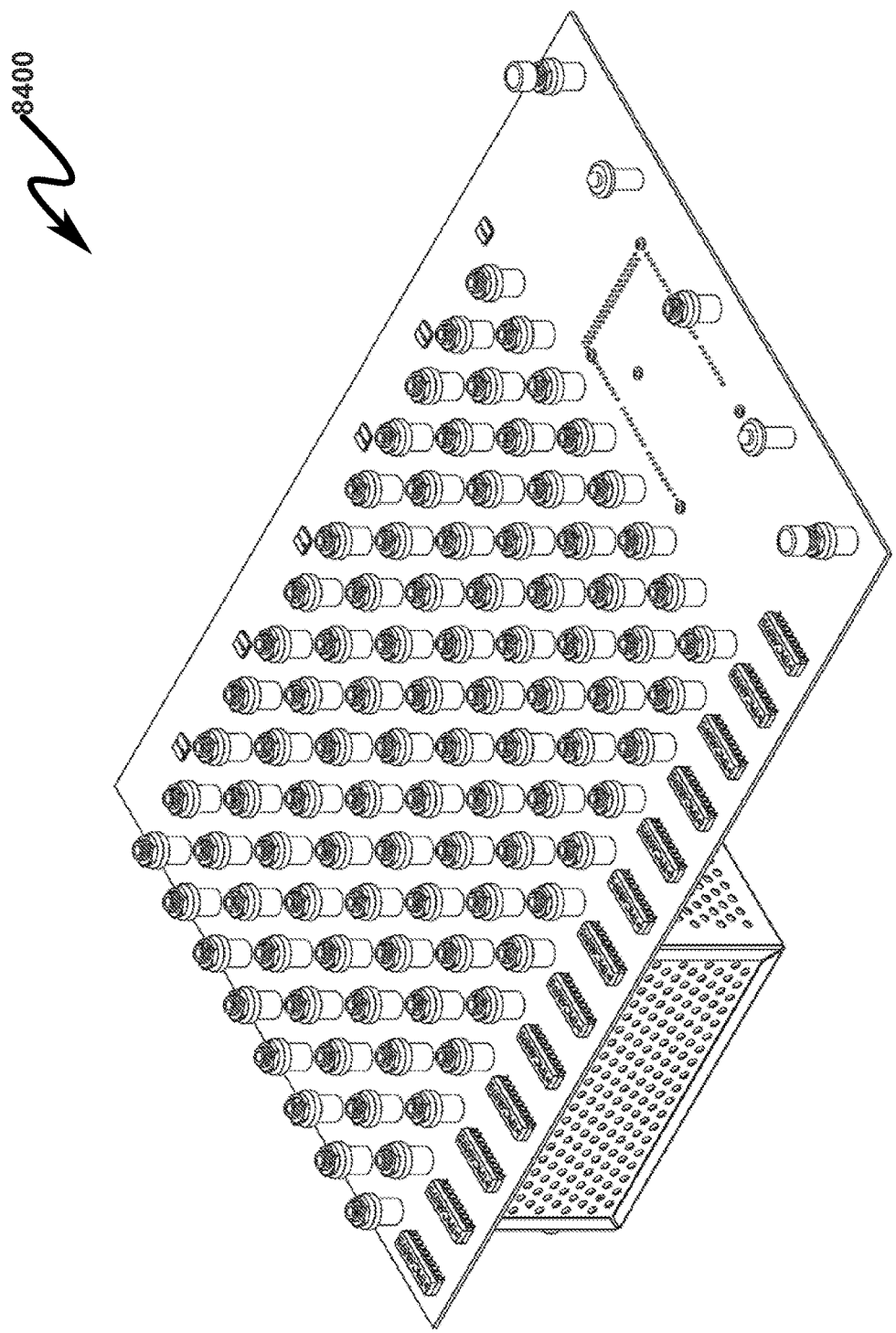
FIG. 84 illustrates a top left front perspective view of a preferred exemplary audio synchronization module (ASM) with enclosure case and enclosure cover removed.
Figure 85:
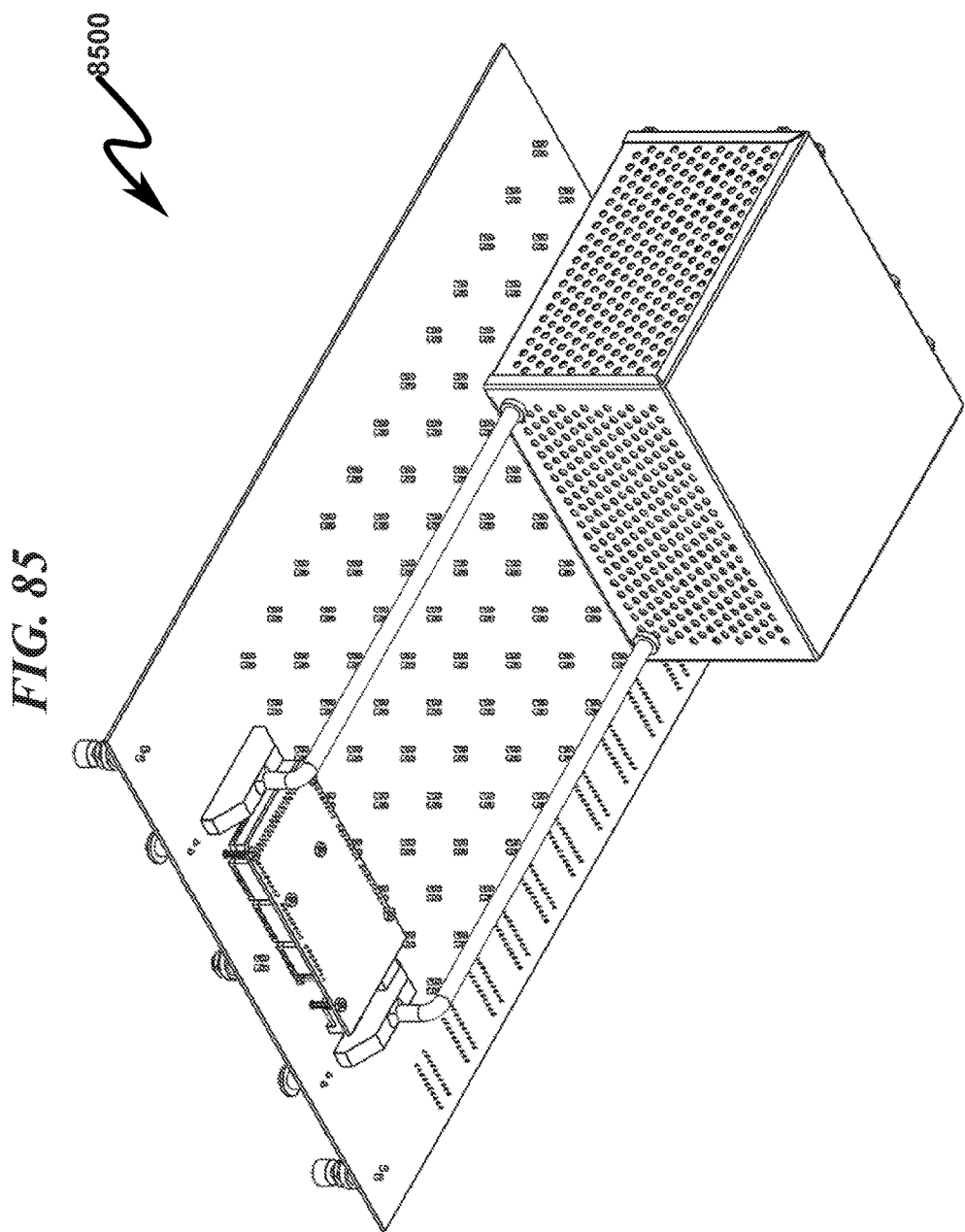
FIG. 85 illustrates a bottom right front perspective view of a preferred exemplary audio synchronization module (ASM) with enclosure case and enclosure cover removed.
Figure 86:
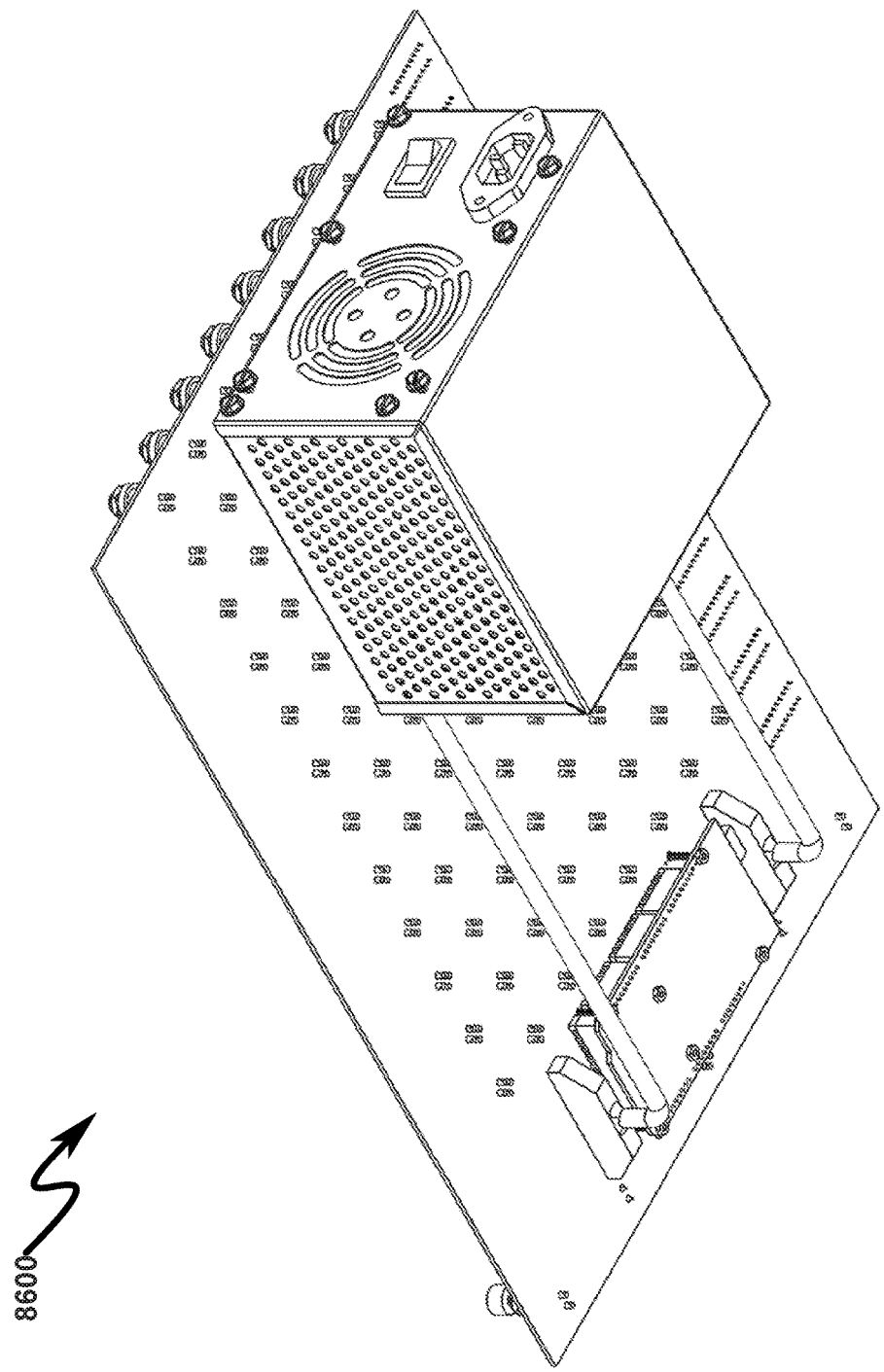
FIG. 86 illustrates a bottom right rear perspective view of a preferred exemplary audio synchronization module (ASM) with enclosure case and enclosure cover removed.
Figure 87:
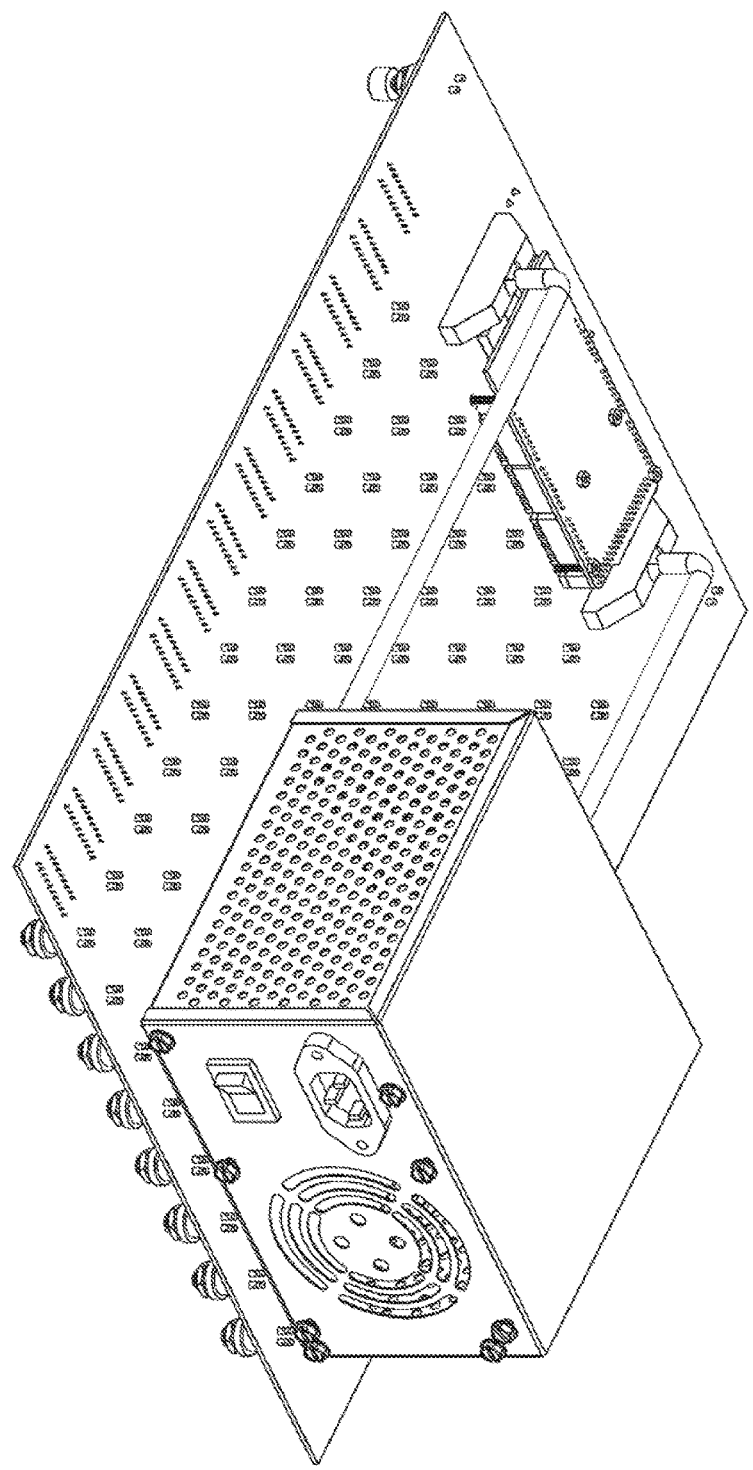
FIG. 87 illustrates a bottom left rear perspective view of a preferred exemplary audio synchronization module (ASM) with enclosure case and enclosure cover removed.

Internal details of this preferred exemplary ASM embodiment are provided in FIG. 73 (7300)-FIG. 88 (8800). The ASM system is optimally constructed using a main printed circuit board (PCB) (MCB) (7310) on which the APR TRRS jacks (7311) are soldered and on which various multiplexer integrated circuits (7312) and shift-register integrated circuits (7313) are placed to interconnect and select an individual APR TRRS jack (7311), Overall control of the multiplexer integrated circuits (7312) and shift-register integrated circuits (7313) is coordinated by a microcontroller plug-in module (MCU) (7914, 8014) that is mated to the MCB (7310) with standard connector headers/sockets (7915, 8015) and mounting screws as indicated. The MCU (7914, 8014) may be configured with USB and/or Ethernet support to allow remote control of the ASM and downloading of digital audio content for replication/synchronization to the attached APRs. Power to the ASM MCB is provided by a standard power supply (7916, 8016) such as a personal computer ATX frame power supply capable of providing +5 VDC and +12 VDC via power cables and connectors (7917, 8017).

USB/Audio Control Cable Wiring (8900)-(9200)

Figure 89:
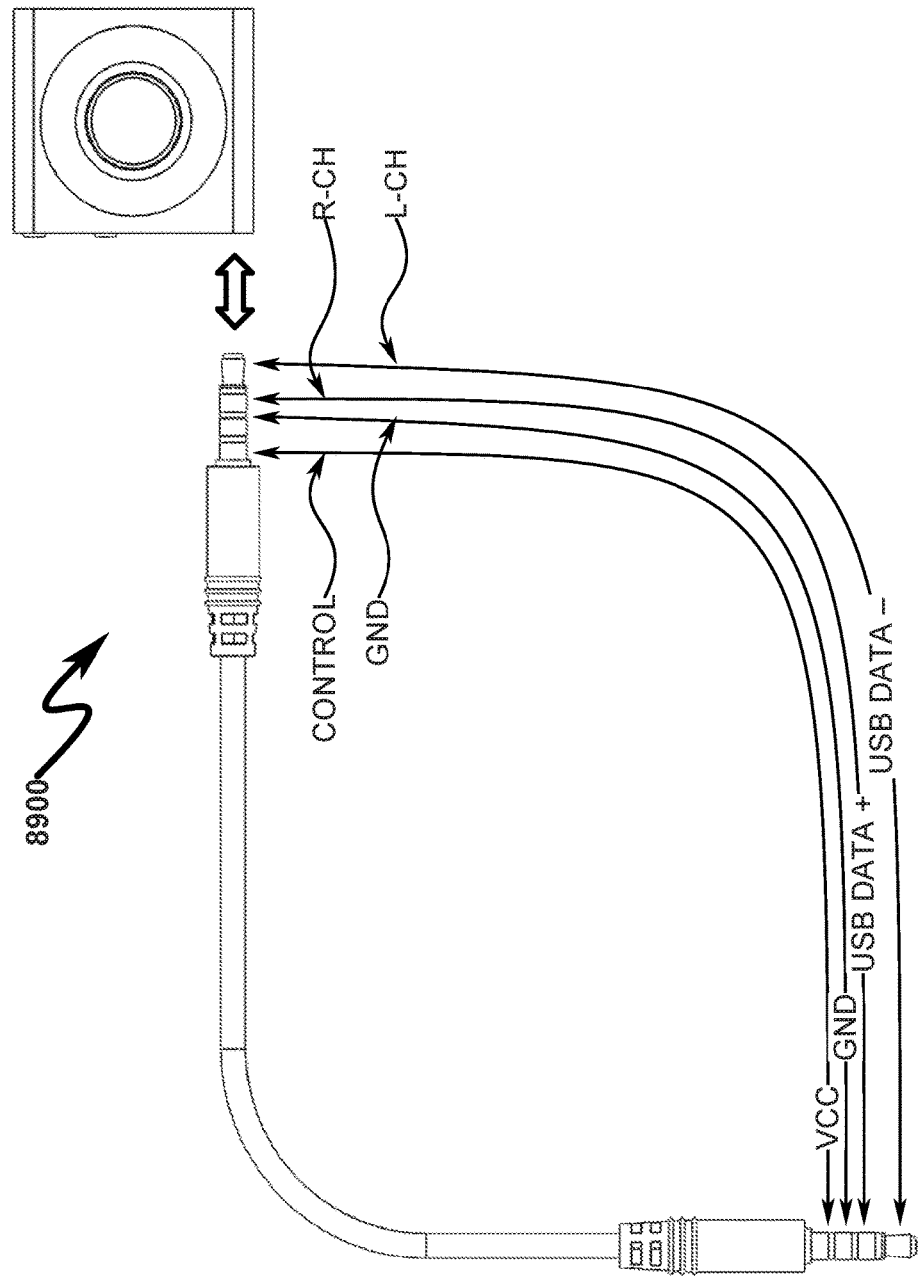
FIG. 89 illustrates a typical wiring signal diagram for connections between the ASM using a TRRS dual-use USB/audio control connector and a typical APR.
Figure 91:
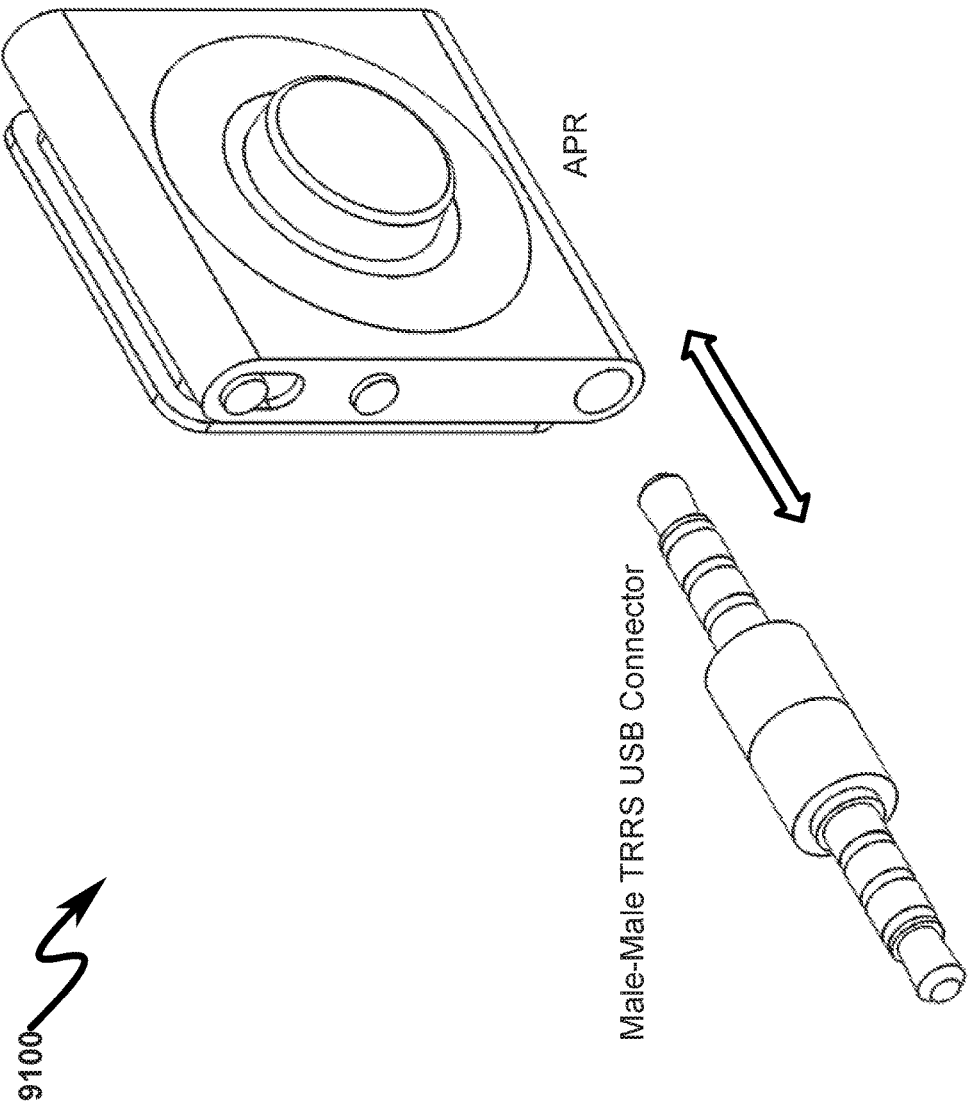
FIG. 91 illustrates a top left front perspective view of an exemplary male-male TRRS USB/audio control connector used in conjunction with a typical APR.
Figure 92:
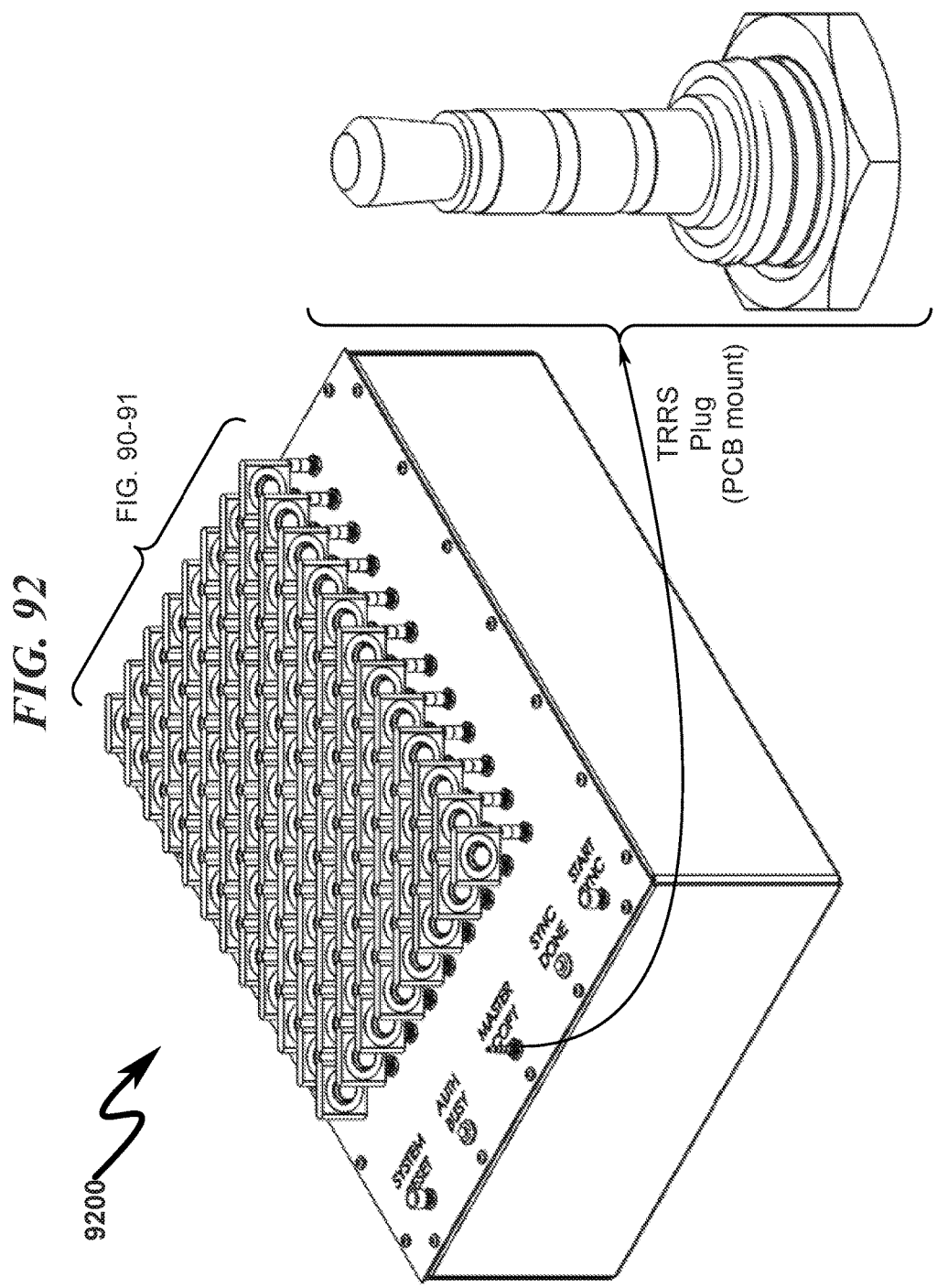
FIG. 92 illustrates an exemplary ASM populated with an array of APRs electrically coupled to the ASM using male-male TRRS USB/audio control connectors.

FIG. 89 (8900) illustrates a typical USB and audio control cable signal connections for a TRRS (tip-ring-ring-sleeve) connector between the ASM and a typical APR. The ASM utilizes the audio control pinout to generate appropriate control signaling to synchronize and program the individual APRs in the APR connection matrix. FIG. 90 (9000)-FIG. 92 (9200) depict the use of a male-male TRRS connector in conjunction with an APR and how this short cable combination can be utilized to directly mount an array of APRs to the ASM USB jacks for mass programming and time synchronization of the APRs. Note that in some configurations the TRRS jacks on the ASM may be replaced with electrically equivalently MALE plugs thus eliminating the need for any additional cabling connection to the APR from the ASM. This is generally depicted in the MASTER input connector of the ASM depicted in FIG. 92 (9200).

Exemplary APR Programming by ASM (9300-(9400)

Figure 93:
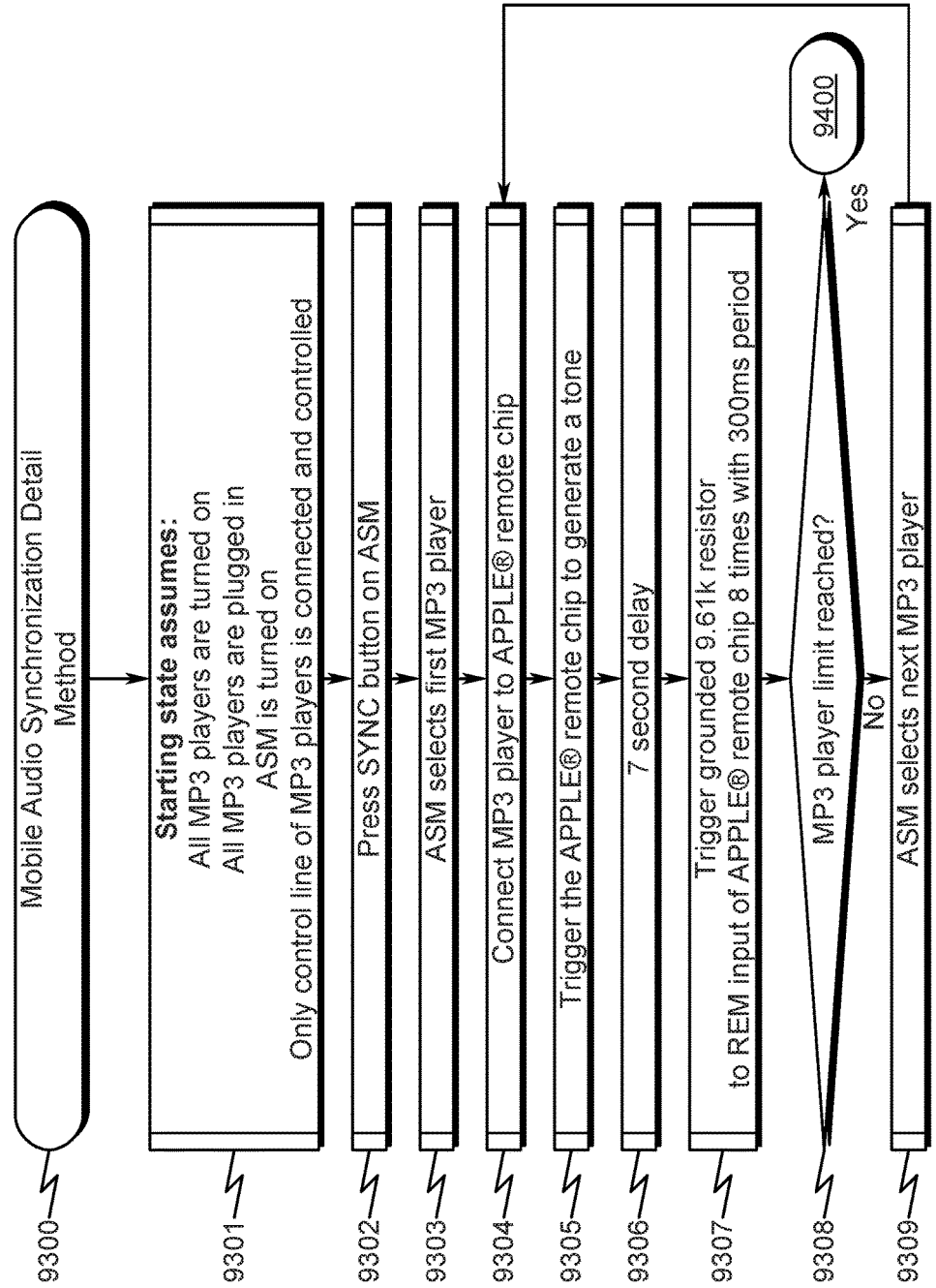
FIG. 93 illustrates an exemplary flowchart detailing the programming of multiple APRs using a typical ASM configuration (page 1 of 2)
Figure 94:
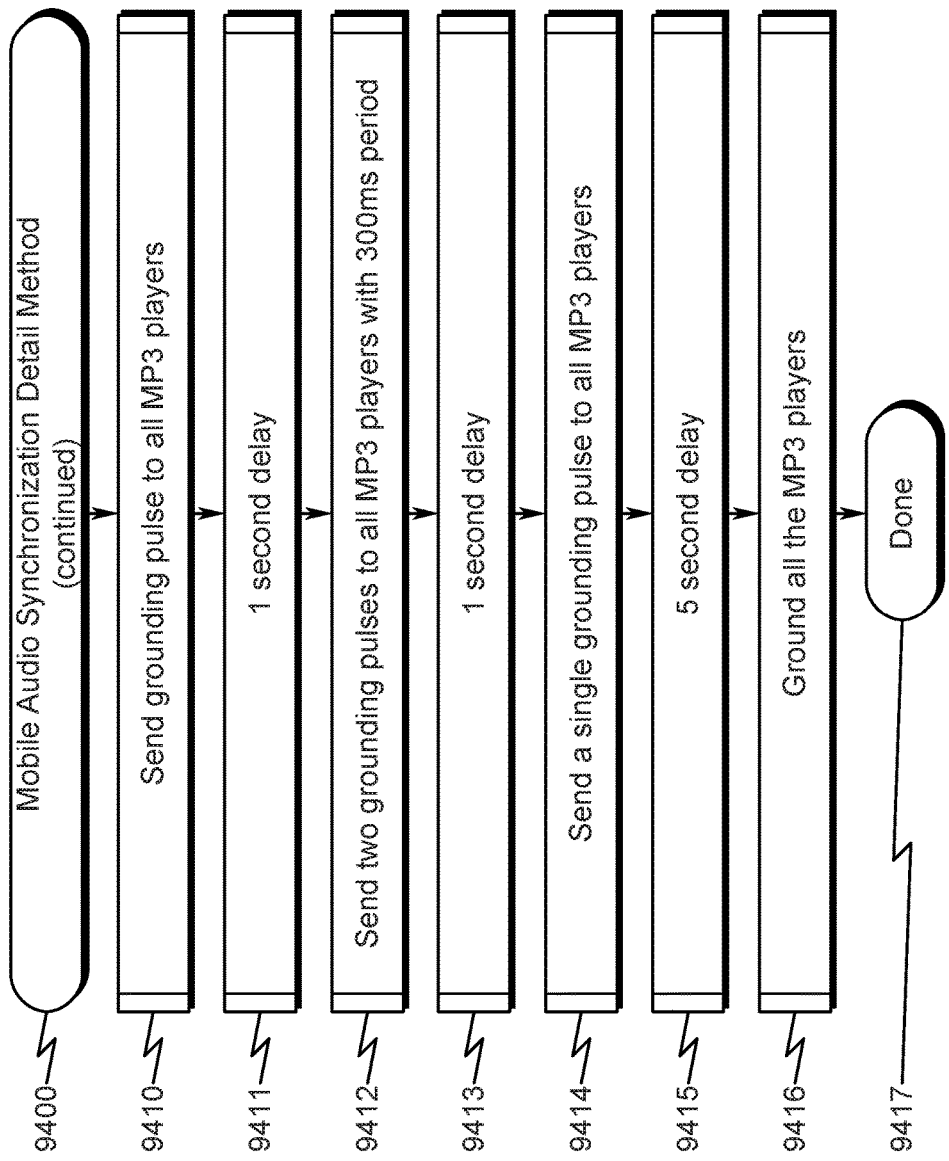
FIG. 94 illustrates an exemplary flowchart detailing the programming of multiple APRs using a typical ASM configuration (page 2 of 2)

FIG. 93 (9300)-FIG. 94 (9400) detail an exemplary mass synchronized programming of APRs by a typically configured ASM. The following process is typical of the mass synchronization procedure:

(1) The process starts with an initial state in which the user has completed the following: plug 4 prong cables into MP3 players that are desired to be synchronized; turn, the MP3 players on; plug in the other end of the 4 prong aux cables in to the ASM sync device; and turn on the ASM sync device (9301);
(2) Depressing the SYNC button on the ASM (9302);
(3) ASM checks the number of rows that have MP3 players sets the MP3 player limit according to the number of rows and detected MP3 players, and selects first MP3 player and connects the control line using the MUS to the APPLE® remote control chip (9303);
(4) ASM sends trigger pulse to the APPLE® remote control chip (9304);
(5) ASM triggers APPLE® remote chip to generate a tone (9305);
(6) a delay is introduced to allow for the APPLE® remote control chip to send a tone to the MP3 player (9306);
(7) Using a shift register, ASM controller sets a 9.61 k resister to ground 8 times with a 300 ms period. Other side of the resistor is connected to REM input of the apple remote chip. Each pulse causes the APPLE® remote control chip to raise the volume on the MP3 player (9307);
(8) ASM controller continues to process through the MP3 player limit number of MP3 players, connecting each one to the APPLE® remote control chip for a tone ACK and volume adjustment, and proceeds to step (10) when all MP3 players have been processed (9308);
(9) ASM selects next MP3 player and proceeds to step (4) (9309);
(10) A 150 ms grounding pulse is sent to all MP3 players using the shift registers in order to pause all of the MP3 players (9410);
(11) A 1 second delay is initiated (9411);
(12) After the 1 s delay, controller sends a 150 ms grounding pulse to all MP3 players using the shift registers in order to play all of the MP3 players (9412);
(13) A 1 second delay is initiated (9413);

(14) After the 1 s delay, controller sends a 150 ms grounding pulse to all MP3 players using the shift registers in order to play all of the MP3 players (9414);
(15) A 5 second delay is initiated (9415); and
(16) After the 5 s delay, ASM controller sets all of the MP3 players to ground using the shift registers and holds it until reset or turned off. The purpose is to allow MP3 players to be unplugged without compromising the play status as the physical removal of the cable from the jack can pause the MP3 player (9416).

Exemplary timing diagrams associated with this process are depicted in FIG. 95 (9500)-FIG. 96 (9600).

Exemplary Control Function Timing diagram (9500)

FIG. 95 (9500) depicts an exemplary control function timing diagram for a typical ASM implementation. The timing is shown for the four control functions used by the controller for the MP3 player. There is additional hardware that actually allows the proper functions to be performed when pulse signal from the controller is detected. Each VOLUME UP pulse enables a shift register that connects an APPLE® remote control chip input REM to ground with a proper pull down resister. APPLE® remote chip detects the impedance change and then sends a proper tone to the MP3 player. Resetting to beginning of song and play/pause functions are connected to the shift register with a direct ground for the control line of the MP3 player.

Exemplary Shift Register Timing Diagram (9600)

FIG. 96 (9600) depicts an exemplary shift register input/output timing diagram for a typical ASM implementation. In this timing diagram, the inputs and outputs of the shift register are shown. The example indicates a set of signals in order to set all the output to ground. SRCK is the clock signal. G is the enable signal, active low. SER IN represents the 8 bits to select which outputs to be grounded. RCK is the register clock. SRCLR is the shift register clear, active low. DRAIN 1-8 are outputs of the register that are grounded.

Preferred Embodiment System Summary

The present invention preferred exemplary system embodiment anticipates a wide variety of variations in the basic theme of construction, but can be generalized as a mobile audio distribution (MAD) system comprising:
(a) audio synchronization module (ASM);
(b) audio playback recorder (APR); and
(c) modular audio module (MAM);
wherein:
the ASM is configured to electrically couple temporarily to one or more of the APR;
the ASM is configured to copy one or more digital audio files (DAFs) from a master audio recording (MAR) to the one or more of the APR when electrically coupled temporarily to one or more of the APR;
the ASM is configured to initiate playback of audio recordings on each of the APR in synchronized time;
the MAM comprises a mobile containing enclosure (MCE) comprising a box having a front face (FF), right face (RF), left face (LF), top face (TF), and bottom face (BF), and a rear opening (RO);
the MAM comprises a rear opening lid (ROL) configured to cover the RO and to rotate about a hinge attached between the TF and the ROL;
the MCE is configured to retain a mobile audio speaker (MAS);
the MAS and the MAA are electrically coupled together;
the MAA and the MBP are electrically coupled together;
the MAA and the APR are electrically coupled together;
the FF incorporates the MAS;
the RF, LF, TF, and BF each contain a respective right face plate connection void (RFV), left face plate connection void (LFV), top face plate connection void (TFV), and bottom face plate connection void (BFV);
the RFV, the LEV, the TFV, and the BFV are each covered Individually by one or more types of removable plate connector (RPC) with at least one of the RPC covering the RFV, the LFV, the TFV, and the BFV comprising a hermaphroditic plate connector (HPC);
the ROL is configured to accept one of the APR when the APR is electrically decoupled from the ASM;
the ROL comprises a mobile battery pack (MBP) and a mobile audio amplifier (MAA);
the ROL comprises a battery retention compartment (BRC) configured to accept the MBP; and
the ROL is configured to mechanically attach and support the MAA.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a mobile audio distribution (MAD) method, the method operating in conjunction with a mobile audio distribution (MAD) system comprising:
(a) audio synchronization module (ASM);
(b) audio playback recorder (APR); and
(c) modular audio module (MAM);
wherein:
the ASM is configured to electrically couple temporarily to one or more of the APR;
the ASM is configured to copy one or more digital audio files (DAFs) from, a master audio recording (MAR) to the one or more of the APR when electrically coupled temporarily to one or more of the APR;
the ASM is configured, to initiate playback of audio recordings on each of the APR in synchronized time;
the MAM comprises a mobile containing enclosure (MCE) comprising a box having a front face (FF), right face (RF), left face (LF), top face (TF), and bottom face (BF), and a rear opening (RO);
the MAM comprises a rear opening lid (ROL) configured to cover the RO and to rotate about a hinge attached between the TF and the ROL;
the MCE is configured to retain a mobile audio speaker (MAS);
the MAS and the MAA are electrically coupled together;
the MAA and the MBP are electrically coupled together;
the MAA and the APR are electrically coupled together;
the FF incorporates the MAS;
the RF, LF, TF, and BF each contain a respective right face plate connection void (RFV), left face plate connection void (LFV), top face plate connection void (TFV), and bottom face plate connection void (BFV);
the RFV, the LFV, the TFV, and the BFV are each covered individually by one or more types of removable plate connector (RPC) with at least one of the RPC covering the RFV, the LFV, the TFV, and the BFV comprising a hermaphroditic plate connector (HPC);

the ROL is configured to accept one of the APR when the APR is electrically decoupled from the ASM;

the ROL comprises a mobile battery pack (MBP) and a mobile audio amplifier (MAA);

the ROL comprises a battery retention compartment (BRC) configured to accept the MBP; and the ROL is configured to mechanically attach and support the MAA;

wherein the method comprises the steps of:
(1) electrically coupling one or more of the APR to the ASM;
(2) with the ASM, copying one or more digital audio files (DAFs) from a master audio recording (MAR) to the one or more of the APR;
(3) with the ASM, synchronizing in time the playback of the DAF within the one or more of the APR;
(4) electrically decoupling one of the APR from the ASM;
(5) electrically coupling the one of the APR to the MAA within the MAM; and
(6) activating the one of the APR to playback synchronized audio containing the DAF from the one of the APR to the MAA and subsequent distributed presentation by the MAS within the MAM.

One skilled in the art will recognize that these method steps may be augmented or rearranged without limiting the teachings of the present invention. This general method summary may be augmented by the various elements described herein to produce a wide variety of invention embodiments consistent with this overall, design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the HPC comprises an internal threaded void having a National Pipe Taper (NPT) pipe threading profile.

An embodiment wherein the HPC comprises male and female round threads having a thread lead of two or greater.

An embodiment wherein the TFV, and the BFV are each covered by a hermaphroditic plate connector (HPC).

An embodiment wherein the RFV or the LEV is covered by a removable plate connector (RPC) incorporating an additional battery pack that is electrically coupled to the MAA.

An embodiment wherein the RFV or the LFV is covered by a removable plate connector (RPC) incorporating an additional speaker that is electrically coupled to the MAA.

An embodiment wherein the MAM further comprises a radio frequency receiver (RFR) electrically coupled to the APR and configured to synchronize audio input to the MAA.

An embodiment wherein the MAM further comprises a radio frequency receiver (RFR) electrically coupled to the APR and configured to transmit real-time audio input to the MAA.

An embodiment wherein the ROL comprises a mechanical attachment void (MAV) configured to permit attachment of the ROL to a vertical standard.

An embodiment wherein the APR comprises a music recorder selected from a group consisting of: a MP3 music recorder; an APPLE® IPOD® brand digital recorder; and an APPLE® IPOD® SHUFFLE® brand digital recorder.

One skilled in the art will recognize that other embodiments are possible based on combinations of the embodiments listed above and/or elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710, 578), the present invention anticipates and includes this type of computer readable media within the scope of the invention. Pursuant to In re Nuijtan, 500 F.3d 1346 (Fed. Cir, 2007) (U.S. patent application Ser. No. 09/211,928), the present invention scope is limited to computer readable media wherein the media is both tangible and non-transitory.

CONCLUSION

A mobile audio distribution (MAD) system/method providing for synchronized audio distribution to modular audio modules (MAMs) has been disclosed. The system/method utilizes a central audio synchronization module (ASM) that loads audio files onto audio playback recorders (APRs) such that the audio playback emitted from each APR is synchronized in time. These APRs are individually positioned within and electrically connected to a MAM that is positioned in a spatially diverse manner in a desired field of audio distribution. Each MAM is configured to be adaptable to removable physical fixation to a vertical standard such as a tripod, pole, tree, etc. Each MAM is configured with a speaker, amplifier, battery pack, APR, optional radio frequency receiver (RFR) in order to disseminate synchronized audio from the APR via the speaker. Each MAM may be removably interlocked with other MAMs via the use of one or more hermaphroditic plate connectors (HPC).

CLAIMS INTERPRETATION

The following rules apply when interpreting the CLAIMS of the present invention:
The CLAIM PREAMBLE should be considered as limiting the scope of the claimed invention.
"WHEREIN" clauses should be considered as limiting the scope of the claimed invention.
"WHEREBY" clauses should be considered as limiting the scope of the claimed invention.
"ADAPTED TO" clauses should be considered as limiting the scope of the claimed invention.
"ADAPTED FOR" clauses should be considered as limiting the scope of the claimed invention.
The term "MEANS" specifically invokes the means-plus-function claims limitation recited in 35 U.S.C. § 112(f) and such claim shall be construed to cover the corresponding structure, material, or acts described in the specification and equivalents thereof.
The phrase "MEANS FOR" specifically invokes the means-plus-function claims limitation recited in 35 U.S.C. § 112(f) and such claim shall be construed to cover the corresponding structure, material; or acts described in the specification and equivalents thereof,
The phrase "STEP FOR" specifically invokes the step-plus-function claims limitation recited in 35 U.S.C. § 112(f) and such claim shall be construed to cover the corresponding structure, material, or acts described in the specification and equivalents thereof.
The step-plus-function claims limitation, recited in 35 U.S.C. § 112(f) shall be construed to cover the corresponding structure, material, or acts described in the specification and equivalents thereof ONLY for such claims including the phrases "MEANS FOR", "MEANS", or "STEP FOR".
The phrase "AND/OR" in the context, of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565, 411, ("'and/or' covers embodiments having element A alone, B alone, or elements A and B taken together").
The claims presented herein are to be interpreted in light of the specification and drawings presented herein, with, sufficiently narrow scope such as to not preempt any abstract idea.
The claims presented herein are to be interpreted in light of the specification and drawings presented herein with sufficiently narrow scope such as to not preclude every application of any idea.
The claims presented herein, are to be interpreted in light of the specification and drawings presented herein with sufficiently narrow scope such as to preclude any basic mental process that could be performed entirely in the human mind
The claims presented herein are to be interpreted in light of the specification and drawings presented herein with sufficiently narrow scope such as to preclude any process that could be performed entirely by human manual effort.
Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A mobile audio distribution (MAD) system comprising:
   (a) audio synchronization module (ASM);
   (b) audio playback recorder (APR); and
   (c) modular audio module (MAM);
   wherein;
   said ASM is configured to electrically couple temporarily to one or more of said APR;
   said ASM is configured to copy one or more digital audio files (DAFs) from a master audio recording (MAR) to said one or more of said APR when electrically coupled temporarily to one or more of said APR;
   said ASM is configured to initiate playback of audio recordings on each of said APR in synchronized time;
   said MAM comprises a mobile containing enclosure (MCE) comprising a box having a front face (FF), right face (RF), left face (LF), top face (TF), and bottom face (BF), and a rear opening (RO);
   said MAM comprises a rear opening lid (ROL) configured to cover said RO and to rotate about a hinge attached between said TF and said ROL;
   said MCE is configured to retain a mobile audio speaker (MAS);
   said MAS and said MAA are electrically coupled together;
   said MAA and said MBP are electrically coupled together;
   said MAA and said APR are electrically coupled together;
   said FF incorporates said MAS;
   said RF, LF, TF, and BF each contain a respective right face plate connection void (RFV), left face plate connection void (LFV), top face plate connection void (TFV), and bottom face plate connection void (BFV);
   said RFV, said LFV, said TFV, and said BFV are each covered individually by one or more types of removable plate connector (RPC) with at least one of said RPC covering said RFV, said LFV, said TFV, and said BFV comprising a hermaphroditic plate connector (HPC);
   said ROL is configured to accept one of said APR when said APR is electrically decoupled from said ASM;
   said ROL comprises a mobile battery pack (MBP) and a mobile audio amplifier (MAA);
   said ROL comprises a battery retention compartment (BRC) configured to accept said MBP; and
   said ROL is configured to mechanically attach and support said MAA.

2. The mobile audio distribution system of claim 1 wherein said HPC comprises an internal threaded void having a National Pipe Taper (NPT) pipe threading profile.

3. The mobile audio distribution system of claim 1 wherein said HPC comprises male and female round threads having a thread lead of two or greater.

4. The mobile audio distribution system of claim 1 wherein said TFV, and said BFV are each covered by a hermaphroditic plate connector (HPC).

5. The mobile audio distribution system of claim 1 wherein said RFV or said LFV is covered by a removable plate connector (RPC) incorporating an additional battery pack that is electrically coupled to said MAA.

6. The mobile audio distribution system of claim 1 wherein said RFV or said LFV is covered by a removable plate connector (RPC) incorporating an additional speaker that is electrically coupled to said MAA.

7. The mobile audio distribution system of claim 1 wherein said MAM further comprises a radio frequency receiver (RFR) electrically coupled to said APR and configured to synchronize audio input to said MAA.

8. The mobile audio distribution system of claim 1 wherein said MAM further comprises a radio frequency receiver (RFR) electrically coupled to said APR and configured to transmit real-time audio input to said MAA.

9. The mobile audio distribution system of claim 1 wherein said ROL comprises a mechanical attachment void (MAV) configured to permit attachment of said ROL to a vertical standard.

10. The mobile audio distribution system of claim 1 wherein said APR comprises a MP3 music recorder.

11. A mobile audio distribution (MAD) method, said method operating in conjunction with a mobile audio distribution (MAD) system, said system comprising:
(a) audio synchronization module (ASM);
(b) audio playback recorder (APR); and
(c) modular audio module (MAM);
wherein;
said ASM is configured to electrically couple temporarily to one or more of said APR;
said ASM is configured to copy one or more digital audio files (DAFs) from a master audio recording (MAR) to said one or more of said APR when electrically coupled temporarily to one or more of said APR;
said ASM is configured to initiate playback of audio recordings on each of said APR in synchronized time;
said MAM comprises a mobile containing enclosure (MCE) comprising a box having a front face (FF), right face (RF), left face (LF), top face (TF), and bottom face (BF), and a rear opening (RO);
said MAM comprises a rear opening lid (ROL) configured to cover said RO and to rotate about a hinge attached between said TF and said ROL;
said MCE is configured to retain a mobile audio speaker (MAS);
said MAS and said MAA are electrically coupled together;
said MAA and said MBP are electrically coupled together;
said MAA and said APR are electrically coupled together;
said FF incorporates said MAS;
said RF, LF, TF, and BF each contain a respective right face plate connection void (RFV), left face plate connection void (LFV), top face plate connection void (TFV), and bottom face plate connection void (BFV);
said RFV, said LFV, said TFV, and said BFV are each covered individually by one or more types of removable plate connector (RPC) with at least one of said RPC covering said RFV, said LFV, said TFV, and said BFV comprising a hermaphroditic plate connector (HPC);
said ROL is configured to accept one of said APR when said APR is electrically decoupled from said ASM;
said ROL comprises a mobile battery pack (MBP) and a mobile audio amplifier (MAA);
said ROL comprises a battery retention compartment (BRC) configured to accept said MBP; and
said ROL is configured to mechanically attach and support said MAA;
wherein said method comprises the steps of:
(1) electrically coupling one or more of said APR to said ASM;
(2) with said ASM, copying one or more digital audio files (DAFs) from a master audio recording (MAR) to said one or more of said APR;
(3) with said ASM, synchronizing in time the playback of said DAF within said one or more of said APR;
(4) electrically decoupling one of said APR from said ASM;
(5) electrically coupling said one of said APR to said MAA within said MAM; and
(6) activating said one of said APR to playback synchronized audio containing said DAF from said one of said APR to said MAA and subsequent distributed presentation by said MAS within said MAM.

12. The mobile audio distribution method of claim 11 wherein said HPC comprises an internal threaded void having a National Pipe Taper (NPT) pipe threading profile.

13. The mobile audio distribution method of claim 11 wherein said HPC comprises male and female round threads having a thread lead of two or greater.

14. The mobile audio distribution method of claim 11 wherein said TFV, and said BFV are each covered by a hermaphroditic plate connector (HPC).

15. The mobile audio distribution method of Claim 11 wherein said RFV or said LFV is covered by a removable plate connector (RPC) incorporating an additional battery pack that is electrically coupled to said MAA.

16. The mobile audio distribution method of claim 11 wherein said RFV or said LFV is covered by a removable plate connector (RPC) incorporating an additional speaker that is electrically coupled to said MAA.

17. The mobile audio distribution method of claim 11 wherein said MAM further comprises a radio frequency receiver (RFR) electrically coupled to said APR and configured to synchronize audio input to said MAA.

18. The mobile audio distribution method of claim 11 wherein said MAM further comprises a radio frequency receiver (RFR) electrically coupled to said APR and configured to transmit real-time audio input to said MAA.

19. The mobile audio distribution method, of claim 11 wherein said ROL comprises a mechanical attachment, void (MAV) configured to permit attachment of said ROL to a vertical standard.

20. The mobile audio distribution method of claim 11 wherein said APR comprises a MP3 music recorder.

\* \* \* \* \*